United States Patent
Suzuki et al.

(10) Patent No.: US 10,723,827 B2
(45) Date of Patent: Jul. 28, 2020

(54) WATER DISPERSION OF GEL PARTICLES, PRODUCING METHOD THEREOF, AND IMAGE FORMING METHOD

(71) Applicant: FUJIFILM CORPORATION, Minato-ku, Tokyo (JP)

(72) Inventors: Shota Suzuki, Kanagawa (JP); Noriaki Sato, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 40 days.

(21) Appl. No.: 15/677,043

(22) Filed: Aug. 15, 2017

(65) Prior Publication Data

US 2018/0009927 A1   Jan. 11, 2018

Related U.S. Application Data

(63) Continuation of application No. PCT/JP2015/078672, filed on Oct. 8, 2015.

(30) Foreign Application Priority Data

| Mar. 24, 2015 | (JP) | 2015-061694 |
| Mar. 24, 2015 | (JP) | 2015-061695 |
| Aug. 31, 2015 | (JP) | 2015-171377 |

(51) Int. Cl.

| C08F 299/06 | (2006.01) |
| C09D 11/30 | (2014.01) |
| C08F 2/50 | (2006.01) |
| B41M 5/00 | (2006.01) |
| C08J 3/12 | (2006.01) |
| C08F 2/44 | (2006.01) |
| C09D 175/16 | (2006.01) |
| C08F 290/06 | (2006.01) |
| C08F 283/00 | (2006.01) |
| B41J 11/00 | (2006.01) |
| B41M 7/00 | (2006.01) |
| C08L 53/00 | (2006.01) |
| C09D 11/033 | (2014.01) |
| C09D 11/101 | (2014.01) |
| C09D 11/107 | (2014.01) |
| C09D 133/14 | (2006.01) |

(52) U.S. Cl.
CPC ......... *C08F 299/065* (2013.01); *B41J 11/002* (2013.01); *B41M 5/00* (2013.01); *B41M 7/0081* (2013.01); *C08F 2/44* (2013.01); *C08F 2/50* (2013.01); *C08F 283/008* (2013.01); *C08F 290/067* (2013.01); *C08F 299/06* (2013.01); *C08J 3/12* (2013.01); *C08L 53/00* (2013.01); *C09D 11/033* (2013.01); *C09D 11/101* (2013.01); *C09D 11/107* (2013.01); *C09D 11/30* (2013.01); *C09D 175/16* (2013.01); *C08L 2201/50* (2013.01); *C08L 2205/05* (2013.01); *C09D 133/14* (2013.01)

(58) Field of Classification Search
CPC .............. C08F 299/065; C08F 283/008; C08F 290/067; C08F 266/06; C08F 2/50; C08F 2/44; C09D 11/107; C09D 175/16; C09D 11/033; C09D 11/101; C09D 11/30; C09D 133/14; C08L 53/00; C08L 2201/50; C08L 2205/05; B41J 11/002; B41M 7/0081; B41M 5/00; C08J 3/12
See application file for complete search history.

(56) References Cited

U.S. PATENT DOCUMENTS

| 5,368,973 A | 11/1994 | Hasegawa |
| 8,080,587 B2 | 12/2011 | Suzuki et al. |
| 2004/0254293 A1 | 12/2004 | Killilea et al. |
| 2007/0254087 A1 | 11/2007 | Suzuki et al. |
| 2010/0272966 A1* | 10/2010 | Gould ................. C09D 11/101 428/195.1 |
| 2012/0041131 A1 | 2/2012 | Sommer et al. |

FOREIGN PATENT DOCUMENTS

| EP | 3202808 A1 | 8/2017 |
| JP | H04-166943 A | 6/1992 |
| JP | H07-138515 A | 5/1995 |
| JP | H08-081612 A | 3/1996 |
| JP | H08-259888 A | 10/1996 |
| JP | H10-182763 A | 7/1998 |
| JP | 2000-136211 A | 5/2000 |
| JP | 2004-285304 A | 10/2004 |
| JP | 2005-060519 A | 3/2005 |
| JP | 2006-182869 A | 7/2006 |
| JP | 2006-206664 A | 8/2006 |
| JP | 2007-321143 A | 12/2007 |
| JP | 2009-542833 A | 12/2009 |
| JP | 2011-213114 A | 10/2011 |
| JP | 2013-199602 A | 10/2013 |
| JP | 2013-237781 A | 11/2013 |

(Continued)

OTHER PUBLICATIONS

Nakajima, machine English translation of JP 2005-060519 (Year: 2005).*

(Continued)

*Primary Examiner* — Jessica M Roswell

(74) *Attorney, Agent, or Firm* — SOLARIS Intellectual Property Group, PLLC

(57) ABSTRACT

A water dispersion of gel particles, in which the gel particles having a polymerizable group, having a three-dimensional crosslinked structure including at least one bond selected from a urethane bond and a urea bond, and including at least a photopolymerization initiator and a resin are dispersed in water, a method of producing the water dispersion, and an image forming method using the water dispersion.

15 Claims, No Drawings

(56) References Cited

FOREIGN PATENT DOCUMENTS

JP         2014-189715 A    10/2014
WO      2007/083473 A1    7/2007

OTHER PUBLICATIONS

International Search Report issued in International Application No. PCT/JP2015/078672 dated Dec. 28, 2015.
Written Opinion of the ISA issued in International Application No. PCT/JP2015/078672 dated Dec. 28, 2015.
English language translation of the following: Office action dated Jan. 9, 2018 from the JPO in a Japanese patent application No. 2017-507311 corresponding to the instant patent application. This office action translation is submitted now in order to supplement the understanding of the cited reference(s) being disclosed in the instant Information Disclosure Statement.
Extended European Search Report dated Feb. 9, 2018, issued in corresponding EP Patent Application No. 15886456.1.
English language translation of the following: Office action dated Aug. 28, 2018 from the JPO in a Japanese patent application No. 2017-507311 corresponding to the instant patent application.
Communication pursuant to Article 94(3) EPC dated Sep. 11, 2018, issued in corresponding EP Patent Application No. 15886456.1.
English language translation of the following: Office action dated Mar. 26, 2019 from the JPO in a Japanese patent application No. 2017-507311 corresponding to the instant patent application.
Office Action dated Nov. 14, 2019, issued by the EPO in corresponding EP Patent Application No. EP15886456.1.
English language translation of the following: Office action dated Jul. 26, 2019 from the SIPO in a Chinese patent application No. 201580078089.6 corresponding to the instant patent application.
English language translation of the following: Office action dated Mar. 18, 2020 from the SIPO in a Chinese patent application No. 201580078089.6 corresponding to the instant patent application.

\* cited by examiner

WATER DISPERSION OF GEL PARTICLES, PRODUCING METHOD THEREOF, AND IMAGE FORMING METHOD

CROSS-REFERENCE TO RELATED APPLICATIONS

This application is a continuation application of International Application No. PCT/JP2015/078672, filed Oct. 8, 2015, the disclosure of which is incorporated herein by reference in its entirety. Further, this application claims priority from Japanese Patent Application No. 2015-061694, filed Mar. 24, 2015, Japanese Patent Application No. 2015-061695, filed Mar. 24, 2015, and Japanese Patent Application No. 2015-171377, filed Aug. 31, 2015, the disclosures of which are incorporated herein by reference in their entirety.

BACKGROUND OF THE INVENTION

1. Field of the Invention

The present invention relates to a water dispersion of gel particles, a producing method thereof, and an image forming method.

2. Description of the Related Art

Examples of the image forming method of forming an image on a recording medium include an electrophotographic method, a sublimation-type thermal transfer method, a fusion-type thermal transfer method, and an ink jet method.

For example, since the ink jet method of the image forming method can be performed with a cheap device, and the ink can be effectively used, the ink jet method has an advantage in that running cost is not expensive.

Examples of the image forming method of the ink jet method include an image forming method obtained by using ink for ink jet that can be cured by irradiation with active energy rays such as ultraviolet rays.

Hereinafter, ink jet ink that can be cured by irradiation with active energy rays is called "photocurable ink". In addition to ink jet ink, a composition that can be cured by irradiation with active energy rays is referred to as "photocurable composition".

In the related art, in view of reduction of environmental burden and improvement of workability, an aqueous composition (for example, aqueous ink) including water as a solvent or a dispersion medium is used instead of a solvent-based composition (for example, solvent-based ink) including an organic solvent as a solvent or a dispersion medium.

As the aqueous photocurable composition, for example, the following compositions are known.

For example, as an ink composition for ink jet maintaining curing properties due to irradiation with ultraviolet rays in presence of water or a solvent and having excellent jetting stability, an ink composition for ink jet including water, a colorant, a resin emulsion consisting of a compound having a radical polymerizable group, an inorganic particle dispersion, and a photoradical initiator is known (for example, see JP2013-199602A).

As an aqueous emulsion that can be thermally cured or photocured and that can be suitably used for a coating agent and the like, an aqueous emulsion containing a vinyl polymer having a specific acrylic functional group at at least one terminal is known (for example, see JP2000-136211A).

As the photocurable composition that is not limited to an aqueous composition, for example, the following compositions are known.

For example, as the colored photosensitive composition that has satisfactory color stability after exposure due to infrared laser exposure and that can obtain high color development even in a case where the exposure is performed after elapse of time, a colored photosensitive composition containing a microgel including a polymer of which a glass transition temperature is 50° C. or higher, a photoinitiator, and an infrared absorbing dye and a binder polymer is known (for example, see JP2011-213114A).

As ink for ink jet printing cured by irradiation, ink for ink jet that includes at least one irradiation curable monomer, at least one inert thermoplastic resin, at least one radical photoinitiator, and at least one colorant and that has viscosity of less than 100 mPas at 25° C., in which at least one inert resin exists by 2 weight % to 15 weight % with respect to the total weight and has a molecular weight of 1,500 to 70,000 is known (for example, see JP2009-542833A).

SUMMARY OF THE INVENTION

Recently, in a case where a cured film (for example, an image) formed of a photocurable composition (for example, photocurable ink) is formed on a base material (for example, a recording medium), it is required to enhance adhesiveness between a base material and a cured film (hereinafter, simply referred to as "adhesiveness"). This tendency is particularly remarkable in a case where a nonabsorbable base material (for example, a plastic base material and a metal base material) is used. That is, with respect to the various nonabsorbable base materials, it is required to form a cured film having excellent adhesiveness.

For example, also in an ink jet-type image forming field, it is required to form an image (cured film) having excellent adhesiveness not only to paper which is an absorbable recording medium but also to a nonabsorbable recording medium.

In view of the above, in an ink composition for ink jet disclosed in JP2013-199602A, an aqueous emulsion disclosed in JP2000-136211A, and a colored photosensitive composition disclosed in JP2011-213114A, sensitivity to light tends to be insufficient, and thus adhesiveness to a formed cured film (image) tends to be insufficient.

It is considered that respective components of the ink for ink jet disclosed in JP2009-542833A are components that are hardly dissolved or dispersed in water. Therefore, it is considered that it is difficult to prepare the ink for ink jet disclosed in JP2009-542833A as an aqueous ink composition.

An embodiment of the present invention is conceived in view of the above circumstances, and a purpose thereof is to achieve the following objects.

That is, the object of the embodiment of the present invention is to provide a water dispersion of gel particles that can form a film having excellent adhesiveness to a base material and a producing method thereof.

Another object of the embodiment of the present invention is to provide an image forming method that can form an image having excellent adhesiveness to a recording medium.

Specific means for solving the problems include the followings.

<1> A water dispersion of gel particles, in which the gel particles having a polymerizable group, having a three-dimensional crosslinked structure including at least one bond selected from a urethane bond or a urea bond, and including at least a photopolymerization initiator and a resin are dispersed in water.

<2> The water dispersion of gel particles according to <1>, in which the resin is a resin not having a polymerizable group.

<3> The water dispersion of gel particles according to <2>, in which the resin not having the polymerizable group is at least one resin selected from an acrylic resin, a polyvinyl chloride resin, and a polyester resin.

<4> The water dispersion of gel particles according to <2> or <3>, in which a weight-average molecular weight of the resin not having a polymerizable group is 1,000 to 200,000.

<5> The water dispersion of gel particles according to <1>, in which the resin is a resin having a polymerizable group.

<6> The water dispersion of gel particles according to <5>, in which the resin having a polymerizable group is at least one resin selected from an acrylic resin, a urethane resin, a polyester resin, a polyether resin, a polycarbonate resin, and an epoxy resin.

<7> The water dispersion of gel particles according to <5> or <6>, in which the resin having a polymerizable group is at least one resin selected from an acrylic resin, a urethane resin, a polyester resin, and an epoxy resin.

<8> The water dispersion of gel particles according to any one of <5> to <7>, in which a weight-average molecular weight of a resin having the polymerizable group is 1,000 to 100,000.

<9> The water dispersion of gel particles according to any one of <1> to <8>, in which the gel particles further include a polymerizable monomer.

<10> The water dispersion of gel particles according to <9>, in which the polymerizable monomer is a (meth)acrylate monomer.

<11> The water dispersion of gel particles according to <10>, in which the (meth)acrylate monomer is a trifunctional or higher functional acrylate monomer.

<12> The water dispersion of gel particles according to any one of <1> to <11>, in which the photopolymerization initiator includes at least one compound selected from a carbonyl compound and an acylphosphine oxide compound.

<13> The water dispersion of gel particles according to any one of <1> to <12>, in which the gel particles further include a sensitizer.

<14> The water dispersion of gel particles according to any one of <1> to <13>, which is used for ink jet recording.

<15> The water dispersion of gel particles according to any one of <1> to <14>, in which a total solid content of the gel particles is 50 mass % or greater with respect to a total solid content of the water dispersion.

<16> A method of producing the water dispersion of gel particles according to <1>, comprising:
mixing any one oil phase component selected from an oil phase component including a photopolymerization initiator, a resin, a trifunctional or higher functional isocyanate compound, a polymerizable monomer, and an organic solvent, an oil phase component including a photopolymerization initiator, a resin, a trifunctional or higher functional isocyanate compound having a polymerizable group, and an organic solvent, and an oil phase component including a photopolymerization initiator, a resin, a trifunctional or higher functional isocyanate compound having a polymerizable group, a polymerizable monomer, and an organic solvent, with a water phase component including water and performing emulsification, so as to obtain an emulsion; and
gelling the emulsion by heating.

<17> The method of producing the water dispersion of gel particles according to <16>, in which the resin is a resin not having a polymerizable group.

<18> The method of producing the water dispersion of gel particles according to <16>, in which the resin is a resin having a polymerizable group.

<19> The method of producing water dispersion of gel particles according to any one of <16> to <18>, in which the trifunctional or higher functional isocyanate compound is an isocyanate compound derived from at least one selected from isophorone diisocyanate, hexamethylene diisocyanate, trimethylhexamethylene diisocyanate, 1,3-bis(isocyanatomethyl)cyclohexane, m-xylylene diisocyanate, and dicyclohexylmethane-4,4'-diisocyanate.

<20> An image forming method comprising: applying the water dispersion of gel particles according to any one of <1> to <15> on a recording medium; and
irradiating the water dispersion of gel particles applied to the recording medium with active energy rays.

According to one embodiment of the present invention, it is possible to provide a water dispersion of gel particles that can form a film having excellent adhesiveness to a base material and a producing method thereof.

According to another embodiment of the present invention, it is possible to provide an image forming method that can form an image having excellent adhesiveness to a recording medium.

DESCRIPTION OF THE PREFERRED EMBODIMENTS

Hereinafter, the specific embodiment of the present invention is described in detail, but the present invention is not limited to the following embodiments, and can be performed with appropriate modifications within the scope of the objects of the present invention.

According to the present specification, a numerical range provided by using the expression "to" means a range including numerical values provided before and after the expression "to" as a minimum value and a maximum value.

In the present specification, in a case where a plurality of materials corresponding respective components in a composition exist, unless described otherwise, an amount of the respective components in the composition means a total amount of a plurality of materials existing in the composition.

In the present specification, with respect to the expression "step", not only in a case where a step is an independent step but also in a case where a step cannot be clearly differentiated from other steps, even in a case where a predetermined purpose is achieved, the step can be included in this expression.

In the present specification, the expression "light" is a concept of including active energy rays such as γ rays, β rays, electron beams, ultraviolet rays, visible rays, and infrared rays.

In the present specification, the ultraviolet rays may be referred to as "ultraviolet (UV) light".

In the present specification, light generated from a light emitting diode (LED) light source may be referred to as "LED light".

In the present specification, a "(meth)acrylic acid" is a concept of including both acrylic acid and methacrylic acid, "(meth)acrylate" is a concept of including both acrylate and methacrylate, and a "(meth)acryloyl group" is a concept of including an acryloyl group and a methacryloyl group.

[Water Dispersion of Gel Particles]

The water dispersion of gel particles (hereinafter, referred to as "water dispersion of the present disclosure" or simply "water dispersion", in some cases) according to the present disclosure is a water dispersion having a polymerizable group and a three-dimensional crosslinked structure including at least one bond selected from a urethane bond and a urea bond, and gel particles including at least a photopolymerization initiator and a resin are dispersed in water.

According to the water dispersion of the present disclosure, it is possible to form a film having excellent adhesiveness to a base material can be formed.

The reason that the water dispersion of the present disclosure exhibits such effects is not clear, but the present inventors assume as follows.

In the water dispersion of the present disclosure, the resin can function as an adhesive agent.

It is considered that, in the water dispersion of the present disclosure, the resin included in the gel particles is bled out from the gel particles due to the application of the water dispersion to the base material and comes into contact with the base material, so as to enhance the adhesiveness.

Generally, in a case where the cure shrinkage of the film is remarkable, adhesiveness between the film and the base material tends to decrease due to membrane stress. Due to this tendency, in the water dispersion of the present disclosure, for example, in a case where the resin included in the gel particles is a resin having a polymerizable group, the resin having a polymerizable group is introduced to the film, and the cure shrinkage of the film is decreased. As a result, it is considered that the decrease of the adhesiveness according to the cure shrinkage is suppressed.

In the water dispersion of the present disclosure, since the gel particles have a polymerizable group and includes a photopolymerization initiator, the distance between the polymerizable group and the photopolymerization initiator becomes shorter in the related art (for example, in a case where the photopolymerization initiator is dispersed in water), curing sensitivity (hereinafter, simply referred to as "sensitivity") to irradiation with active energy rays is enhanced. As a result, it is considered that the adhesiveness to the base material of the formed film is enhanced.

With respect to the water dispersion of the present disclosure, a resin emulsion in an ink composition for ink jet disclosed in JP2013-199602A and an aqueous emulsion disclosed in JP2000-136211A both do not have a three-dimensional crosslinked structure and are not gel particles. The microgel in the colored photosensitive composition disclosed in JP2011-213114A does not have a polymerizable group.

Accordingly, it is considered that a cured film formed by techniques of any documents also have deteriorated adhesiveness to a base material compared with the cured film formed by using the water dispersion of the present disclosure.

An inert resin in an ink for ink jet disclosed in JP2009-542833A is a component that is assumed to contribute to the adhesiveness to the base material, but it is considered that the inert resin is a component that is hardly dissolved or dispersed in water.

Accordingly, it is considered that it is difficult to prepare an ink for ink jet disclosed in JP2009-542833A as an aqueous ink composition.

Meanwhile, in the water dispersion of the present disclosure, in a case where a resin that can be hardly applied (for example, simply water-dispersed) to an aqueous composition without change due to lack of dispersibility is included in gel particles, a function of the resin as an adhesive agent can be effectively exhibited in an aqueous composition, firstly.

According to the water dispersion of the present disclosure, it is possible to form a film having excellent hardness (for example, pencil hardness).

In the water dispersion of the present disclosure, as described above, the gel particles have a polymerizable group and include a photopolymerization initiator, the distance between the polymerizable group and the photopolymerization initiator becomes short. It is considered that, in a case where the distance of the polymerizable group and the photopolymerization initiator becomes short, the curing sensitivity to the irradiation with active energy rays is enhanced, and thus a film having excellent hardness can be formed.

However, redispersibility is required to the water dispersion of the particles.

Here, the expression "redispersibility" means properties in which an aqueous solution (for example, water, an aqueous solution, or a water dispersion) is supplied to a solidified matter formed by evaporating water in a water dispersion, and particles in the solidified matter are dispersed again in the aqueous solution. Examples of the solidified matter include a solidified matter of a water dispersion formed on a coating head or an ink jet head.

The water dispersion of the present disclosure is also excellent in the above redispersibility.

The water dispersion of the present disclosure also has excellent jettability, in a case where the water dispersion is used as an ink composition for ink jet recording.

It is considered that, since the water dispersion of the present disclosure has excellent redispersibility as described above, even in a case where water in the water dispersion as ink is evaporated and gel particles are fixed near nozzles of an ink jet recording device, the gel particles are easily dispersed again by supplying new ink (that is, the water dispersion), and thus the generation of nozzle clogging is suppressed.

The water dispersion of the present disclosure is excellent in preservation stability.

The fact that the gel particles include a photopolymerization initiator has an advantage in that a photopolymerization initiator (for example, a photopolymerization initiator of which solubility to water is 1.0 mass % or less at 25° C.) having low solubility to water or a photopolymerization initiator having low dispersibility can be easily used as a photopolymerization initiator.

In the water dispersion of the present disclosure, since the gel particles include a photopolymerization initiator, a photopolymerization initiator to be used can be selected in a wider range, and a light source to be used can be also selected in a wider range. Therefore, it is possible to enhance curing sensitivity compared with the water dispersion in the related art.

For example, the carbonyl compound and the acylphosphine oxide compound (particularly, an acylphosphine oxide compound) are photopolymerization initiators having particularly excellent curing sensitivity to irradiation with active energy rays.

However, since the carbonyl compound and the acylphosphine oxide compound have low solubility to water, it was difficult to cause the carbonyl compound and the acylphosphine oxide compound to be contained in an aqueous composition in the related art.

In the water dispersion of the present disclosure, in a case where the gel particles include a photopolymerization initiator, a photopolymerization initiator such as a carbonyl compound, and an acylphosphine oxide compound of which sensitivity to light is excellent but solubility to water is low can be selected as the photopolymerization initiator.

In this point of view, the photopolymerization initiator included in the gel particles preferably includes at least one compound selected from a carbonyl compound and an acylphosphine oxide compound and more preferably includes an acylphosphine oxide compound.

In a case where the photopolymerization initiator is an acylphosphine oxide compound, sensitivity to light, particularly, sensitivity to LED light is enhanced.

The wavelength of the LED light is preferably 355 nm, 365 nm, 385 nm, 395 nm, or 405 nm.

(Inclusion)

In the present specification, the expression "a photopolymerization initiator is included in gel particles" means that a photopolymerization initiator is included inside the gel particles. Here, the expression "inside the gel particles" means cavities in a three-dimensional crosslinked structure.

In the water dispersion of the present disclosure, an inclusion ratio (mass %) of the photopolymerization initiator is preferably 10 mass % or greater, more preferably 50 mass % or greater, even more preferably 70 mass % or greater, even more preferably 80 mass % or greater, even more preferably 90 mass % or greater, even more preferably 95 mass % or greater, even more preferably 97 mass % or greater, and particularly preferably 99 mass % or greater, in view of curing sensitivity of the film.

In a case where two or more photopolymerization initiators are contained in the water dispersion, an inclusion ratio of at least one photopolymerization initiator is preferably in the preferable range described above.

Here, the inclusion ratio (mass %) of the photopolymerization initiator means an amount of the photopolymerization initiator included in the gel particles with respect to the total amount of the photopolymerization initiator in the water dispersion and refers to a value obtained as follows.

—Method of Measuring Inclusion Ratio (Mass %) of Photopolymerization Initiator—

The following operations are performed in the condition of the liquid temperature of 25° C.

In a case where a water dispersion is not contained in a pigment, the following operations are performed using this water dispersion without change. In a case where a water dispersion contains a pigment, a pigment is removed from the water dispersion by centrifugation, and the following operations are performed on the water dispersion from which the pigment is removed.

First, two samples (hereinafter, referred to as "Sample 1" and "Sample 2") in the same amount are collected from the water dispersion which was a measurement target of an inclusion ratio (mass %) of the photopolymerization initiator.

With respect to Sample 1, 100 times by mass of tetrahydrofuran (THF) is mixed with a total solid content of Sample 1 so as to prepare a diluent. Centrifugation is performed in the condition of 40 minutes on the obtained diluent, at 80,000 rpm (round per minute; The same is applied to the followings). A supernatant (hereinafter, referred to as "Supernatant 1") generated by centrifugation is collected. It is considered that all of the photopolymerization initiator included in Sample 1 is extracted to Supernatant 1 according to this operation. The mass of the photopolymerization initiator included in Supernatant 1 collected is measured by liquid chromatography (for example, a liquid chromatography device manufactured by Waters Corporation). The mass of the obtained photopolymerization initiator is called a "total amount of a photopolymerization initiator".

Centrifugation in the same condition of the centrifugation performed by the diluent was performed on Sample 2. A supernatant (hereinafter, referred to as "Supernatant 2") generated by centrifugation is collected. According to this operation, it is considered that a photopolymerization initiator that is not included in (that is, that is free from) the gel particles is extracted to Supernatant 2 in Sample 2. The mass of the photopolymerization initiator included in Supernatant 2 collected is measured by liquid chromatography (for example, a liquid chromatography device manufactured by Waters Corporation). A mass of the obtained photopolymerization initiator is a "free amount of the photopolymerization initiator".

An inclusion ratio (mass %) of the photopolymerization initiator is obtained by the following equation based on the total amount of the photopolymerization initiator and the free amount of the photopolymerization initiator.

Inclusion ratio (mass %) of photopolymerization initiator=((total amount of photopolymerization initiator-free amount of photopolymerization initiator)/total amount of photopolymerization initiator)×100

In a case where the water dispersion includes two or more photopolymerization initiators, an entire inclusion ratio of two or more of the photopolymerization initiators may be obtained by using a total amount of the two or more photopolymerization initiators is set as a "total amount of the photopolymerization initiator" and using a sum of free amounts of the two or more photopolymerization initiators as a "free amount of the photopolymerization initiator", and an inclusion ratio of any one of the photopolymerization initiators may be obtained by using an amount of any one photopolymerization initiator as a "total amount of the photopolymerization initiator" and using a free amount of one of the photopolymerization initiators as a "free amount of the photopolymerization initiator".

Whether components (for example, a polymerizable monomer and a sensitizer) other than the photopolymerization initiator are included in the gel particles can be confirmed in the same manner as the method of examining whether the photopolymerization initiator is included.

However, with respect to the compound (for example, a resin) having a molecular weight of 1,000 or greater, masses of the resins included in Supernatants 1 and 2 are measured by gel permeation chromatography (GPC), so as to obtain inclusion ratios (mass %) of the resins as a "total amount of the resin" and a "free amount of the resin".

A measuring method by gel permeation chromatography (GPC) is the same as the following method of measuring a weight-average molecular weight of a resin (for example, a resin not having a polymerizable group), and thus the description thereof is not provided here.

(Three-Dimensional Crosslinked Structure)

In the present disclosure, the "three-dimensional crosslinked structure" refers to a three-dimensional mesh structure formed by crosslinking. In the water dispersion according to the present disclosure, the gel particles are formed by forming a three-dimensional crosslinked structure in the particles.

That is, in the specification, the expression "the particles have a three-dimensional crosslinked structure" has the same meaning as the expression "the particles are the gel particles".

Whether the water dispersion of the present disclosure includes gel particles having a three-dimensional crosslinked structure is checked as follows. The following operations are performed in the temperature condition of 25° C.

In a case where the water dispersion is not contained in the pigment, the following operations are performed by using this water dispersion without change, and in a case where the water dispersion is contained in the pigment, a pigment was removed from the water dispersion by centrifugation and the following operations are performed on the water dispersion from which the pigment is removed.

Samples are gathered from the water dispersion. With respect to the gathered samples, 100 times by mass of tetrahydrofuran (THF) are added and mixed with respect to the total solid content of the sample so as to prepare a diluent. With respect to the obtained diluent, centrifugation is performed under the conditions of 80,000 rpm and 40 minutes. After the centrifugation, whether there are residues is visually checked. In a case where there are residues, the residues are re-dispersed with water, a redispersion liquid is prepared, and a particle size distribution of the redispersion liquid is measured by a light scattering method by using a wet-type particle size distribution determination device (LA-910, manufactured by Horiba Ltd.).

A case where particle size distribution can be checked by the operation described above is determined that the water dispersion includes gel particles having a three-dimensional crosslinked structure.

(Polymerizable Group Included in Gel Particles)

In the present specification, the expression "gel particles have a polymerizable group" means that the gel particles have at least one of a polymerizable group included in a three-dimensional crosslinked structure or a polymerizable group that is not included in a three-dimensional crosslinked structure.

That is, in the gel particles, the polymerizable group may exist as a portion of a three-dimensional crosslinked structure and may exist as a portion other than a three-dimensional crosslinked structure.

The expression "a polymerizable group exists as a portion other than a three-dimensional crosslinked structure" means that a monomer (hereinafter, also referred to as a "polymerizable monomer") having a polymerizable group is included in gel particles, independently from a three-dimensional crosslinked structure.

In any cases, it is preferable that the polymerizable group exists in surface portions (contact portion with water) of the gel particles.

The fact that "gel particles have a polymerizable group" can be checked, for example, by Fourier transform infrared spectroscopy (FT-IR) analysis.

Details of the polymerizable group included in the gel particles and the monomer (polymerizable monomer) included in the polymerizable group are described below.

(Use of Water Dispersion)

The water dispersion of the present disclosure can be suitably used as a liquid for forming a film (for example, an image) on a base material (for example, a recording medium).

Examples of the liquid include an ink composition (for example, an ink composition for ink jet recording) for forming an image on a base material as a recording medium and a coating solution (for example, photosensitive resin composition such as coating agent, adhesive agent, paint) for forming a coated film on a base material.

Particularly, the water dispersion of the present disclosure is preferably a water dispersion (that is, the water dispersion of the present disclosure is an ink composition for ink jet recording) used in ink jet recording.

—Base Material—

The base material for forming a film is not particularly limited, and well-known base materials can be used, as a support or a recording material.

Examples of the base material include paper, paper obtained by laminating plastic (for example, polyethylene, polypropylene, or polystyrene), a metal plate (for example, a plate of metal such as aluminum, zinc, or copper), a plastic film (for example, a film of a polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinyl acetal, an acrylic resin, and the like), paper obtained by laminating or vapor-depositing the above metal, and a plastic film obtained by laminating or vapor-depositing the above metal.

Since the water dispersion of the present disclosure can form a film having excellent adhesiveness in a base material, the water dispersion is particularly suitable for the use of forming a film on a nonabsorbable base material.

As the nonabsorbable base material, plastic base materials such as a polyvinyl chloride (PVC) base material, a polystyrene (PS) base material, a polycarbonate (PC) base material, a polyethylene terephthalate (PET) base material, a polypropylene (PP) base material, and an acrylic resin base material are preferable.

<Gel Particles>

The water dispersion of the present disclosure includes gel particles dispersed in water.

The gel particles have a polymerizable group, have a three-dimensional crosslinked structure including at least one bond selected from a urethane bond and a urea bond, and at least include a photopolymerization initiator and a resin.

The photopolymerization initiator and the resin included in the gel particles include those that exist in gaps in the three-dimensional crosslinked structure of the gel particles without being bonded to the three-dimensional crosslinked structure.

In the present specification, the "gel particles" also include a component (for example, a photopolymerization initiator and a resin) existing in gaps in the three-dimensional crosslinked structure.

The gel particles have a three-dimensional crosslinked structure including at least one bond selected from a urethane bond and a urea bond.

In a case where the gel particles have the three-dimensional crosslinked structure including at least one bond selected from a urethane bond and a urea bond, it is possible to obtain an image having excellent film hardness. It is also possible to obtain an image having high mechanical strength.

The three-dimensional crosslinked structure can be formed by the reaction between a trifunctional or higher functional isocyanate compound or a difunctional isocyanate compound and a compound having water or two or more active hydrogen groups. In a case where at least one of compounds having three or more reactive groups (isocyanate groups or active hydrogen groups) is included as a raw material in a case where gel particles are produced, the crosslinking reaction three-dimensionally progresses so as to form a three dimensional network structure.

It is preferable that the three-dimensional crosslinked structure is formed by the reaction with a trifunctional or higher functional isocyanate compound and water.

(Trifunctional or Higher Functional Isocyanate Compound)

The trifunctional or higher functional isocyanate compound is a compound having three or more isocyanate groups in a molecule.

Examples of the trifunctional or higher functional isocyanate compound include a trifunctional or higher functional aromatic isocyanate compound and a trifunctional or higher functional aliphatic isocyanate compound.

In the present disclosure, well-known compounds and compounds synthesized by the following methods can be used as the trifunctional or higher functional isocyanate compound.

Examples of the well-known compounds include compounds disclosed in "Polyurethane resin handbook" (edited by Keiji Iwata, published by Nikkan Kogyo Shimbun, Ltd. (1987)).

It is preferable that the trifunctional or higher functional isocyanate compound is a compound having three or more isocyanate groups in a molecule represented by Formula (1).

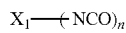  Formula (1)

In Formula (1), $X_1$ represents an n-valent organic group.

In Formula (1), n represents 3 or greater. n is preferably 3 to 10, more preferably 3 to 8, and even more preferably 3 to 6.

The trifunctional or higher functional isocyanate compound is preferably a compound derived from a difunctional isocyanate compound (compound having two isocyanate groups in a molecule).

Since a three-dimensional crosslinked structure can be formed easily, the trifunctional or higher functional isocyanate compound is more preferably an isocyanate compound derived from at least one difunctional isocyanate compound selected from isophorone diisocyanate, hexamethylene diisocyanate, trimethylhexamethylene diisocyanate, 1,3-bis(isocyanatomethyl)cyclohexane, m-xylylene diisocyanate, and dicyclohexylmethane 4,4'-diisocyanate.

The expression "to derive" means to include a structure originated from the difunctional isocyanate compound by using the difunctional isocyanate compound as a raw material.

As the trifunctional or higher functional isocyanate compound, a trifunctional or higher functional isocyanate compound (in an adduct type) as an adduct product (adduct) to a difunctional or higher functional isocyanate compound (a compound having two or more isocyanate groups in a molecule) and a compound having three or more active hydrogen groups in a molecule such as trifunctional or higher functional polyol, polyamine, and polythiol, a trimer (in a biuret type or an isocyanurate type) of a difunctional or higher functional isocyanate compound, and a compound having three or more isocyanate groups in a molecule such as a formalin condensate of benzene isocyanate are preferable.

These trifunctional or higher functional isocyanate compounds may be mixtures in which a plurality of compounds are included, compounds represented by the following formula are preferably main components of these mixtures, and other components may be included.

—Adduct Type—

The adduct-type trifunctional or higher functional isocyanate compound is preferably a compound represented by Formula (2) or (3).

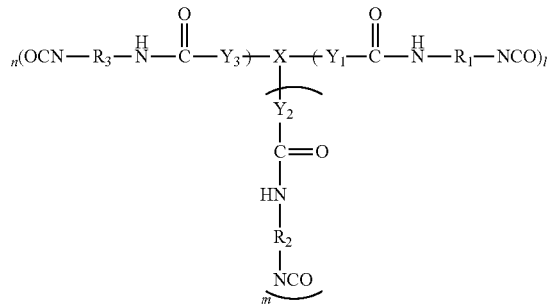  Formula (2)

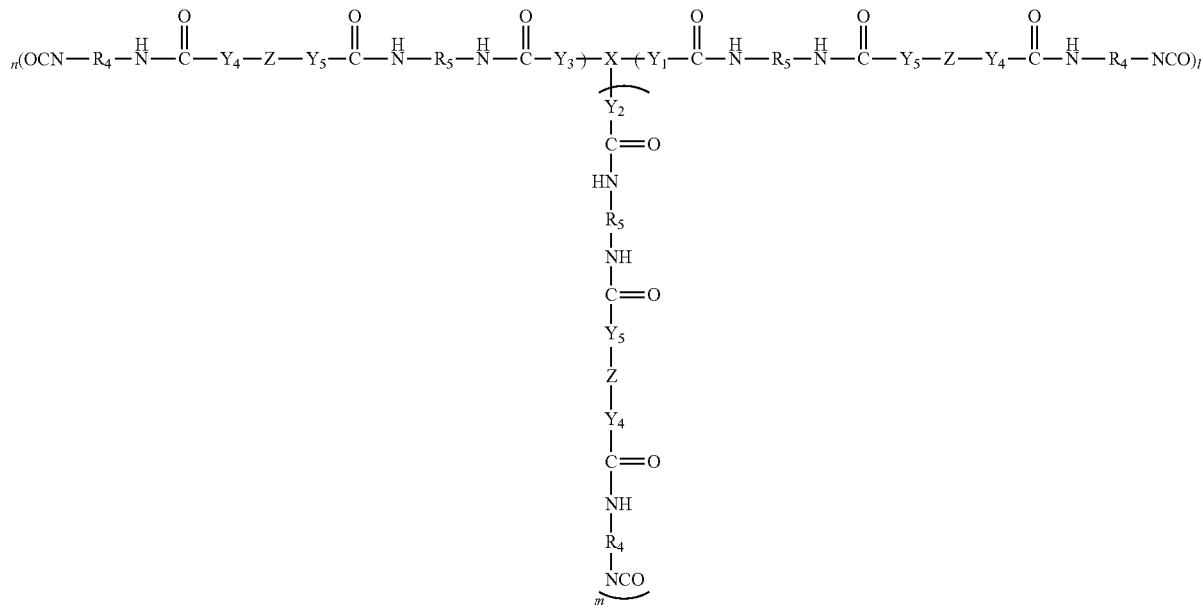  Formula (3)

In Formulae (2) and (3), X represents a (l+m+n)-valent organic group, each of l, m, and n is 0 or greater, and l+m+n is 3 or greater. l+m+n is preferably 3 to 10, more preferably 3 to 8, and even more preferably 3 to 6.

In Formulae (2) and (3), $Y_1$, $Y_2$, $Y_3$, $Y_4$, and $Y_5$ each independently represents O, S, or NH, preferably O or S, and more preferably O.

In Formulae (2) and (3), Z represents a divalent organic group.

In Formulae (2) and (3), $R_1$, $R_2$, $R_3$, $R_4$, and $R_5$ each independently represents a divalent organic group. The organic groups represented by $R_1$, $R_2$, $R_3$, $R_4$, and $R_5$ each independently an alkylene group that may have a substituent having 1 to 20 carbon atoms, a cycloalkylene group that may have a substituent having 1 to 20 carbon atoms, and an arylene group that may have a substituent having 1 to 20 carbon atoms are preferable. $R_1$, $R_2$, $R_3$, $R_4$, and $R_5$ each independently and more preferably a group selected from groups represented by (3-1) to (3-11), (4-1) to (4-2), and (5-1) to (5-7). * represents a linking position.

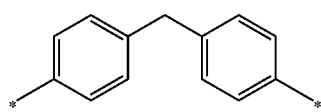
(3-1)

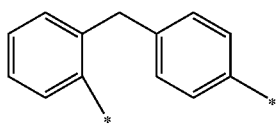
(3-2)

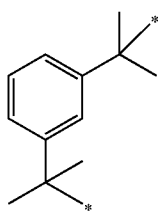
(3-3)

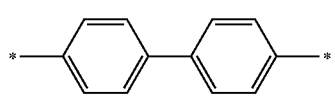
(3-4)

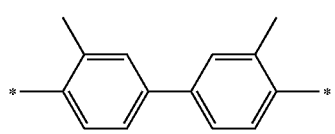
(3-5)

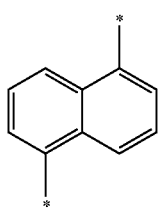
(3-6)

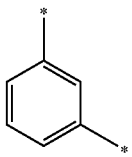
(3-7)

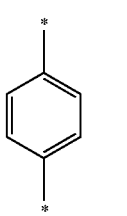
(3-8)

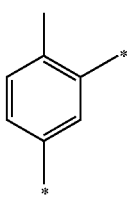
(3-9)

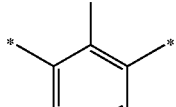
(3-10)

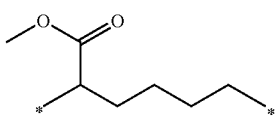
(3-11)

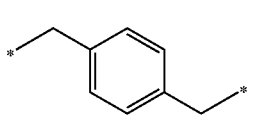
(4-1)

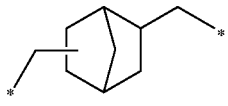
(4-2)

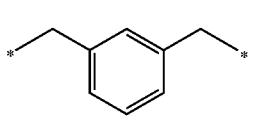
(5-1)

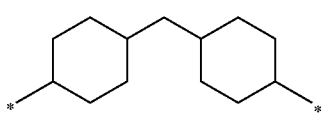
(5-2)

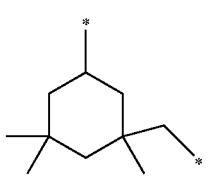
(5-3)

-continued

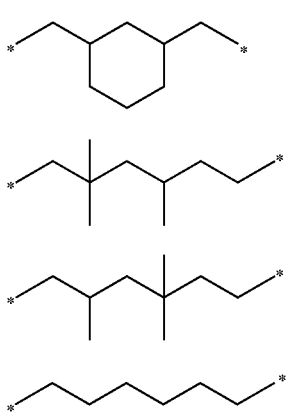

(5-4)

(5-5)

(5-6)

(5-7)

In Formulae (2) and (3), $R_1$, $R_2$, $R_3$, $R_4$, and $R_5$ each independently and more preferably represent a group (5-3) derived from isophorone diisocyanate (IPDI), a group (5-7) derived from hexamethylene diisocyanate (HDI), a group (5-5) derived from trimethylhexamethylene diisocyanate (TMHDI), a group (5-4) derived from 1,3-bis(isocyanatomethyl)cyclohexane, a group (5-1) derived from m-xylylene diisocyanate (XDI), or a group (5-2) derived from dicyclohexylmethane 4,4'-diisocyanate.

The adduct-type trifunctional or higher functional isocyanate compound can be synthesized by the reaction between the following compound having three or more active hydrogen groups in a molecule and the following difunctional or higher functional isocyanate compound. The active hydrogen group means a hydroxyl group, a primary amino group, a secondary amino group, and a mercapto group.

The adduct-type trifunctional or higher functional isocyanate compound can be obtained by stirring and heating (50° C. to 100° C.), for example, a compound having three or more active hydrogen groups in a molecule and a difunctional or higher functional isocyanate compound in an organic solvent while adding a catalyst such as tin 2-ethylhexanoate at a temperature (0° C. to 70° C.) (Synthesis Scheme 1).

Generally, with respect to the number of moles (the number of molecules) of a difunctional or higher functional isocyanate compound reacted with a compound having three or more active hydrogen groups in a molecule, a difunctional or higher functional isocyanate compound having the number of moles (the number of molecules) of 0.6 times or greater with respect to the number of moles (equivalent number of active hydrogen groups) of active hydrogen groups in a compound having three or more active hydrogen groups in a molecule is used. The number of moles of the difunctional or higher functional isocyanate compound is preferably 0.6 times to 5 times of the number of moles of the active hydrogen group, more preferably 0.6 times to 3 times of the number of moles of the active hydrogen group, and even more preferably 0.8 times to 2 times of the number of moles of the active hydrogen group.

Synthesis Scheme 1

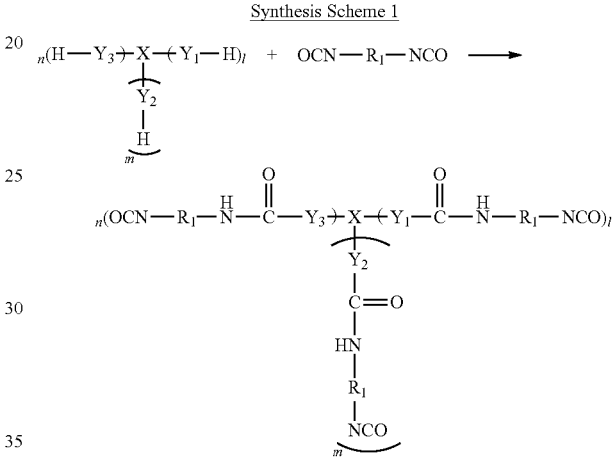

The adduct-type trifunctional or higher functional isocyanate compound can be obtained by reacting this prepolymer and a compound having three or more active hydrogen groups in a molecule, after an adduct (prepolymer) between a compound having two active hydrogen groups in a molecule and a difunctional or higher functional isocyanate compound is synthesized (Synthesis Scheme 2).

Synthesis Scheme 2

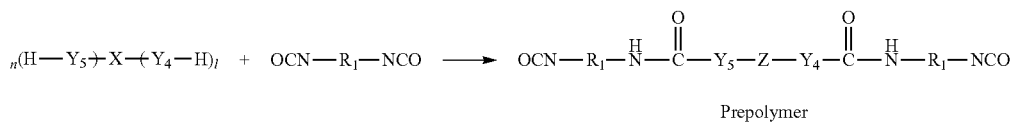

Prepolymer

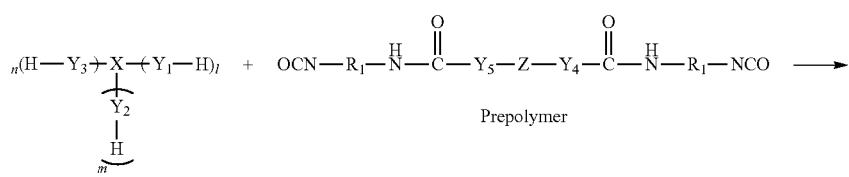

Prepolymer

-continued

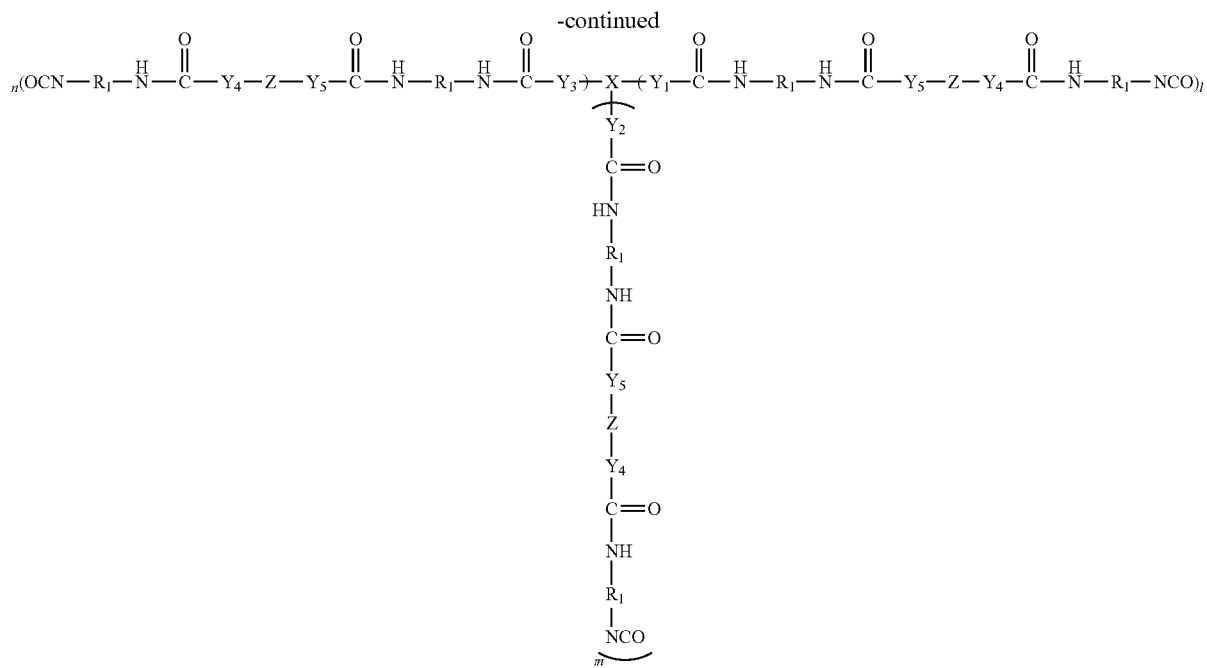

Examples of the difunctional or higher functional isocyanate compound include a difunctional or higher functional aromatic isocyanate compound and a difunctional or higher functional aliphatic isocyanate compound.

Specific examples of the difunctional or higher functional isocyanate compound include isophorone diisocyanate (IPDI), m-phenylene diisocyanate, p-phenylene diisocyanate, 2,6-tolylene diisocyanate, 2,4-tolylene diisocyanate (TDI), naphthalene-1,4-diisocyanate, diphenylmethane-4,4'-diisocyanate (MDI), 3,3'-dimethoxy-biphenyl diisocyanate, 3,3'-dimethyldiphenylmethane-4,4'-diisocyanate, m-xylylene diisocyanate (XDI), p-xylylene diisocyanate, 4-chloroxylilene-1,3-diisocyanate, 2-methylxylylene-1,3-diisocyanate, 4,4'-diphenylpropane diisocyanate, 4,4'-diphenylhexafluoropropane diisocyanate, trimethylene diisocyanate, hexamethylene diisocyanate (HDI), propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl)cyclohexane, 1,3-bis(isocyanatomethyl)cyclohexane (HXDI), norbornene diisocyanate (NBDI), trimethylhexamethylene diisocyanate (TMHDI), lysine diisocyanate, and 1,3-bis(2-isocyanato-2-propyl) benzene.

As the difunctional or higher functional isocyanate compound, compounds in structures represented by (8-1) to (8-24) are preferable.

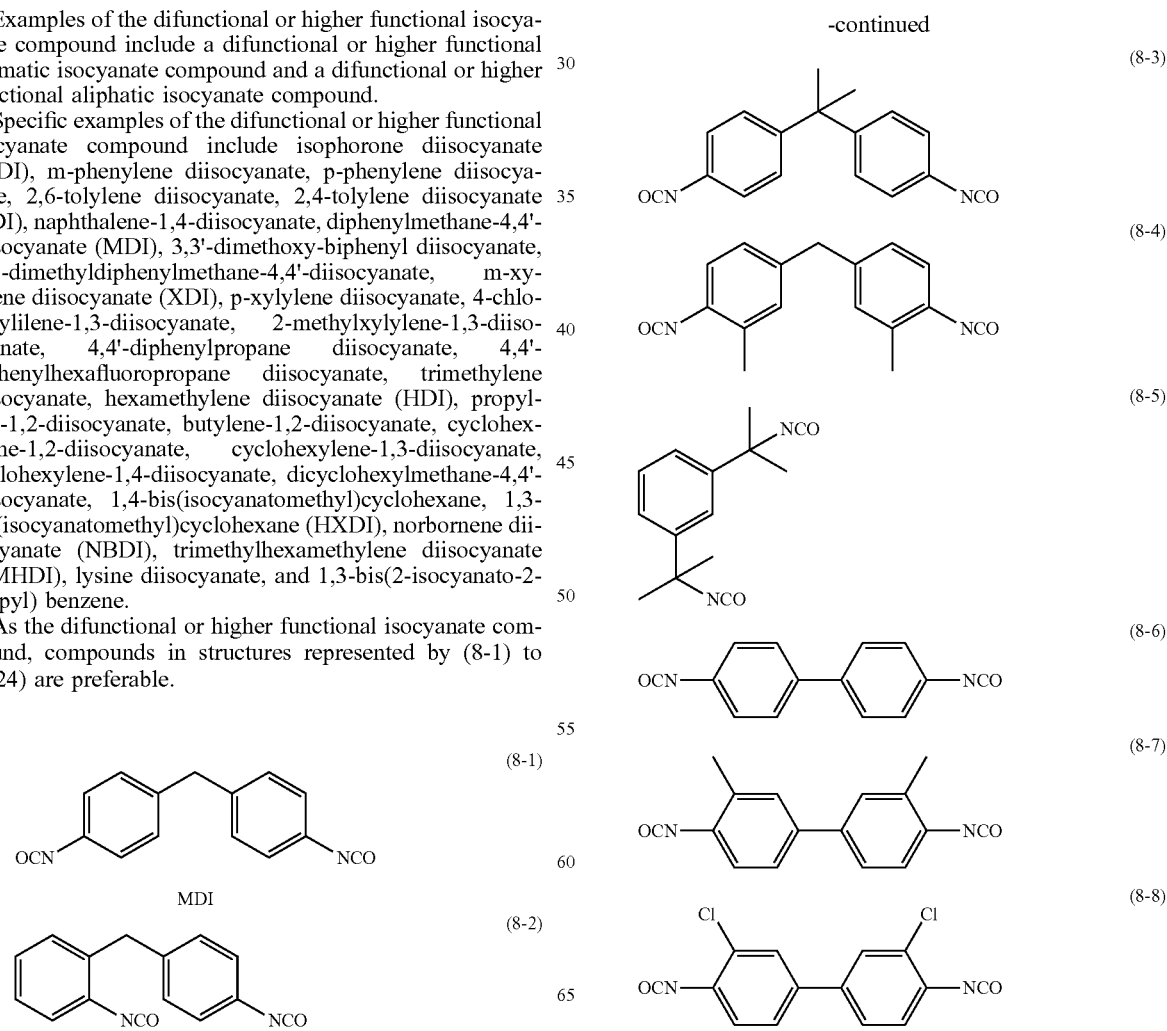

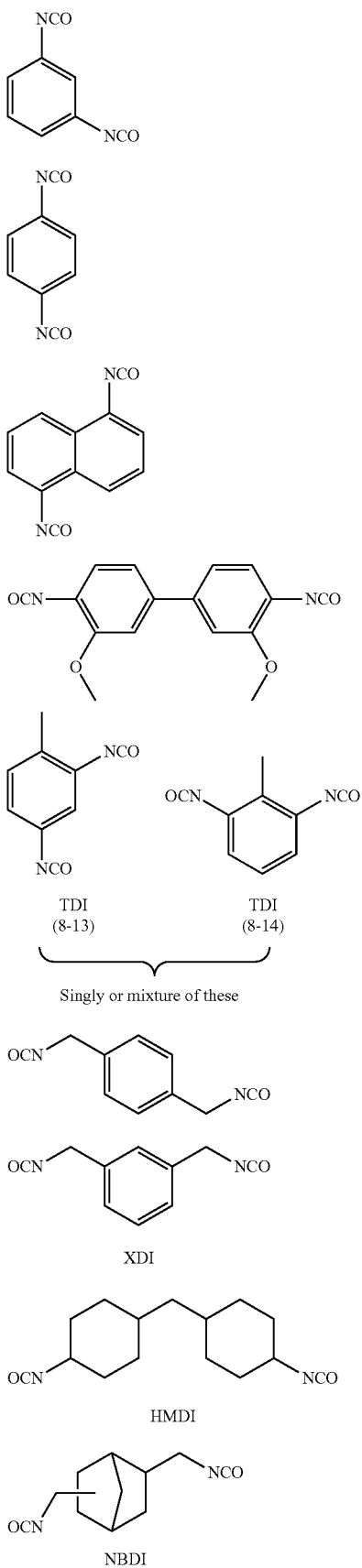

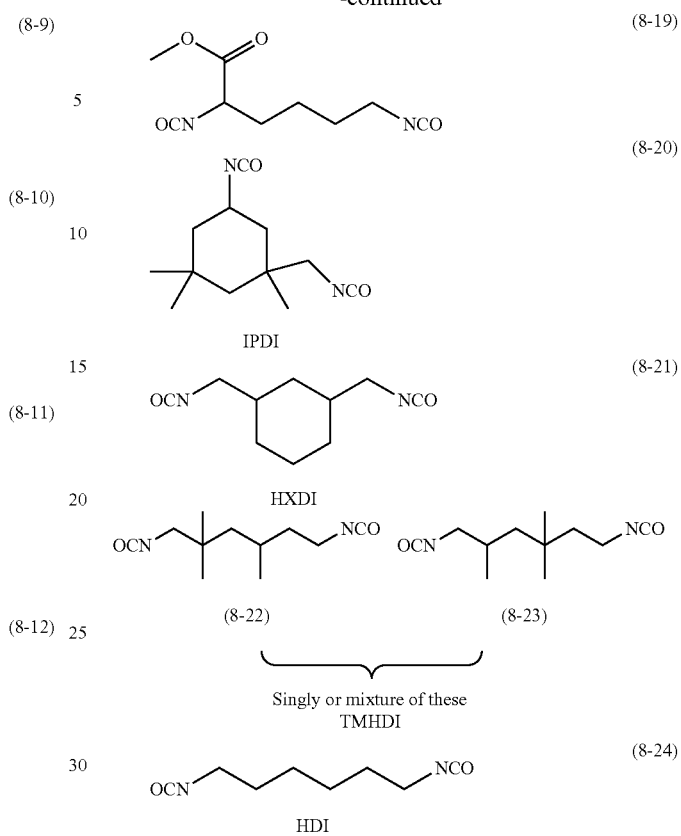

Among these, as the difunctional or higher functional isocyanate compound, at least one compound selected from isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), and dicyclohexylmethane-4,4'-diisocyanate is preferable.

As the difunctional or higher functional isocyanate compound, a difunctional isocyanate compound derived from the compounds can be also used. Examples thereof include DURANATE (Registered trademark) D101, D201, and A101 (above, Asahi Kasei Corporation).

The compound having three or more active hydrogen groups in a molecule is a compound having three or more of at least one group selected from a hydroxyl group, a primary amino group, a secondary amino group, and a mercapto group in a molecule, and examples thereof include compounds in a structure represented by (9-1) to (9-13). In the following structures, n represents an integer selected from 1 to 100.

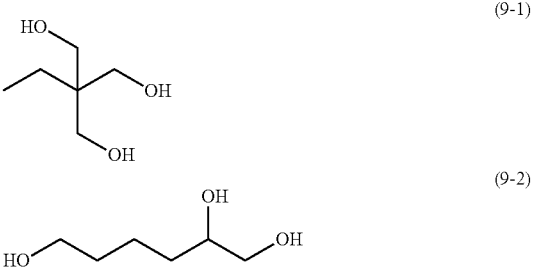

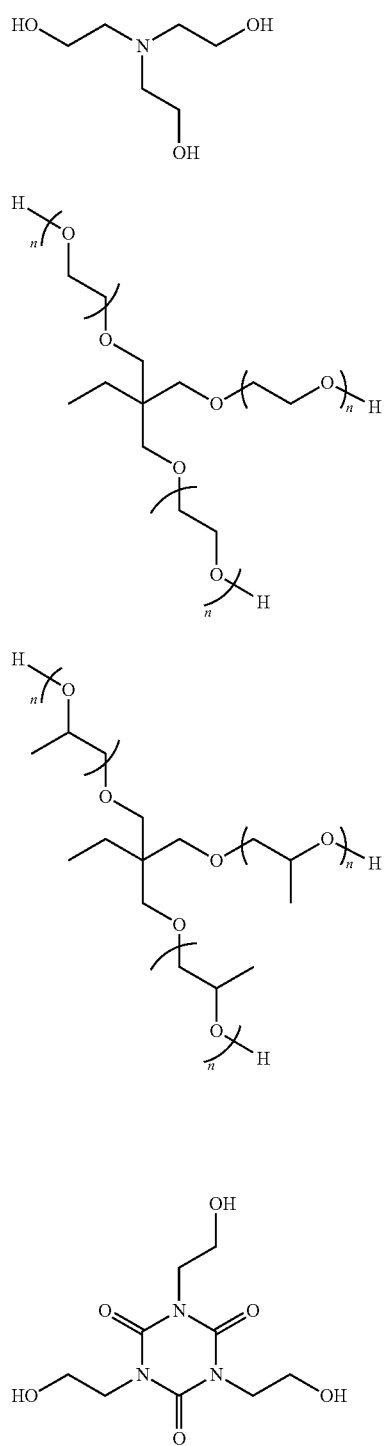
(9-3)
(9-4)
(9-5)
(9-6)
(9-7)
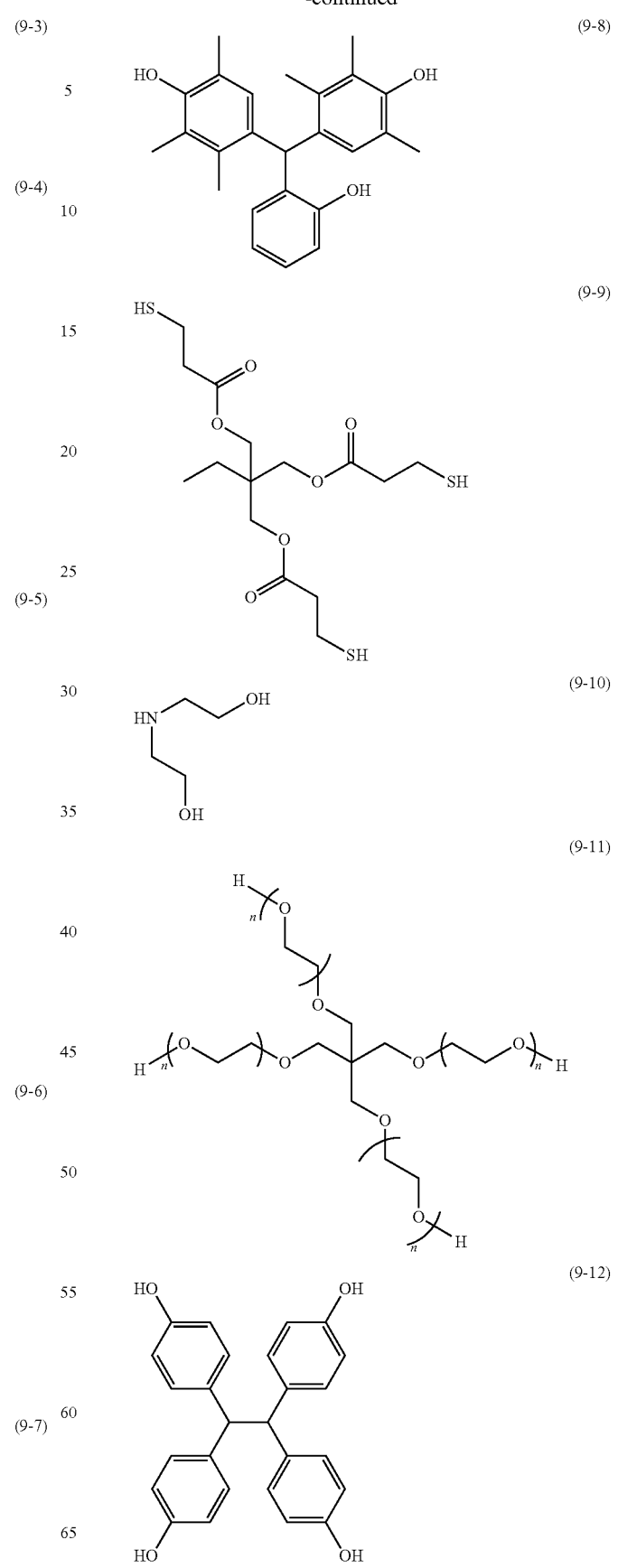
(9-8)
(9-9)
(9-10)
(9-11)
(9-12)

(9-13)
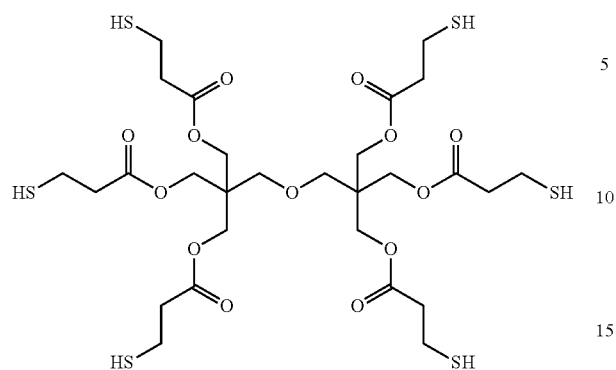
As the adduct-type trifunctional or higher functional isocyanate compound, a compound obtained by reacting a compound having two or more active hydrogen groups in a molecule and a difunctional or higher functional isocyanate compound is preferably used in a combination represented by Table 1.

TABLE 1

| Compound No. | Structure | | Composition | | |
|---|---|---|---|---|---|
| | Compound having two or more active hydrogen groups | Difunctional isocyanate compounds | Compound having two or more active hydrogen groups (mol equivalent) | Difunctional isocyanate compound (mol equivalent) | |
| NCO 101 | Trimethylolpropane | 2,4-Tolylene diisocyanate (TDI) | 1 | 4 | |
| NCO 102 | Trimethylolpropane | m-Xylylene diisocyanate (XDI) | 1 | 4 | |
| NCO 103 | Trimethylolpropane | Hexamethylene diisocyanate (HDI) | 1 | 4 | |
| NCO 104 | Trimethylolpropane | 1,3-Bis(isocyanatomethyl)cyclohexane (HXDI) | 1 | 4 | |
| NCO 105 | Trimethylolpropane | Isophorone diisocyanate (IPDI) | 1 | 4 | |
| NCO 106 | 1,3,5-Trihydroxybenzene | Hexamethylene diisocyanate (HDI) | 1 | 4 | |
| NCO 107 | 1,3,5-Trihydroxybenzene | Isophorone diisocyanate (IPDI) | 1 | 4 | |
| NCO 108 | Pentaerythritol ethylene oxide | 1,3-Bis(isocyanatomethyl)cyclohexane (HXDI) | 1 | 5 | |
| NCO 109 | Pentaerythritol ethylene oxide | Isophorone diisocyanate (IPDI) | 1 | 5 | |

TABLE 1-continued

| Compound No. | Structure | | Composition | | |
|---|---|---|---|---|---|
| | Compound having two or more active hydrogen groups | Difunctional isocyanate compounds | Compound having two or more active hydrogen groups (mol equivalent) | Difunctional isocyanate compound (mol equivalent) | |
| NCO 110 | Dipentaerythritol hexakis(3-mercaptopropionate) | Hexamethylene diisocyanate (HDI) | 1 | 7 |
| NCO 111 | | Isophorone diisocyanate (IPDI) | 1 | 7 |
| NCO 112 | Triethanolamine | Hexamethylene diisocyanate (HDI) | 1 | 4 |
| NCO 113 | | Isophorone diisocyanate (IPDI) | 1 | 4 |

Among the compounds presented in Table 1, as the adduct-type trifunctional or higher functional isocyanate compound, NCO 102 to NCO 105 are more preferable.

As the adduct-type trifunctional or higher functional isocyanate compound, commercially available products on the market may be used.

Examples of the commercially available products D-102, D-103, D-103H, D-103M2, P49-75S, D-110, D-120N, D-140N, and D-160N (above, Mitsui Chemicals, Inc.), DESMODUR (Registered trademark) L75 and UL57SP (Covestro AG), CORONATE (Registered trademark) HL, HX, and L (Tosoh Corporation), and P301-75E (Asahi Kasei Corporation).

Among these, as the adduct-type trifunctional or higher functional isocyanate compound, at least one selected from D-110, D-120N, D-140N, and D-160N of Mitsui Chemicals, Inc., is more preferable.

—Biuret Type or Isocyanurate Type—

A biuret-type or isocyanurate-type trifunctional or higher functional isocyanate compound is preferably a compound represented by Formula (4) or (5).

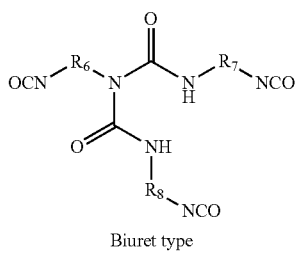

Formula (4)

Biuret type

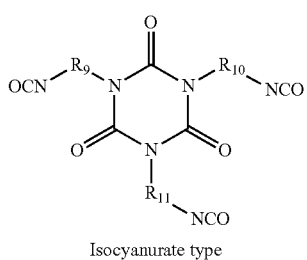

Formula (5)

Isocyanurate type

In Formulae (4) and (5), $R_6$, $R_7$, $R_8$, $R_9$, $R_{10}$, and $R_{11}$ each independently represent a divalent organic group. The organic groups represented by $R_6$, $R_7$, $R_8$, $R_9$, $R_{10}$, and $R_{11}$ each independently and preferably represent an alkylene group that may have a substituent having 1 to 20 carbon atoms, a cycloalkylene group that may have a substituent having 1 to 20 carbon atoms, or an arylene group having a substituent having 1 to 20 carbon atoms. $R_6$, $R_7$, $R_8$, $R_9$, $R_{10}$, and $R_{11}$ each independently and preferably a group selected from groups represented by (3-1) to (3-11), (4-1) to (4-2), and (5-1) to (5-7). * represents a linking position.

In Formulae (4) and (5), $R_6$, $R_7$, $R_8$, $R_9$, $R_{10}$, and $R_{11}$ each independently and more preferably represent a group (5-3) derived from isophorone diisocyanate (IPDI), a group (5-7) derived from hexamethylene diisocyanate (HDI), a group (5-5) derived from trimethylhexamethylene diisocyanate (TMHDI), a group (5-4) derived from 1,3-bis(isocyanatomethyl)cyclohexane, a group (5-1) derived from m-xylylene diisocyanate (XDI), or a group (5-2) derived from dicyclohexylmethane 4,4'-diisocyanate.

As the biuret-type trifunctional or higher functional isocyanate compound, commercially available products on the market may be used.

Examples of the commercially available products include D-165N and NP1100 (above, Mitsui Chemicals, Inc.), DESMODUR (Registered trademark) N3200 (Covestro AG), and DURANATE (Registered trademark) 24A-100 (Asahi Kasei Corporation).

Among these, as a biuret-type trifunctional or higher functional isocyanate compound, DURANATE (Registered trademark) 24A-100 (Asahi Kasei Corporation) is more preferable.

As the isocyanurate-type trifunctional or higher functional isocyanate compound, commercially available products on the market may be used.

Examples of the commercially available products include D-127, D-170N, D-170HN, D-172N, and D-177N (above, Mitsui Chemicals, Inc.), DESMODUR N3300 and DESMODUR (Registered trademark) N3600, N3900, and Z4470BA (above, Covestro AG), CORONATE (Registered trademark) HX and HK (above, Tosoh Corporation), and DURANATE (Registered trademark) TPA-100, TKA-100, TSA-100, TSS-100, TLA-100, and TSE-100 (above, Asahi Kasei Corporation).

Among these, as an isocyanurate-type trifunctional or higher functional isocyanate compound, at least one selected from D-127 manufactured by Mitsui Chemicals, Inc. and TKA-100 and TSE-100 manufactured by Asahi Kasei Corporation are more preferable.

(Compound Having Water or Two or More Active Hydrogen Groups)

The gel particles are preferably produced by reacting the above trifunctional or higher functional isocyanate compound and a compound having water or two or more active hydrogen groups.

As the compound to be reacted with the trifunctional or higher functional isocyanate compound, water is generally used. A three-dimensional crosslinked structure having a urea bond is formed by reacting the trifunctional or higher functional isocyanate compound and water with each other.

Examples of the compound to be reacted with the trifunctional or higher functional isocyanate compound other than water include a compound having two or more active hydrogen groups. Examples of the compound having two or more active hydrogen groups include polyfunctional alcohol, polyfunctional phenol, polyfunctional amine having a hydrogen atom on a nitrogen atom, and polyfunctional thiol.

Specific examples of the polyfunctional alcohol include propylene glycol, glycerin, trimethylol propane, and 4,4',4"-trihydroxytriphenylmethane.

Specific examples of the polyfunctional amine include diethylenetriamine and tetraethylenepentamine.

Specific examples of the polyfunctional thiol include 1,3-propanedithiol and 1,2-ethanedithiol.

Specific examples of the polyfunctional phenol include Bisphenol A.

The compound having two or more active hydrogen groups may be used singly or two or more kinds thereof may be used in combination.

The compound having three or more active hydrogen groups in a molecule is included in the compound having two or more active hydrogen groups.

(Polymerizable Group)

The gel particles have a polymerizable group.

In a case where the gel particles have a polymerizable group, adjacent gel particles are crosslinked to each other by irradiation with active energy rays, so as to form a film.

In a case where the gel particles may have a polymerizable group by causing a polymerizable group to be introduced into a three-dimensional crosslinked structure or may have a polymerizable group by causing a polymerizable monomer to be included inside the particles (gaps in the three-dimensional crosslinked structure). Otherwise, the both may coexist.

In view of sensitivity and crosslinking properties, the gel particles preferably have a polymerizable group on surfaces of the gel particles or surfaces and portions near the surfaces of the gel particles.

Examples of the method of introducing a polymerizable group to gel particles include a method in which, in a case where a three-dimensional crosslinked structure having at least one bond selected from a urethane bond and a urea bond is formed, the above trifunctional or higher functional isocyanate compound, a compound having water or the above two or more active hydrogen groups, and a polymerizable compound as a polymerizable group introducing monomer are reacted with each other, a method in which, in a case where a trifunctional or higher functional isocyanate compound is produced, the above difunctional or higher functional isocyanate compound and a polymerizable compound as a polymerizable group introducing monomer are reacted with each other, and after a polymerizable group is introduced to a difunctional or higher functional isocyanate compound, the difunctional or higher functional isocyanate compound obtained by introducing this polymerizable group thereto and the compound having water or the above two or more active hydrogen groups are reacted with each other, and a method in which, together with a component constituting gel particles in a case where gel particles are produced, a polymerizable compound as a polymerizable group introducing monomer is dissolved in an oil phase component, and a water phase component is added and mixed to an oil phase component so as to perform emulsification.

Examples of polymerizable compound used for introducing a polymerizable group to gel particles include a compound having at least one active hydrogen group and having an ethylenically unsaturated bond at at least one terminal.

The compound having at least one active hydrogen group and having an ethylenically unsaturated bond at at least one terminal can be represented by Structural Formula (a) below.

$$L^1 Lc_m Z_n \tag{a}$$

In Structural Formula (a), $L^1$ represents an m+n-valent linking group, m and n each independently represents an integer selected from 1 to 100, Lc represents a monovalent ethylenically unsaturated group, and Z represents an active hydrogen group.

$L^1$ preferably represents a divalent or higher valent aliphatic group, a divalent or higher valent aromatic group, a divalent or higher valent heterocyclic group, —O—, —S—, —NH—, —N<, —CO—, —SO—, —SO$_2$—, or a combination of these.

m and n each independently and preferably represent 1 to 50, more preferably represent 2 to 20, even more preferably represent 3 to 10, and particularly preferably represent 3 to 5.

Examples of the monovalent ethylenically unsaturated group represented by Lc include an allyl group, a vinyl group, an acryloyl group, and a methacryloyl group.

Z preferably represents OH, SH, NH, or NH$_2$, more preferably represents OH or NH$_2$, and even more preferably represents OH.

Hereinafter, examples of the compound having at least one active hydrogen group and having an ethylenically unsaturated bond at at least one terminal are provided, but the present invention is not limited to these structures.

n in Compounds (11-3) and (12-2) represents, for example, an integer selected from 1 to 90.

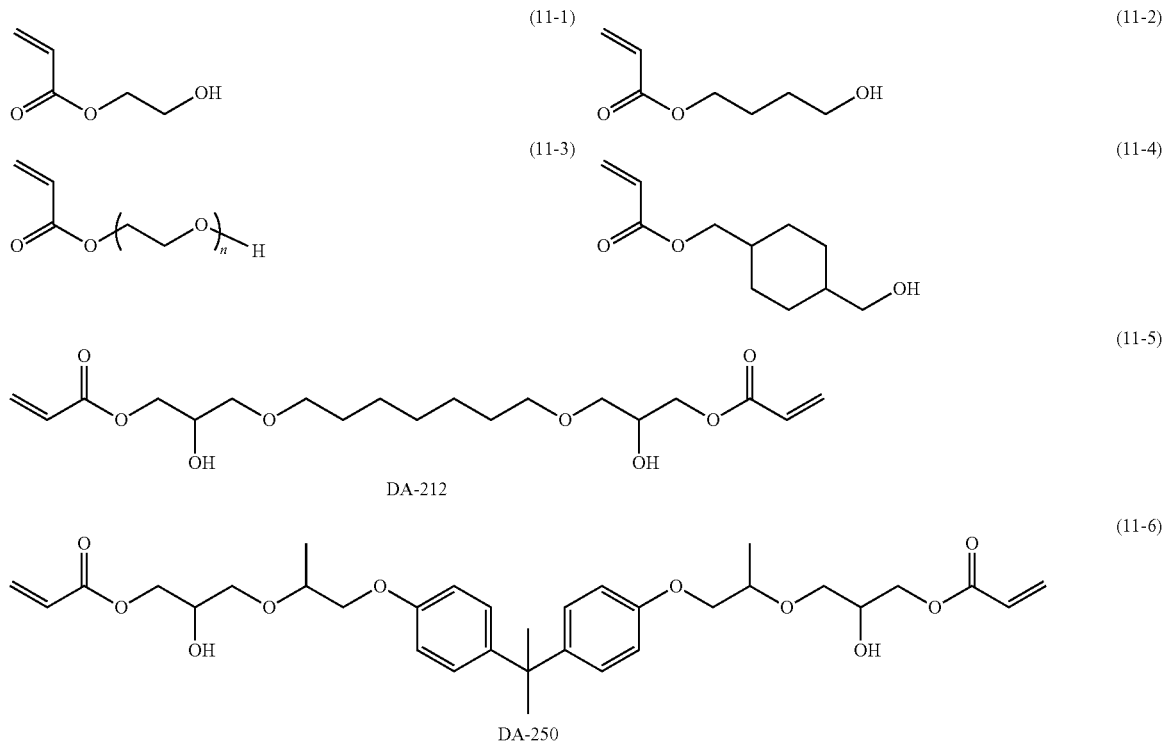

-continued

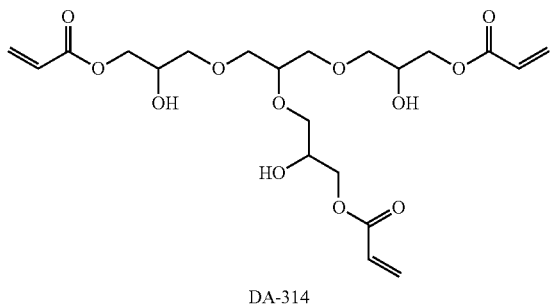
DA-314 (11-7)

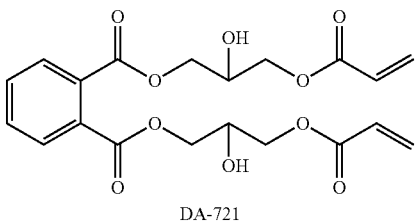
DA-721 (11-8)

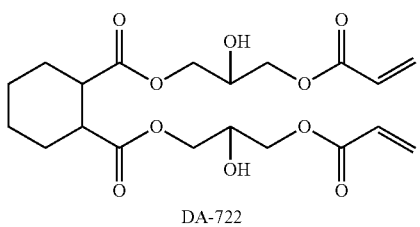
DA-722 (11-9)

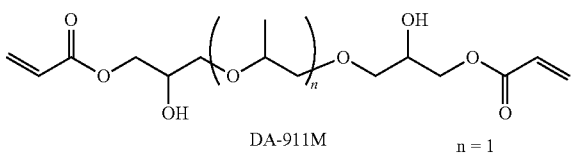
DA-911M   n = 1 (11-10)

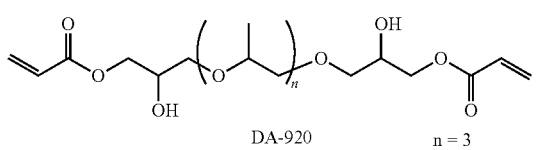
DA-920   n = 3 (11-11)

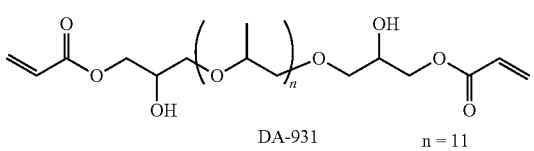
DA-931   n = 11 (11-12)

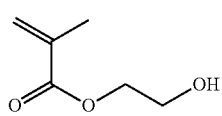
(12-1)

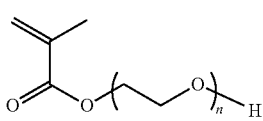
(12-2)

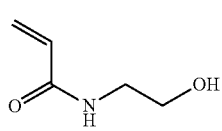
(13-1)

As the compound having at least one active hydrogen group and having an ethylenically unsaturated bond at at least one terminal, commercially available products on the market may be used.

Examples of the commercially available products include acrylate such as hydroxyethyl acrylate (Osaka Organic Chemical Industry Ltd.), 4-hydroxybutyl acrylate, 1,4-cyclohexanedimethanol monoacrylate (above, Nippon Kasei Chemical Co., Ltd), BLEMMER (Registered trademark) AE-90U (n=2), AE-200 (n=4.5), AE-400 (n=10), AP-150 (n=3), AP-400 (n=6), AP-550 (n=9), AP-800 (n=13) (above, NOF Corporation), and DENACOL (Registered trademark) ACRYLATE DA-212, DA-250, DA-314, DA-721, DA-722, DA-911M, DA-920, and DA-931 (above, Nagase ChemteX Corporation), methacrylate such as 2-hydroxyethyl methacrylate (Kyoeisha Chemical Co., Ltd.), BLEMMER (Registered trademark) APE-90 (n=2), PE-200 (n=4.5), PE-350 (n=8), PP-1000 (N=4 to 6), PP-500 (n=9), and PP-800 (n=13) (above, NOF Corporation), and acrylamide (KJ Chemicals Corporation).

Among these, as the compound having at least one active hydrogen group and having an ethylenically unsaturated bond at at least one terminal, at least one selected from hydroxyethyl acrylate of Osaka Organic Chemical Industry Ltd., BLEMMER (Registered trademark) AE-400 (n=10), AP-400 (n=6), and PP-500 (n=9) of NOF Corporation, and DENACOL (Registered trademark) ACRYLATE DA-212 of Nagase ChemteX Corporation are more preferable.

A polymerizable group can be introduced to gel particles, for example, by reacting an isocyanate group of a trifunctional or higher functional isocyanate compound and an active hydrogen group of a compound having at least one active hydrogen group and having an ethylenically unsaturated bond at at least one terminal as represented in Synthesis Scheme 3, manufacturing an isocyanate compound to which a polymerizable group is introduced, and reacting an isocyanate compound to which the manufactured polymerizable group is introduced and the above compound having the above two or more active hydrogen groups.

Synthesis Scheme 3

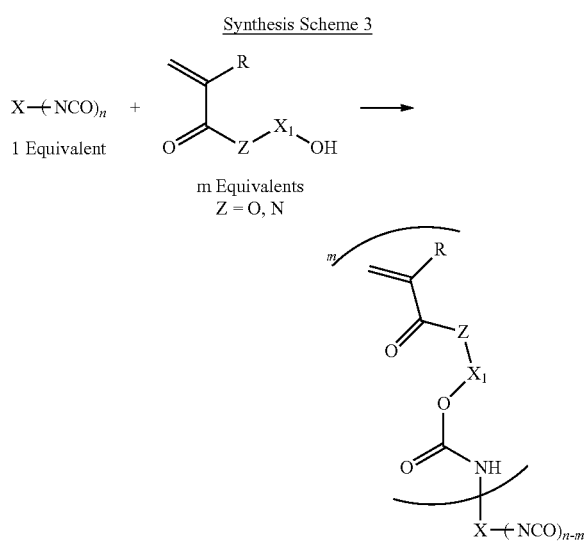

In a case where an isocyanate compound having a polymerizable group is used in the producing of the gel particles, as an isocyanate compound having this polymerizable group, a compound obtained by reacting compound (referred to as a "polymerizable group introducing monomer" in Table 2) having at least one active hydrogen group and having an ethylenically unsaturated bond at at least one terminal and a trifunctional or higher functional isocyanate compound in the combination presented in Table 2 is preferably used.

TABLE 2

| Compound No. | Structure Isocyanate compound (Trifunctional or higher functional) | Polymerizable group introducing monomer | Composition Amount of active hydrogen groups of polymerizable group introducing monomer with respect to NCO group of isocyanate compound (mol %) |
|---|---|---|---|
| NCO 201 | NCO 104 | BLEMMER AP-400 | 15 |
| NCO 202 | NCO 104 | BLEMMER AE-400 | 15 |
| NCO 203 | NCO 104 | DA212 | 15 |
| NCO 204 | NCO 104 | DA920 | 15 |
| NCO 205 | D-127 | BLEMMER AP-400 | 15 |
| NCO 206 | DURANATE TKA-100 | BLEMMER AP-400 | 15 |
| NCO 207 | DURANATE TSE-100 | BLEMMER AP-400 | 15 |

These compounds each having at least one active hydrogen group and having an ethylenically unsaturated bond at at least one terminal may be used singly or two or more kinds of the compounds may be used in combination.

An isocyanate group of a trifunctional or higher functional isocyanate compound and an active hydrogen group of a compound (polymerizable group introducing monomer) having one active hydrogen group and having an ethylenically unsaturated bond at at least one terminal are reacted with each other in an amount in which the number of moles of the active hydrogen group in the compound having at least one active hydrogen group and having an ethylenically unsaturated bond at at least one terminal is preferably 0.01 times to 0.3 times, is more preferably 0.02 times to 0.25 times, and even more preferably 0.03 times to 0.2 times of the number of moles of an isocyanate group of a trifunctional or higher functional isocyanate compound.

In a compound obtained by reacting a difunctional or higher functional isocyanate compound including a trifunctional or higher functional isocyanate compound and a compound having one active hydrogen group and having an ethylenically unsaturated bond at at least one terminal, an average functional group number of an isocyanate group in a compound is 3 or less in some cases. However, in a case where at least one trifunctional or higher functional isocyanate compound is included in a raw material, a three-dimensional crosslinked structure can be formed in a case of producing gel particles.

(Photopolymerization Initiator)

The gel particles include a photopolymerization initiator. The inclusion is as described above.

The gel particles may include only one kind of photopolymerization initiators or may include two or more kinds thereof.

The photopolymerization initiator is a compound that absorbs active energy rays and generates radicals which are polymerization initiating species.

Examples of the active energy rays include γ rays, β rays, electron beams, ultraviolet rays, visible rays, and infrared rays.

As the photopolymerization initiator, the well-known compounds can be used. Examples of the preferable photopolymerization initiator include (A) a carbonyl compound such as aromatic ketones, (b) an acylphosphine oxide compound, (c) an aromatic onium salt compound, (d) organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon halogen bond, and (m) an alkylamine compound.

These photopolymerization initiators may use compounds of (a) to (m) singly or two or more kinds thereof in combination.

Preferable examples of (a) the carbonyl compound, (b) the acylphosphine oxide compound, and (e) the thio compound include compounds having a benzophenone skeleton or a thioxanthone skeleton disclosed in "RADIATION CURING IN POLYMER SCIENCE AND TECHNOLOGY", J. P. FOUASSIER, J. F. RABEK (1993), pp. 77 to 117.

More preferable examples thereof include α-thiobenzophenone compounds disclosed in JP1972-6416B (JP-S47-6416B), a benzoin ether compound disclosed in JP1972-3981B (JP-S47-3981B), an α-substituted benzoin compound JP1972-22326B (JP-S47-22326B), a benzoin derivative disclosed in JP1972-23664B (JP-S47-23664B), aroylphosphonic acid ester disclosed in JP1982-30704B (JP-S57-30704B), dialkoxybenzophenone disclosed in JP1985-26483A (JP-S60-26483A), benzoin ethers disclosed in JP1985-26403B (JP-S60-26403B) and JP1987-81345A (JP-S62-81345A), α-aminobenzophenones disclosed in JP1989-34242B (JP-H01-34242B), U.S. Pat. No. 4,318,791A, and EP0284561A1, p-di(dimethylamino benzoyl) benzene disclosed in JP1990-211452A (JP-H02-211452A), thio-substituted aromatic ketone disclosed in JP1986-194062A (JP-S61-194062A), acyl phosphine sulfide disclosed in JP1990-9597A (JP-H02-9597A), acyl phosphine disclosed in JP1990-9596B (JP-H02-9596B), thioxanthones as disclosed in JP1988-61950B (JP-S63-61950B), and coumarin disclosed in JP1984-42864B (JP-S59-42864B).

Photopolymerization initiators disclosed in JP2008-105379A or JP2009-114290A are also preferable.

Among these photopolymerization initiators, in view of sensitivity to UV light, at least one compound selected from (a) the carbonyl compound and (b) the acylphosphine oxide compound are more preferable. Specific examples thereof include bis(2,4,6-trimethylbenzoyl)-phenylphosphine oxide (for example, IRGACURE (Registered trademark) 819 manufactured by BASF SE), 2-(dimethylamine)-1-(4-morpholinophenyl)-2-benzyl-1-butanone (for example, IRGACURE (Registered trademark) 369 manufactured by BASF SE), 2-methyl-1-(4-methylthiophenyl)-2-morpholinopropan-1-one (for example, IRGACURE (Registered trademark) 907 manufactured by BASF SE), 1-hydroxy-cyclohexyl-phenyl-ketone (for example, IRGACURE (Registered trademark) 184 manufactured by BASF SE), and 2,4,6-trimethylbenzoyl-diphenyl-phosphine oxide (for example, DAROCUR (Registered trademark) TPO and LUCIRIN (Registered trademark) TPO (all manufactured by BASF SE)).

Among these, in view of suitability to LED light, as a photopolymerization initiator, (b) the acylphosphine oxide compound is preferable, a monoacylphosphine oxide compound (particularly preferably 2,4,6-trimethylbenzoyl-diphenyl-phosphine oxide) or a bisacylphosphine oxide compound (particularly preferably bis(2,4,6-trimethylbenzoyl)-phenylphosphine oxide) is more preferable.

A content of a photopolymerization initiator included in gel particles is preferably 0.1 mass % to 25 mass %, more preferably 0.5 mass % to 20 mass %, and even more preferably 1 mass % to 15 mass % with respect to a total solid content of the gel particles.

(Resin)

The gel particles include a resin.

The gel particles may include only one kind of the resins or may include two or more kinds thereof.

The inclusion is as described above.

In view of the compatibility between adhesiveness and dispersion stability, the content of the resin included in the gel particles is preferably 0.5 mass % to 15 mass %, more preferably 1 mass % to 10 mass %, and even more preferably 3 mass % to 8 mass % with respect to the total solid content of the gel particles.

The resin may be classified, for example, into a resin not having a polymerizable group and a resin having a polymerizable group. Hereinafter, the resin is described by dividing the resin into a resin not having a polymerizable group and a resin having a polymerizable group.

—Resin not Having a Polymerizable Group—

In view of enhancing the adhesiveness by causing a resin bled out from gel particles to come into contact with a base material, in the water dispersion of the present disclosure, the resin included in the gel particles is preferably a resin that is not substantially involved in the curing reaction, that is, a resin not having a polymerizable group.

In the present specification, the "resin not having a polymerizable group" means a resin not having a polymerizable group such as an ethylenically unsaturated group or an epoxy group.

In a case where gel particles include a resin not having a polymerizable group, gel particles may include only one kind of the resin not having a polymerizable group or may include two or more kinds thereof. Without deteriorating the adhesiveness to the base material, the following resin having a polymerizable group may be used together.

Examples of the resin not having a polymerizable group include an acrylic resin, a polyvinyl chloride resin, a polyester resin, an epoxy resin, a ketone resin, a nitrocellulose resin, and a phenoxy resin.

Among these, in view of the adhesiveness enhancement, the resin not having a polymerizable group is preferably at least one resin selected from an acrylic resin, a polyvinyl chloride resin, and a polyester resin.

Due to the lack of dispersibility, in the water dispersion of the present disclosure, a component that is hardly applied to an aqueous composition without change is included in gel particles, such that a function of the component can be effectively exhibited. In order to more effectively exhibit the effect according to one embodiment of the invention in this manner, the resin not having a polymerizable group is preferably a water insoluble resin.

Here, the "water insoluble resin" means a resin of which a dissolution amount is 1 g or less with respect to 100 g of distilled water at 25° C. in a case where drying is performed at 105° C. for two hours.

As the resin not having a polymerizable group, commercially available products on the market may be used.

Examples of the commercially available products of the acrylic resin include a copolymer (hereinafter, referred to as "P-1") of methyl methacrylate and butyl methacrylate of Sigma-Aldrich Corporation. In addition, examples of the commercially available products of the acrylic resin include DIANAL (Registered trademark) BR-80, DIANAL (Registered trademark) BR-90, DIANAL (Registered trademark) BR-101, DIANAL (Registered trademark) BR-106, DIANAL (Registered trademark) BR-113, DIANAL (Registered trademark) BR-115, DIANAL (Registered trademark) MB-2543, DIANAL (Registered trademark) MB-2766, DIANAL (Registered trademark) MB-7022, and DIANAL (Registered trademark) PB-204 (above, Mitsubishi Rayon Co., Ltd.), PARALOID (Registered trademark) EXL-2335, and PARALOID (Registered trademark) EXL-2361 (above, The Dow Chemical Company), Acronal (Registered trademark) 4F, Acronal (Registered trademark) 4L, and Acronal (Registered trademark) 700L (above, BASF SE).

Examples of the commercially available products of the polyvinyl chloride resin include Laroflex (Registered trademark) MP15, Laroflex (Registered trademark) MP25, Laroflex (Registered trademark) MP35, and Laroflex (Registered trademark) MP45 (above, BASF SE).

Examples of the commercially available products of the polyester resin include TEGO (Registered trademark) AddBond LTH, TEGO (Registered trademark) AddBond HS, and TEGO (Registered trademark) AddBond 1270 (above, Evonik Industries AG).

In view of compatibility between adhesiveness and dispersion stability, a weight-average molecular weight of the resin not having a polymerizable group is preferably 1,000 to 200,000, more preferably 1,000 to 100,000, and even more preferably 1,000 to 10,000.

The weight-average molecular weight of the resin not having a polymerizable group is a value obtained by measuring gel permeation chromatography (GPC).

The measurement by the gel permeation chromatography (GPC) is performed by using HLC (Registered trademark)-8020GPC (Tosoh Corporation) as a determination device, using three items of TSKgel (Registered trademark) Super Multipore HZ-H (4.6 mmID×15 cm, Tosoh Corporation) as a column, and using tetrahydrofuran (THF) as an eluent. Measuring is performed by setting a sample concentration of 0.45 mass %, a flow rate of 0.35 ml/min, and a sample injection volume of 10 µl, a measuring temperature of 40° C. as measuring conditions and by using an RI detector.

The calibration curve is manufactured from eight samples of "Standard Sample TSK standard, polystyrene" of Tosoh Corporation: "F-40", "F-20", "F-4", "F-1", "A-5000", "A-2500", "A-1000", and "n-propylbenzene".

In view of compatibility between adhesiveness and dispersion stability, the content of a resin not having a polymerizable group included in gel particles is preferably 0.5 mass % to 15 mass %, more preferably 1 mass % to 10 mass %, and even more preferably 3 mass % to 8 mass % with respect to a total solid content of the gel particles.

—Resin Having a Polymerizable Group—

In the water dispersion of the present disclosure, in view of suppressing decrease of adhesiveness between a film and a base material by decreasing cure shrinkage of the film, the resin included in the gel particles is preferably a resin having a polymerizable group.

In a case where the gel particles include a resin having a polymerizable group, the gel particles may include only one kind of the resin having a polymerizable group or may include two or more kinds thereof. The above resin not having a polymerizable group may be used together, without deteriorating the effect of decreasing cure shrinkage of a film caused by a resin having a polymerizable group.

Examples of the resin having a polymerizable group include an acrylic resin, a urethane resin, a polyester resin, a polyether resin, a polycarbonate resin, an epoxy resin, and a polybutadiene resin.

Among these, in view of decrease of cure shrinkage, as the resin having a polymerizable group, a resin that has hard segments and soft segments in combination and that can perform stress relaxation in a case of curing is preferable, and particularly, at least one resin selected from an urethane resin, a polyester resin, and an epoxy resin are more preferable.

In the water dispersion of the present disclosure, for the lack of dispersibility, it is possible to effectively exhibit a function of the component by causing a component that is hardly applied to an aqueous composition without change to be included in the gel particles. In view of more effectively exhibit the effect according to one embodiment of the present invention, a water insoluble resin is preferable as the resin having a polymerizable group.

Here, the "water insoluble resin" means a resin in which a dissolution amount is 1 g or less with respect to 100 g of distilled water at 25° C. in a case where drying is performed at 105° C. for two hours.

As the polymerizable group, an ethylenically unsaturated group such as a (meth)acryl group, a vinyl group, an allyl group, and a styryl group and an epoxy group are preferable. In view of polymerization reactivity, at least one group selected from a (meth)acryl group, a vinyl group, and a styryl group is more preferable, and a (meth)acryl group is particularly preferable.

The resin having a polymerizable group may have only one kind of the polymerizable group or may have two or more kinds thereof.

These polymerizable groups can be introduced to a resin (polymer or oligomer) by polymer reaction or copolymerization.

A polymerizable group can be introduced to a polymer (or an oligomer) by using, for example, reaction between a polymer (or an oligomer) having a carboxy group at a side chain and glycidyl methacrylate or reaction between a polymer (or an oligomer) having an epoxy group and ethylenically unsaturated group containing carboxylic acid such as methacrylic acid. These groups may be used together.

As the resin having a polymerizable group, commercially available products on the market may be used.

Examples of commercially available products of an acrylic resin having a polymerizable group include (ACA) Z200M, (ACA) Z230AA, (ACA) Z251, and (ACA) Z254F (above, Daicel-Allnex Ltd.), and HITAROID 7975D (Hitachi Chemical Co. Ltd.).

Examples of commercially available products of an urethane resin having a polymerizable group include EBECRYL (Registered trademark) 8402, EBECRYL (Registered trademark) 8405, EBECRYL (Registered trademark) 9270, EBECRYL (Registered trademark) 8311, EBECRYL (Registered trademark) 8701, KRM8667, and KRM8528 (above, Daicel-Allnex Ltd.), CN964, CN9012, CN968, CN996, CN975, and CN9782 (above, Sartomer), UV-6300B, UV-7600B, UV-7605B, UV-7620EA, and UV-7630B (above, The Nippon Synthetic Chemical Industry Co., Ltd.), U-6HA, U-15HA, U-108A, U-200PA, and UA-4200 (above, Shin-Nakamura Chemical Co., Ltd.), TESLAC 2300, HITAROID 4863, TESLAC 2328, TESLAC 2350, and HITAROID 7902-1 (above, Hitachi Chemical Co. Ltd.), and 8UA-017, 8UA-239, 8UA-239H, 8UA-140, 8UA-585H, 8UA-347H, and 8UX-015A (above, Taisei Fine Chemical Co., Ltd).

Examples of commercially available products of a polyester resin having a polymerizable group include CN294, CN2254, CN2260, CN2271E, CN2300, CN2301, CN2302, CN2303, and CN2304 (above, Sartomer), and EBECRYL (Registered trademark) 436, EBECRYL (Registered trademark) 438, EBECRYL (Registered trademark) 446, EBECRYL (Registered trademark) 524, EBECRYL (Registered trademark) 525, EBECRYL (Registered trademark) 811, and EBECRYL (Registered trademark) 812 (above, Daicel-Allnex Ltd.).

Examples of commercially available products of a polyether resin having a polymerizable group include BLEMMER (Registered trademark) ADE-400A and BLEMMER (Registered trademark) ADP-400 (above, NOF Corporation).

Examples of commercially available products of a polycarbonate resin having a polymerizable group include polycarbonate diol diacrylate (Ube Industries, Ltd.).

Examples of commercially available products of an epoxy resin having a polymerizable group include EBECRYL (Registered trademark) 3708 (Daicel-Allnex Ltd.), CN120, CN120B60, CN120B80, and CN120E50 (above, Sartomer), and HITAROID 7851 (Hitachi Chemical Co Ltd.).

Examples of commercially available products of a polybutadiene resin having a polymerizable group include CN301, CN303, and CN307 (above, Sartomer).

In view of compatibility between adhesiveness and dispersion stability, a weight-average molecular weight of a resin having a polymerizable group is preferably 1,000 to 100,000, more preferably 1,000 to 40,000, and even more preferably 1,000 to 10,000.

A weight-average molecular weight of a resin having a polymerizable group is a value measured by gel permeation chromatography (GPC).

Since a method of measuring a weight-average molecular weight of a resin having a polymerizable group by gel permeation chromatography (GPC) is the same as the method of measuring a weight-average molecular weight of a resin not having a polymerizable group, the description thereof is omitted here.

In view of compatibility between adhesiveness and dispersion stability, the content of a resin having a polymerizable group included in gel particles is preferably 0.5 mass % to 15 mass %, more preferably 1 mass % to 10 mass %, and even more preferably 3 mass % to 8 mass % with respect to the total solid content of gel particles.

(Polymerizable Monomer)

It is preferable that the gel particles further include a polymerizable monomer.

An aspect in which gel particles are included in a polymerizable monomer is advantageous in view of curing sensitivity of a film and hardness enhancement of a film.

The polymerizable group included in a polymerizable monomer included in gel particles functions as a polymerizable group included in gel particles.

In a case where gel particles include a polymerizable monomer, the polymerizable monomer may be included singly or two or more kinds thereof may be included.

Examples of the polymerizable monomer include a monomer having an ethylenically polymerizable group.

Examples of the polymerizable group include a (meth)acryloyl group, an allyl group, a styryl group, and a vinyl group.

In view of hardness enhancement, a (meth)acrylate monomer having a (meth)acryloyl group is particularly preferable as a polymerizable monomer.

Examples of the polymerizable monomer include an acrylate monomer such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, bis(4-acryloxypolyethoxyphenyl) propane, polyethylene glycol diacrylate, polypropylene glycol diacrylate, dipentaerythritol tetraacrylate, trimethylolpropane triacrylate, pentaerythritol triacrylate, ditrimethylol propane tetraacrylate, dipentaerythritol pentaacrylate, dipentaerythritol hexaacrylate, oligoester acrylate, N-methylol acrylamide, diacetone acrylamide, epoxy acrylate, isobornyl acrylate, dicyclopentenyl acrylate, dicyclopentenyloxyethyl acrylate, dicyclopentanyl acrylate, and neopentyl glycol propylene oxide adduct diacrylate; a methacrylate monomer such as methyl methacrylate, n-butyl methacrylate, allyl methacrylate, glycidyl methacrylate, benzyl methacrylate, dimethylaminomethyl methacrylate, polyethylene glycol dimethacrylate, polypropylene glycol dimethacrylate, and 2,2-bis(4-methacryloxypolyethoxyphenyl) propane; allyl glycidyl ether, diallyl phthalate, and triallyl trimellitate.

Among these, as the polymerizable monomer, at least one selected from trimethylolpropane triacrylate, pentaerythritol triacrylate, ditrimethylolpropane tetraacrylate, dipentaerythritol pentaacrylate, dipentaerythritol hexaacrylate, and neopentyl glycol propylene oxide adduct diacrylate are preferable, and dipentaerythritol pentaacrylate is more preferable.

In view of crosslinking properties and film hardness, the polymerizable monomer is preferably a polyfunctional polymerizable monomer, more preferably a trifunctional or higher functional polymerizable monomer, and even more preferably a tetrafunctional or higher functional polymerizable monomer. The polymerizable monomer is even more preferably a trifunctional or higher functional acrylate monomer and particularly preferably a tetrafunctional or higher functional acrylate monomer.

In addition to the above polymerizable monomer, commercially available products disclosed in "Handbook of Crosslinking Agent" edited by Yamashita, Shinzo (1981, Taiseisha, Ltd.); "UV•EB Curing Handbook (Raw materials section)" edited by Kato, Kiyomi (1985, Kobtmshi Kankokai); page 79 of "Applications and Markets of UVEB Curing Technology" edited by RadTech Japan (1989, CMC Publishing, Inc.); "Handbook of Polyester Resins" written by Takiyama, Eiichiro, (1988, Nikkan Kogyo Shimbun, Ltd.); and the like and radical polymerizable monomers or crosslinking monomers well-known in the industry can be used.

For example, photocurable polymerizable monomers used in a photopolymerizable composition disclosed in JP1995-1599B A (JP-H07-159983A), JP1995-31399B (JP-H07-31399B), JP1996-224982A (JP-H08-224982A), JP1998-863A (JP-H10-863A), JP1997-134011A (JP-H09-134011A), and JP2004-514014A can be also included in the gel particles according to the present disclosure.

As the polymerizable monomer, commercially available products on the market may be used. Examples of commercially available products of a polymerizable monomer include ethoxylated or propoxylated acrylate such as AH-600, AT-600, UA-306H, UA-306T, UA-306I, UA-510H, UF-8001G, and DAUA-167 (above, Kyoeisha Chemical Co., Ltd.) and SR444, SR454, SR492, SR499, CD501, SR502, SR9020, CD9021, SR9035, and SR494 (Sartomer), and an isocyanurate monomer such as A-9300 and A-9300-1CL (above, Shin-Nakamura Chemical Co., Ltd.).

In addition, as the polymerizable monomer, commercially available products such as NPGPODA (neopentyl glycol propylene oxide adduct diacrylate, Sartomer), SR399E (dipentaerythritol pentaacrylate, Sartomer), ATMM-3L (pentaerythritol triacrylate, Shin-Nakamura Chemical Co., Ltd.), and A-DPH (dipentaerythritol hexaacrylate, Shin-Nakamura Chemical Co., Ltd.) can be suitably used.

A weight-average molecular weight of a polymerizable monomer is preferably 100 or greater and less than 1,000, more preferably 100 to 800, and even more preferably 150 to 700.

A weight-average molecular weight of a polymerizable monomer is a value measured by gel permeation chromatography (GPC).

Since a method of measuring a weight-average molecular weight of a polymerizable monomer by gel permeation chromatography (GPC) is the same as the method of measuring a weight-average molecular weight of a resin not having a polymerizable group, the description thereof is omitted here.

In a case where gel particles include a polymerizable monomer, a content of a polymerizable monomer is preferably 0.1 mass % to 75 mass %, more preferably 1 mass % to 65 mass %, and even more preferably 10 mass % to 60 mass % with respect to the total solid content of the gel particles.

(Hydrophilic Group)

It is preferable that the gel particles have hydrophilic groups on surface portions (contact portions with water).

In a case where the gel particles have hydrophilic groups on the surfaces thereof, dispersibility to a water medium is enhanced. Hydrophilicity of the gel particles is enhanced, and more excellent redispersibility is exhibited.

In the gel particles, the hydrophilic group may exist as a portion of the three-dimensional crosslinked structure or may exist as a portion other than the three-dimensional crosslinked structure.

Here, the expression "hydrophilic groups exist as portions of the three-dimensional crosslinked structure" means that the hydrophilic groups form covalent bonds with portions other than the hydrophilic groups of the three-dimensional crosslinked structure.

The expression "hydrophilic groups exist as portions other than the three-dimensional crosslinked structure" means that gel particles include an organic compound having a hydrophilic group independently from the three-dimensional crosslinked structure.

Examples of a hydrophilic group existing on surface portions of gel particles include a carboxy group, a salt of the carboxy group, a phosphonic acid group, a salt of the phosphonic acid group, a phosphoric acid group, a salt of the phosphoric acid group, a sulfo group, a salt of the sulfo group, a sulfate group, a salt of the sulfate group, a group having a polyether structure, and a group having a betaine structure. The "hydrophilic group" in the present specification is different from the above active hydrogen groups (a hydroxy group, a primary amino group, a secondary amino group, and a mercapto group).

A salt of the carboxy group, a salt of the sulfo group, a salt of the sulfate group, a salt of the phosphonic acid group, and a salt of the phosphoric acid group may be salts formed in the course of the producing gel particles or by neutralization.

In a case where the gel particles have hydrophilic groups on the surfaces thereof, the gel particles may have only one kind of the hydrophilic groups or may have two or more kinds thereof.

The gel particles having hydrophilic groups on surfaces can be obtained, for example, by reacting the above trifunctional or higher functional isocyanate compound, a compound having the above two or more active hydrogen groups, and a compound having a hydrophilic group and causing the obtained isocyanate compound having a hydrophilic group to be contained in an oil phase component in a case where the gel particles are manufactured.

The gel particles having hydrophilic groups on surfaces can be obtained, for example, by reacting the above difunctional or higher functional isocyanate compound and a compound having a hydrophilic group in a case where the above trifunctional or higher functional isocyanate compound is manufactured after a hydrophilic group is introduced to a difunctional or higher functional isocyanate compound, performing reaction with a compound having the above two or more active hydrogen groups, and causing the obtained isocyanate compound having a hydrophilic group to be contained in an oil phase component in a case where the gel particles are produced.

As the compound having a hydrophilic group, at least one selected from a compound having a group having a polyether structure and a compound having a carboxy group are preferable.

Examples of the compound having a group having a polyether structure include a compound having a polyoxyalkylene chain.

Specific examples of the compound having a polyoxyalkylene chain include polyethylene oxide, polypropylene oxide, polytetramethylene oxide, polystyrene oxide, polycyclohexylene oxide, a polyethylene oxide-polypropylene oxide-block copolymer, and a polyethylene oxide-polypropylene oxide random copolymer.

Among these, the compound having a polyoxyalkylene chain is preferably at least one compound selected from polyethylene oxide, polypropylene oxide, and a polyethylene oxide-polypropylene oxide-block copolymer and preferably polyethylene oxide.

The compound having a group having a polyether structure is preferably a monoether body of polyethylene oxide, a monoester body of polyethylene oxide, and the like.

Examples of the monoether include monomethyl ether and monoethyl ether.

Examples of the monoester include monoacetic acid ester and mono(meth)acrylic acid ester.

Specific examples of the compound having a carboxy group or other ionic hydrophilic group are as follows.

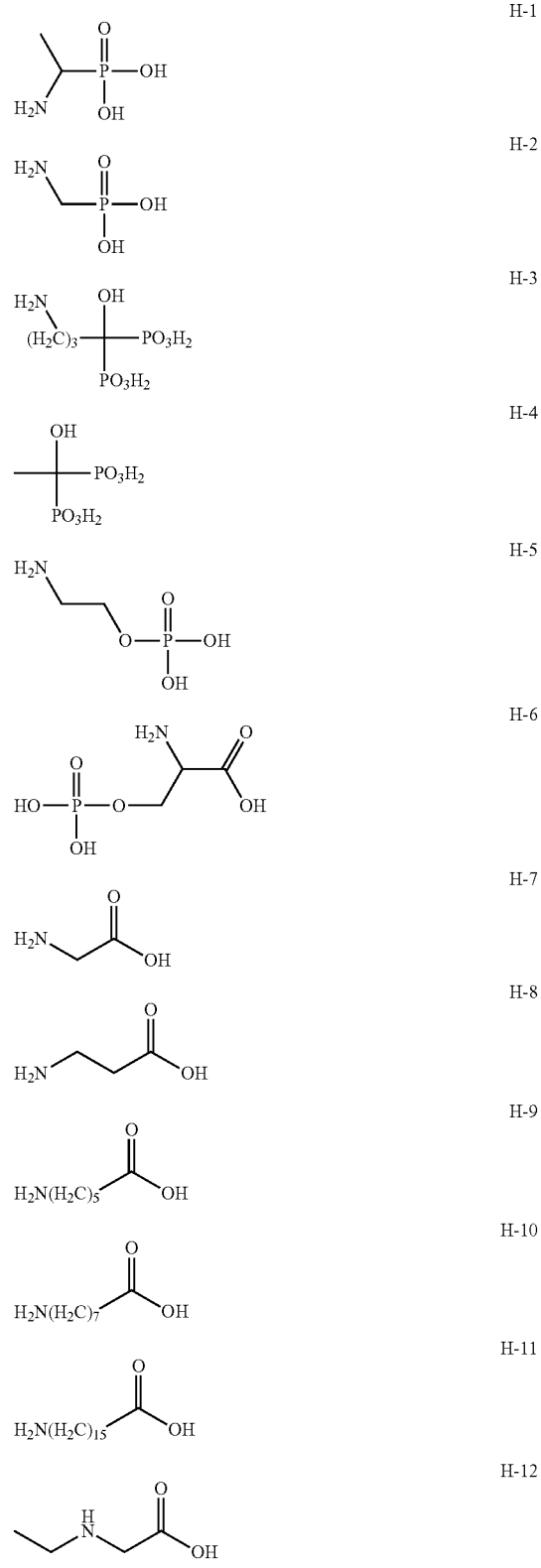

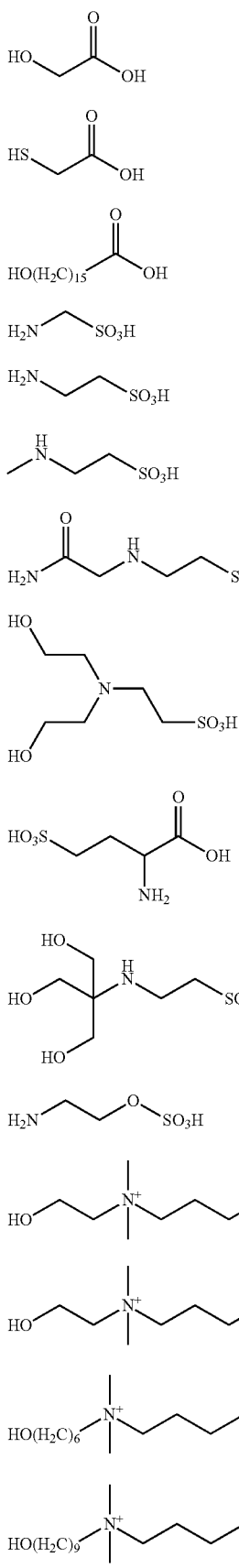
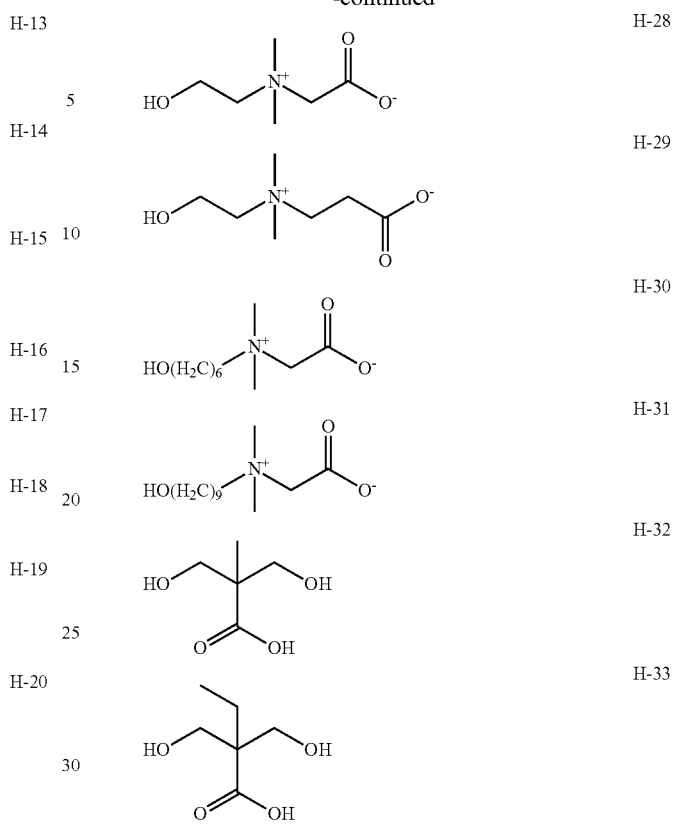

In a case where an isocyanate compound having a hydrophilic group is used in the manufacturing of gel particles having hydrophilic groups on the surfaces, as this isocyanate compound having a hydrophilic group, at least one selected from an adduct of trimethylolpropane (TMP), xylene diisocyanate (XDI), and polyethylene glycol monomethyl ether (EO) (Mitsui Chemicals, Inc., TAKENATE (Registered trademark) D-116N) and a reaction product (an isocyanate compound including a carboxy group) of 2,2-bis(hydroxymethyl) propionic acid (DMPA) and isophorone diisocyanate (IPDI) is preferably used.

<Content of Gel Particles>

The content of the gel particles in the water dispersion of the present disclosure is preferably 1 mass % to 50 mass %, more preferably 3 mass % to 40 mass %, and even more preferably 5 mass % to 30 mass % with respect to a total amount of the water dispersion.

In a case where the content of the gel particles is 1 mass % or greater, adhesiveness is enhanced. In a case where the content of the gel particles is 50 mass % or less, dispersibility becomes excellent.

The content of the gel particles is a value including components such as a photopolymerization initiator and a resin existing inside the gel particles (gaps of the three-dimensional crosslinked structure).

The total solid content of the gel particles in the water dispersion of the present disclosure is preferably 50 mass % or greater, more preferably 60 mass % or greater, even more preferably 70 mass % or greater, even more preferably 80 mass % or greater, and even more preferably 85 mass % or greater with respect to the total solid content of the water dispersion.

<Volume-Average Particle Diameter of Gel Particles>

In view of dispersibility, the volume-average particle diameter of the gel particles is preferably 0.01 μm to 10.0 μm, more preferably 0.01 μm to 5 μm, and even more preferably 0.05 μm to 1 μm.

In the present specification, the "volume-average particle diameter of gel particles" refers to a value measured by a light scattering method.

The measuring of the volume-average particle diameter of the gel particles by a light scattering method is performed by using, for example, LA-910 (Horiba Ltd.).

<Water>

The water dispersion of the present disclosure includes water as a dispersion medium of the gel particles.

The content of water in the water dispersion of the present disclosure is not particularly limited. For example, the content thereof is preferably 10 mass % to 99 mass %, more preferably 20 mass % to 95 mass %, even more preferably 30 mass % to 90 mass %, and particularly preferably 50 mass % to 90 mass % with respect to the total amount of the water dispersion.

<Colorant>

The water dispersion of the present disclosure may include at least one colorant.

The colorant is not particularly limited and can be arbitrarily selected from well-known colorants such as a pigment, a water soluble dye, and a dispersed dye. Among these, in view of excellent weather resistance and opulent color reproducibility, it is more preferable that a pigment is included as the colorant.

The pigment is not particularly limited, and can be appropriately selected depending on the purposes. Examples of the pigment include well-known organic pigments and inorganic pigments, and also include resin particles colored with a dye, a commercially available pigment dispersion, or a surface-treated pigment (for example, a dispersion obtained by dispersing a pigment as a dispersion medium in water, a liquid organic compound, or an insoluble resin and a dispersion obtained by treating a pigment surface with a resin or a pigment derivative).

Examples of the organic pigment and the inorganic pigment include a yellow pigment, a red pigment, a magenta pigment, a blue pigment, a cyan pigment, a green pigment, an orange pigment, a violet pigment, a brown pigment, a black pigment, and a white pigment.

In a case where the pigment is used as a colorant, in a case where pigment particles are prepared, a pigment dispersing agent may be used, if necessary.

With respect to the colorant and pigment dispersing agent such as a pigment, paragraphs [0180] to [0200] of JP2014-040529A can be suitably referred to.

<Other Components>

The water dispersion of the present disclosure may contain other components in addition to the above, if necessary.

The other components may be included in the gel particles or may not be included in the gel particles.

(Sensitizer)

The water dispersion of the present disclosure may contain a sensitizer.

In a case where the water dispersion of the present disclosure contains a sensitizer, decomposition of the photopolymerization initiator due to the irradiation with active energy rays can be promoted.

The sensitizer is a material that absorbs specific active energy rays and in an electron excited state. The sensitizer in an electron excited state comes into contact with a photopolymerization initiator and generates an action such as electron transfer, energy transfer, heat generation. Accordingly, a chemical change of the photopolymerization initiator, that is, decomposition or generation of radical, acid, or base is promoted.

Examples of the well-known sensitizers that can be used together include benzophenone, thioxanthone, isopropylthioxanthone, anthraquinone, a 3-acyl coumarin derivative, terphenyl, styrylketone, 3-(aroylmethylene) thiazoline, camphorquinone, eosin, rhodamine, and erythrosine.

As the sensitizer, a compound represented by Formula (i) disclosed in JP2010-24276A or a compound represented by Formula (I) disclosed in JP1994-107718A (JP-H06-107718A) can be suitably used.

Among these, in view of suitability to LED light and reactivity with a photopolymerization initiator, the sensitizer is preferably at least one selected from thioxanthone, isopropylthioxanthone, and benzophenone, more preferably at least one selected from thioxanthone and isopropylthioxanthone, and even more preferably isopropylthioxanthone.

In a case where the water dispersion of the present disclosure contains a sensitizer, the sensitizer may be used singly or two or more kinds thereof may be used in combination.

In a case where the water dispersion of the present disclosure contains a sensitizer, since reactivity such as a photopolymerization initiator is enhanced, the sensitizer is preferably included in the gel particles.

In a case where the water dispersion of the present disclosure contains a sensitizer, the content of the sensitizer is preferably 0.1 mass % to 25 mass %, more preferably 0.5 mass % to 20 mass %, and even more preferably 1 mass % to 15 mass % with respect to a total solid content of the gel particles.

(Surfactant)

The water dispersion of the present disclosure may contain a surfactant.

In a case where the water dispersion of the present disclosure contains a surfactant, dispersibility of the gel particles can be enhanced.

Examples of the surfactant include higher fatty acid salt, alkyl sulfate, alkyl ester sulfate, alkyl sulfonate, alkyl benzene sulfonate, sulfosuccinate, naphthalene sulfonate, alkyl phosphate, polyoxyalkylene alkyl ether phosphate, polyoxyalkylene alkyl phenyl ether, polyoxyethylene polyoxypropylene glycol, glycerin ester, sorbitan ester, polyoxyethylene fatty acid amide, and amine oxide.

Among these, the surfactant is preferably at least one surfactant selected from alkyl sulfate, alkyl sulfonate, and alkyl benzene sulfonate and particularly preferably alkyl sulfate.

In view of dispersibility of the gel particles, the surfactant is preferably alkyl sulfate having an alkyl chain length of 8 to 18, more preferably at least one selected from sodium dodecyl sulfate (SDSNa, alkyl chain length: 12) and sodium cetyl sulfate (SCSNa, alkyl chain length: 16), and even more preferably sodium cetyl sulfate (SCSNa).

The water dispersion of the present disclosure may contain other surfactants in addition to the above surfactant. Examples of the other surfactants include surfactants disclosed in JP1987-173463A (JP-S62-173463A) and JP1987-183457A (JP-S62-183457A). Examples of the other surfactants include a nonionic surfactant such as polyoxyethylene alkyl ethers, polyoxyethylene alkyl allyl ethers, acetylene glycols, polyoxyethylene/polyoxypropylene block copolymers, and siloxanes.

As the surfactant, an organofluoro compound may be used.

The organofluoro compound is preferably hydrophobic. Examples of the organofluoro compound include a fluorine-based surfactant, an oily fluorine compound (for example, fluorine oil), and a solid-like fluorine compound resin (for example, a tetrafluoroethylene resin), and also include compounds disclosed in JP1982-9053A (JP-S57-9053A) (Sections 8 to 17), and JP1987-135826B (JP-S62-135826B).

(Polymerization Inhibitor)

The water dispersion of the present disclosure may contain a polymerization inhibitor.

In a case where the water dispersion of the present disclosure contains a polymerization inhibitor, preservation stability of the water dispersion can be further enhanced.

Examples of the polymerization inhibitor include p-methoxyphenol, quinones (for example, hydroquinone, benzoquinone, and methoxybenzoquinone), phenothiazine, catechols, alkylphenols (for example, dibutylhydroxytoluene (BHT)), alkyl bisphenols, zinc dimethyl dithiocarbamate, copper dimethyldithiocarbamate, copper dibutyldithiocarbamate, copper salicylate, thiodipropionic acid esters, mercaptobenzimidazole, phosphites, 2,2,6,6-tetramethylpiperidine-1-oxyl (TEMPO), 2,2,6,6-tetramethyl-4-hydroxypiperidin-1-oxyl (TEMPOL), cupferron Al, and tris(N-nitroso-N-phenylhydroxylamine) aluminum salt.

Among these, at least one selected from p-methoxyphenol, catechols, quinones, alkylphenols, TEMPO, TEMPOL, cupferron Al, and tris(N-nitroso-N-phenylhydroxylamine) aluminum salt are preferable, at least one selected from p-methoxyphenol, hydroquinone, benzoquinone, BHT, TEMPO, TEMPOL, cupferron Al, and tris(N-nitroso-N-phenylhydroxylamine) aluminum salt is more preferable.

(Ultraviolet Absorbing Agent)

The water dispersion of the present disclosure may contain an ultraviolet absorbing agent.

In a case where the water dispersion of the present disclosure contains an ultraviolet absorbing agent, weather fastness of the film can be enhanced.

Examples of the ultraviolet absorbing agent include the well-known ultraviolet absorbing agent, for example, a benzotriazole-based compound, a benzophenone-based compound, a triazine-based compound, and a benzoxazole-based compound.

(Organic Solvent)

The water dispersion of the present disclosure may contain an organic solvent.

In a case where the water dispersion of the present disclosure contains an organic solvent, adhesiveness between the film and the base material can be enhanced.

In a case where the water dispersion of the present disclosure contains an organic solvent, the content of the organic solvent is preferably 0.1 mass % to 5 mass % with respect to a total amount of the water dispersion.

Specific examples of the organic solvent are as follows.

Alcohols (for example, methanol, ethanol, propanol, isopropanol, butanol, isobutanol, secondary butanol, tertiary butanol, pentanol, hexanol, cyclohexanol, and benzyl alcohol), Polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, and 2-methyl propanediol), Polyhydric alcohol ethers (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), Amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyl diethylenetriamine, and tetramethylpropylenediamine), Amides (for example, formamide, N,N-dimethylformamide, and N,N-di methyl acetamide), Heterocyclic rings (for example, 2-pyrrolidone, N-methyl-2-pyrrolidone, cyclohexylpyrrolidone, 2-oxazolidone, 1,3-dimethyl-2-imidazolidinone, and γ-butyrolactone), Sulfoxides (for example, dimethylsulfoxide), Sulfones (for example, sulfolane), and Other (urea, acetonitrile, and acetone)

In view of film properties, adhesiveness, and jettability control, the water dispersion of the present disclosure may contain a photopolymerization initiator, a polymerizable compound, a water soluble resin, and a water-dispersible resin outside the gel particles, if necessary.

Here, the expression "a water dispersion contains a photopolymerization initiator outside the gel particles" means that the water dispersion contains a photopolymerization initiator that is not included in the gel particles. The same is applied to a case of a polymerizable compound, a water soluble resin, a water-dispersible resin, and the like are contained outside the gel particles.

(Photopolymerization Initiator that can be Contained Outside the Gel Particles)

Examples of the photopolymerization initiator that can be contained outside the gel particles include photopolymerization initiators which are the same as the above photopolymerization initiators (photopolymerization initiator included in the gel particles). As the photopolymerization initiator that can be contained outside the gel particles, a water-soluble or water-dispersible photopolymerization initiator is preferable. In this point of view, preferable examples thereof include DAROCUR (Registered trademark) 1173, IRGACURE (Registered trademark) 2959, IRGACURE (Registered trademark) 754, DAROCUR (Registered trademark) MBF, IRGACURE (Registered trademark) 819DW, IRGACURE (Registered trademark) 500 (above manufactured by BASF SE).

The expression "water solubility" in the photopolymerization initiator that can be contained outside the gel particles refers to properties in which a dissolution amount to 100 g of distilled water at 25° C. in a case where drying is performed for two hours at 105° C. exceeds 1 g.

The expression "water dispersibility" in the photopolymerization initiator that can be contained outside the gel particles means properties which are water insoluble and dispersed in water. Here, the expression "water insoluble" refers to properties in which a dissolution amount to 100 g of distilled water at 25° C. is 1 g or less in a case where the compound is dried at 105° C. for two hours.

(Polymerizable Compound that can be Contained Outside the Gel Particles)

Examples of the polymerizable compound that can be contained outside the gel particles include a compound having an ethylenically unsaturated group and a radical polymerizable compound such as acrylonitrile, styrene, unsaturated polyester, unsaturated polyether, unsaturated polyamide, and unsaturated urethane.

Among these, as the polymerizable compound that can be contained outside the gel particles, a compound having an ethylenically unsaturated group is preferable, and a compound having a (meth)acryloyl group is particularly preferable.

As the polymerizable compound that can be contained outside the gel particles, a water-soluble or water-dispersible polymerizable compound is preferable.

The "water solubility" in the polymerizable compound that can be contained outside the gel particles is the same as the above "water solubility" in the "photopolymerization initiator that can be contained outside the gel particles", and the "water dispersibility" in the polymerizable compound that can be contained outside the gel particles is the same as the above "water dispersibility" in the "photopolymerization initiator that can be contained outside the gel particles".

In view of water solubility or water dispersibility, as the polymerizable compound, a compound having at least one selected from an amide structure, a polyethylene glycol structure, a polypropylene glycol structure, a carboxyl group, or a salt of a carboxyl group is preferable.

In view of the water solubility or water dispersibility, as the polymerizable compound that can be contained outside the gel particles, for example, at least one selected from (meth)acrylic acid, sodium (meth)acrylate, potassium (meth)acrylate, N,N-dimethylacrylamide, N,N-diethylacrylamide, morpholine acrylamide, N-2-hydroxyethyl (meth)acrylamide, N-vinyl pyrrolidone, N-vinyl caprolactam, 2-hydroxyethyl (meth)acrylate, 3-hydroxypropyl (meth)acrylate, 2-hydroxypropyl (meth)acrylate, glycerin monomethacrylate, N-[tris(3-acryloylaminopropyloxymethylene)methyl]acrylamide, diethylene glycol bis(3-acryloylaminopropyl) ether, polyethylene glycol di(meth)acrylate, or polypropylene glycol di(meth)acrylate is preferable, and at least one selected from (meth)acrylic acid, N,N-di methyl acryl amide, N-2-hydroxyethyl (meth)acrylamide, 2-hydroxyethyl (meth)acrylate, glycerin monomethacrylate, N-[tris(3-acryloylaminopropyloxymethylene)methyl]acrylamide, diethylene glycol bis(3-acryloylaminopropyl) ether, polyethylene glycol di(meth)acrylate, or polypropylene glycol di(meth)acrylate is more preferable.

(Water Soluble Resin or Water-Dispersible Resin that can be Contained Outside the Gel Particles)

The structures of the water soluble resin or the water-dispersible resin that can be contained outside the gel particles are not particularly limited, and may be any structures. Examples of the water soluble resin or the water-dispersible resin that can be contained outside the gel particles include a chain-shaped structure, a ramified (branched) structure, a star-shaped structure, a crosslinked structure, and a mesh-shaped structure.

The expression "water soluble" in the water soluble resin that can be contained outside the gel particles has the same meaning as that of the expression "water soluble" in the "photopolymerization initiator that can be contained outside the gel particles", and the expression "water dispersibility" in the water-dispersible resin that can be contained outside the gel particles has the same meaning as that of the expression "water dispersibility" in the "photopolymerization initiator that can be contained outside the gel particles".

As the water soluble resin or the water-dispersible resin, a resin having a functional group selected from a carboxy group, a salt of the carboxy group, a sulfo group, a salt of the sulfo group, a sulfuric acid group, a salt of the sulfuric acid group, a phosphonic acid group, a salt of the phosphonic acid group, a phosphoric acid group, a salt of the phosphoric acid group, an ammonium base, a hydroxyl group, a carboxylic acid amide group, and an alkyleneoxy group is preferable.

As the counter cation of the salt, an alkali metal cation such as sodium and potassium, an alkali earth metal cation such as calcium and magnesium, an ammonium cation, or a phosphonium cation is preferable, an alkali metal cation is particularly preferable.

As an alkyl group included in an ammonium group of an ammonium base, a methyl group or an ethyl group is preferable.

As the counter anion of the ammonium base, a halogen anion such as chlorine and bromine, a sulfate anion, a nitrate anion, a phosphate anion, a sulfonate anion, a carboxylate anion, or a carbonate anion is preferable, and a halogen anion, a sulfonate anion, or a carbonate anion is particularly preferable.

As a substituent on the nitrogen atom of the carboxylic acid amide group, an alkyl group having 8 or less carbon atoms is preferable, and an alkyl group having 6 or less carbon atoms is particularly preferable.

The resin having an alkyleneoxy group preferably has an alkyleneoxy chain consisting of repetition of an alkyleneoxy group. The number of the alkyleneoxy groups included in the alkyleneoxy chain is preferably 2 or greater and particularly preferably 4 or greater.

<Preferable Physical Properties of Water Dispersion>

In a case where the water dispersion is at 25° C. to 50° C., the viscosity of the water dispersion of the present disclosure is preferably 3 mPa·s to 15 mPa·s and more preferably 3 mPa·s to 13 mPa·s. Particularly, as the water dispersion of the present disclosure, the water dispersion of which viscosity at 25° C. is 50 mPa·s or less is preferable. In a case where the viscosity of the water dispersion is in the above range, high jetting stability can be realized, in a case where the water dispersion is applied to ink jet recording as the ink composition.

The viscosity of the water dispersion is obtained by using a viscometer: VISCOMETER TV-22 (manufactured by Toki Sangyo Co., Ltd.).

[Method of Producing Water Dispersion of Gel Particles]

A method of producing the water dispersion of the present disclosure is not particularly limited, as long as the water dispersion of gel particles having the above configuration can be produced.

In view of obtaining the water dispersion of the present disclosure, the method of producing the water dispersion of the present disclosure is preferably a method of producing a water dispersion of gel particles of this embodiment.

A method (hereinafter, also referred to as a "producing method of this embodiment") of producing the water dispersion of gel particles of this embodiment includes an emulsification step of obtaining an emulsion by mixing any one oil phase component selected from an oil phase component (hereinafter, referred to as "Oil Phase Component A") including a photopolymerization initiator, a resin, a trifunctional or higher functional isocyanate compound, a polymerizable monomer, and an organic solvent, an oil phase component (hereinafter, referred to as "Oil Phase Component B") including a photopolymerization initiator, a resin, a trifunctional or higher functional isocyanate compound having a polymerizable group, and an organic solvent, and an oil phase component (hereinafter, referred to as "Oil Phase Component C") including a photopolymerization initiator, a resin, trifunctional or higher functional isocyanate compound having a polymerizable group, a polymerizable monomer, and an organic solvent and a water phase component including water and performing emulsification; and a gelation step of gelling the emulsion by heating.

If necessary, the producing method of the embodiment may have other steps.

According to the producing method of the embodiment, the water dispersion of the present disclosure described above can be easily produced.

Each of the steps in the producing method of this embodiment is described below.

Since specific examples and preferable aspects of the components used in each of the steps are as described in the above section of the water dispersion of gel particles, the descriptions thereof are omitted.

<Emulsification Step>

The emulsification step is a step of obtaining an emulsion by mixing any one oil phase component selected from Oil Phase Component A, Oil Phase Component B, and Oil Phase Component C and a water phase component including water and performing emulsification.

In the emulsification step, any one oil phase component selected from Oil Phase Component A including a photopolymerization initiator, a resin, a trifunctional or higher functional isocyanate compound, a polymerizable monomer, and an organic solvent, Oil Phase Component B including a photopolymerization initiator, a resin, a trifunctional or higher functional isocyanate compound having a polymerizable group, and an organic solvent, and Oil Phase Component C including a photopolymerization initiator, a resin, a trifunctional or higher functional isocyanate compound having a polymerizable group, a polymerizable monomer, and an organic solvent is used as an oil phase component, so as to finally obtain gel particles at least including a photopolymerization initiator and a resin and having a polymerizable group on surfaces or in portions near surfaces.

It is considered that a polymerizable group included in the polymerizable monomer that Oil Phase Component A includes, a trifunctional or higher functional isocyanate compound having a polymerizable group that Oil Phase Component B includes, and a polymerizable monomer and a trifunctional or higher functional isocyanate compound having a polymerizable group that Oil Phase Component C includes become polymerizable groups exists on the surfaces of the gel particles, or on the surfaces and in the portions near the surfaces.

Examples of the organic solvent included in the oil phase component include ethyl acetate and methyl ethyl ketone.

The oil phase component may include other components in addition to the above components, if necessary.

Examples of the other components include compounds having the above hydrophilic groups.

In a case where an oil phase component includes compounds having the above hydrophilic groups, it is possible to obtain gel particles having hydrophilic groups on the surfaces.

The water phase component may include other components in addition to water, if necessary.

In a case where the oil phase component includes a compound having at least one hydrophilic group selected from a carboxy group, a sulfo group, a sulfate group, a phosphonic acid group, or a phosphoric acid group, as a compound having a hydrophilic group, the water phase component may include a neutralizing agent.

In a case where the oil phase component includes a compound having a hydrophilic group and a water phase component includes a neutralizing agent, a hydrophilic group such as a carboxy group is neutralized by mixing the oil phase component and the water phase component, and salt such as a carboxy group is formed. This formed salt also functions as hydrophilic groups of the gel particles. This salt is particularly excellent in the effect of dispersing gel particles in water.

Examples of the neutralizing agent include sodium hydroxide and potassium hydroxide.

In the producing method of this embodiment, in the reaction with an isocyanate group, as a raw material for forming gel particles in a three-dimensional crosslinked structure including at least one bond selected from an urethane bond and an urea bond, in addition to water, polyfunctional alcohol, polyfunctional phenol, polyfunctional amine having a hydrogen atom on a nitrogen atom, or polyfunctional thiol described above may be used.

Specifically, examples thereof include compounds such as polyfunctional alcohol such as propylene glycol, glycerin, and trimethylolpropane, polyfunctional amine such as bis(hexamethylene) triamine, ethylenediamine, and diethylenetriamine, and polyfunctional thiol such as pentaerythritol tetra(3-mercaptopropionate), and polyfunctional alcohol is preferable.

These compounds may be used singly or two or more kinds thereof may be used in combination. These compounds are added to an oil phase component and/or a water phase component, according to the solubility thereof.

In the producing method of this embodiment, in addition to the above raw materials, a surfactant is preferably used. Examples of the surfactant include the above surfactants.

Generally, it is considered that a surfactant having a relatively long hydrophobic group is excellent as the surfactant used in the emulsification dispersion. Examples of the surfactant include surfactants disclosed in "Handbook of Surfactant" (edited by Ichiro Nishi, et al. published by Sangyo Tosho Publishers, Inc., (1980)). Specifically, alkali metal salt such as alkyl sulfate, alkyl sulfonic acid, and alkyl benzene sulfonic acid is preferable, and alkyl sulfate ester salt is more preferable.

In view of dispersion stability, an alkyl chain length of alkyl sulfate ester salt is preferably 12 or greater and more preferably 16 or greater.

The surfactant may be added to any one of an oil phase component and a water phase component. However, solubility to an organic solvent is generally low, and thus the organic solvent is added to a water phase component.

The amount of the surfactant is preferably 0.1 mass % to 5 mass % and more preferably 0.5 mass % to 3 mass % with respect to a total solid content of the oil phase component.

A total amount (hereinafter, also referred to as a "total solid content") obtained by excluding an organic solvent and water from the oil phase component and the water phase component in the emulsification step corresponds to a total solid content of the produced gel particles.

The amount of the photopolymerization initiator in the oil phase component is not particularly limited and is preferably 0.1 mass % to 25 mass % with respect to the total solid content.

The amount of the resin in the oil phase component is not particularly limited and is preferably, for example, 0.5 mass % to 15 mass % with respect to the total solid content.

The amount of the trifunctional or higher functional isocyanate compound (or the trifunctional or higher functional isocyanate compound having a polymerizable group) in the oil phase component is not particularly limited, and is preferably, for example, 10 mass % to 70 mass % with respect to the total solid content.

In a case where the oil phase component includes a polymerizable monomer, the amount of the polymerizable monomer in the oil phase component is not particularly limited, and examples thereof is preferably, for example, 0.1 mass % to 75 mass % with respect to the total solid content.

The amount of the organic solvent is not particularly limited and is suitably selected from kinds and amounts of the components and the like included in the oil phase component.

The amount of water is not particularly limited and is suitably selected from kinds and amounts of components and the like included in the oil phase component.

In a case where the oil phase component includes a compound having a hydrophilic group, the amount of the compound having a hydrophilic group in the oil phase component is not particularly limited. For example, the amount is preferably 0.1 mass % to 40 mass % with respect to the total solid content.

Each of the components included in the oil phase component may be simply mixed, all the components may be mixed at the same time, or the components may be divided into several portions so as to be mixed.

A method of mixing the oil phase component and the water phase component is not particularly limited, and examples thereof include mixing by stirring.

A method of emulsifying the mixture obtained by the mixing is not particularly limited, and examples thereof include emulsification by an emulsification device (for example, a disperser) such as a homogenizer.

A rotation speed of the disperser in the emulsification, for example, is 5,000 rpm to 20,000 rpm and preferable 10,000 rpm to 15,000 rpm.

The rotation time in the emulsification, for example, is 1 minute to 120 minutes, preferably 3 minutes to 60 minutes, more preferably 3 minutes to 30 minutes, and even more preferably 5 minutes to 15 minutes.

<Gelation Step>

The gelation step is a step of gelling the emulsion by heating.

The gelation step is a step of obtaining a water dispersion of gel particles having a three-dimensional crosslinked structure including at least one selected from an urethane bond or an urea bond and a polymerizable group and at least including a photopolymerization initiator and a resin, by heating the emulsion, reacting the trifunctional or higher functional isocyanate compound and water, and crosslinking the isocyanate groups with each other.

The heating temperature (reaction temperature) of the emulsion in the gelation step is preferably 35° C. to 70° C. and more preferably 40° C. to 60° C.

The heating time (reaction time) in the gelation step is preferably 6 hours to 50 hours, more preferably 12 hours to 40 hours, and particularly preferably 15 hours to 35 hours.

The gelation step preferably includes a stage of distilling an organic solvent from an emulsion.

The producing method of the embodiment may have other steps in addition to the emulsification step, and the gelation step, if necessary.

Examples of the other step include a step of adding the other components such as a colorant to the water dispersion of the gel particles obtained in the gelation step.

The other added components are as described above as the other components that can contain the water dispersion.

<Image Forming Method>

The image forming method of the present disclosure has an application step of using the water dispersion of the present disclosure as ink and applying a water dispersion as ink on a recording medium and an irradiation step of irradiating the water dispersion applied on the recording medium with the active energy rays.

In a case where these steps are performed, an image having adhesiveness is formed on the recording medium. This formed image has excellent hardness.

As the recording medium, the above base material (for example, plastic base material) can be used.

(Application Step)

The application step is a step of applying the water dispersion of the present disclosure on the recording medium.

As an aspect of applying the water dispersion to the recording medium, an aspect of applying the water dispersion by an ink jet method is preferable.

The application of the water dispersion by an ink jet method can be performed by using the well-known ink jet recording devices.

An ink jet recording device is not particularly limited, a well-known ink jet recording device that can achieve the desired resolution can be arbitrarily selected to be used.

That is, any one of the well-known ink jet recording devices including a commercially available product can discharge the water dispersion to a recording medium by the image forming method of the present disclosure.

Examples of the ink jet recording device include devices including an ink supplying method, a temperature sensor, and heating means.

Examples of the ink supplying method include an original tank including the water dispersion of the present disclosure, a supply piping, an ink supply tank just before an ink jet head, a filter, and a piezo-type ink jet head. The piezo-type ink jet head can be driven so as to eject multi-sized dots of preferably 1 pl to 100 pl and more preferably 8 pl to 30 pl at a resolution of preferably 320 dpi×320 dpi to 4,000 dpi×4,000 dpi (dot per inch), more preferably 400 dpi×400 dpi to 1,600 dpi×1,600 dpi, and even more preferably 720 dpi×720 dpi. The dpi (dot per inch) according to the present disclosure represents the number of dots per 2.54 cm (1 inch).

(Irradiation Step)

The irradiation step is a step of irradiating the water dispersion applied to the recording medium with the active energy rays.

In a case where the water dispersion applied to the recording medium is irradiated with active energy rays, the crosslinking reaction of the gel particles in the water dispersion proceeds, the image is fixed, and the film hardness of the image can be improved.

Examples of the active energy rays that can be used in the irradiation step include ultraviolet rays (UV light), and visible rays, electron beams. Among these, ultraviolet rays (UV light) are preferable.

The peak wavelength of the active energy rays (light) depends on absorption properties of the used sensitizer and is preferably 200 nm to 405 nm, more preferably 220 nm to 390 nm, and even more preferably 220 nm to 385 nm.

In a case where the photopolymerization initiator and the sensitizer are not used together, the peak wavelength is preferably 200 nm to 310 nm and more preferably 200 nm to 280 nm.

For example, the exposure surface illuminance in a case of irradiation with the active energy rays (light) may be 10 mW/cm$^2$ to 2,000 mW/cm$^2$ and is preferably 20 mW/cm$^2$ to 1,000 mW/cm$^2$.

As the light source for generating the active energy rays (light), a mercury lamp, a metal halide lamp, a UV fluorescent lamp, a gas laser, a solid-state laser, and the like are widely known.

The replacement of the light sources exemplified above into a semiconductor ultraviolet light emitting device is industrially and environmentally useful.

Among these, among semiconductor ultraviolet light emitting devices, light emitting diode (LED) and a laser diode (LD) are compact, has a long lifetime, high efficiency, and low cost, and is expected as a light source.

As the light source, a metal halide lamp, an extra high pressure mercury lamp, a high pressure mercury lamp, a medium pressure mercury lamp, a low pressure mercury lamp, LED, and a blue-violet laser are preferable.

Among these, in a case where the photopolymerization initiator and the sensitizer are used together, an extra high pressure mercury lamp that can perform irradiation with light at a wavelength of 365 nm, 405 nm, or 436 nm, a high pressure mercury lamp that can perform irradiation with light at a wavelength of 365 nm, 405 nm, or 436 nm, LED that can perform irradiation with light at a wavelength of 355 nm, 365 nm, 385 nm, and 395 nm, or 405 nm is more preferable, and LED that can perform irradiation with light at a wavelength of 355 nm, 365 nm, 385 nm, 395 nm, or 405 nm is most preferable.

A water dispersion (that is, ink) used in the image forming method of the present disclosure includes a photopolymerization initiator in gel particles having a three-dimensional crosslinked structure, and thus a photopolymerization initiator that has not been able to be used in an aqueous ink in the related art, for example, a photopolymerization initiator such as an acylphosphine oxide compound having excellent sensitivity to light but having low solubility to water can be selected.

In a case where a photopolymerization initiator such as an acylphosphine oxide compound having an absorption wavelength of 350 nm to 450 nm and a sensitizer such as a thioxanthone compound are used together, LED is particularly preferable as a light source.

In a case where a photopolymerization initiator such as an acylphosphine oxide compound and a sensitizer such as a thioxanthone compound are used together, active energy rays (light) having a longer wavelength than ultraviolet rays and a peak wavelength of 380 nm to 450 nm can be preferably used.

In a case where the photopolymerization initiator and the sensitizer are not used together, a metal halide lamp, a medium pressure mercury lamp, or a low pressure mercury lamp is preferable.

In the irradiation step, the irradiation time of the water dispersion applied on the recording medium with the active energy rays may be 0.01 seconds to 120 seconds and preferably 0.1 seconds to 90 seconds.

With respect to the irradiation condition of the active energy rays and basic irradiation method, conditions disclosed in JP1985-132767A (JP-S60-132767A) can be suitably referred to.

Specifically, a method of scanning the head unit and the light sources by a so-called shuttle method of providing the light sources on both sides of the head unit including the ink ejection device and a method of performing irradiation with active energy rays by a separate light source without driving are preferable as an irradiation method with active energy rays.

The irradiation with the active energy rays is preferably performed for a certain period of time (for example, for 0.01 seconds to 120 seconds and preferably for 0.01 seconds to 60 seconds) after water dispersion is landed and dried by heating.

(Heating and Drying Step)

If necessary, the image forming method of the present disclosure may have a heating and drying step of heating and drying the water dispersion on the recording medium before the irradiation step and after the application step.

The heating means for performing heating and drying is not particularly limited. However, examples thereof include heating means such as a heat drum, hot air, an infrared lamp, a heat oven, and a heat plate.

The heating temperature is preferably 40° C. or higher, more preferably 40° C. to 150° C., and even more preferably 40° C. to 80° C.

The heating time can be appropriately set by adding the composition of the water dispersion, the printing speed, and the like.

EXAMPLES

Hereinafter, the invention is specifically described with reference to the specific examples, but the invention is not limited to the following examples without departing from the gist of the invention.

Examples are described by being divided into an aspect (hereinafter, referred to as a "first aspect") in which the resin included in the gel particles is a resin not having a polymerizable group and an aspect (hereinafter, referred to as a "second aspect") in which the resin included in the gel particles is a resin having a polymerizable group.

Examples of First Aspect

Synthesis of Isocyanate Compound

Synthesis Example 1-1: NCO 104

10 g of trimethylolpropane (TMP, compound having two or more active hydrogen groups), 57.91 g of 1,3-bis(isocyanatomethyl)cyclohexane (HXDI, difunctional isocyanate compound), and 126.11 g of ethyl acetate (AcOEt, organic solvent) were added to a three-neck flask and were heated to 50° C. 0.194 g of NEOSTAN (Registered trademark) U-600 (inorganic bismuth catalyst, Nitto Kasei Co., Ltd.) was added to this heated three-neck flask, and reaction was performed for three hours, so as to obtain Isocyanate Compound NCO 104.

Synthesis Example 2-1: NCO 201

10 g of trimethylolpropane (TMP, a compound having two or more active hydrogen groups), 57.91 g of 1,3-bis(isocyanatomethyl)cyclohexane (HXDI, difunctional isocyanate compound), and 169.62 g of ethyl acetate (AcOEt, organic solvent) were added to a three-neck flask and were heated to 50° C. 0.261 g of NEOSTAN (Registered trademark) U-600 (inorganic bismuth catalyst) was added to this heated three-neck flask and reaction was performed for three hours. 23.43 g of BLEMMER (Registered trademark) AP-400 (hydroxyl group-containing acrylate, polymerizable group introducing monomer, n=6, NOF Corporation) and 0.04 g of dibutylhydroxytoluene (BHT, polymerization inhibitor) were added to this three-neck flask after the reaction, and reaction was performed for three hours at 50° C., so as to obtain Isocyanate Compound NCO 201.

Synthesis Example 3-1: NCO 206

50 g of DURANATE (Registered trademark) TKA-100 (isocyanurate-type trifunctional isocyanate compound, containing 21.7 mass % of isocyanate group, Asahi Kasei Corporation), 122.88 g of ethyl acetate (AcOEt, organic solvent), 16.16 g of BLEMMER (Registered trademark) AP-400 (polymerizable group introducing monomer), and 0.033 g of dibutylhydroxytoluene (BHT, polymerization inhibitor) were added to a three-neck flask and were heated to 50° C. 0.189 g of NEOSTAN (Registered trademark) U-600 (inorganic bismuth catalyst) was added to this heated three-neck flask, and reaction was performed for three hours, so as to obtain Isocyanate Compound NCO 206.

Compound NCO 201 by changing BLEMMER (Registered trademark) AP-400 in the synthesis of Isocyanate Compound NCO 201 to polymerizable group introducing monomers presented in Table 4 and preparing compositions as presented in Table 4.

Synthesis Example 7-1: NCO 205 and NCO 207

Isocyanate Compounds NCO 205 and NCO 207 were synthesized in the same method as in Isocyanate Compound NCO 206, by changing DURANATE (Registered trademark) TKA-100 in the synthesis of Isocyanate Compound NCO 206 to trifunctional or higher functional isocyanate compounds presented in Table 4 and preparing compositions as presented in Table 4.

TABLE 3

| | | | Composition | |
| --- | --- | --- | --- | --- |
| | | Structure | Compound having two or more active | Difunctional |
| Compound No. | Compound having two or more active hydrogren groups | Difunctional isocyanate compound | hydrogren groups (mol equivalent) | isocyanate compound (mol equivalent) |
| NCO 101 | 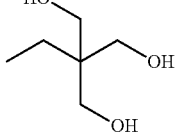 Trimethylol propane | 2,4-Tolylene diisocyanate (TDI) | 1 | 4 |
| NCO 102 | | m-Xylylene diisocyanate (XDI) | 1 | 4 |
| NCO 103 | | Hexamethylene diisocyanate (HDI) | 1 | 4 |
| NCO 104 | | 1,3-Bis(isocyanatomethyl)cyclohexane (HXDI) | 1 | 4 |
| NCO 105 | | Isophorone diisocyanate (IPDI) | 1 | 4 |

Synthesis Example 4-1: Isocyanate Compound 2 Having Hydrophilic Group 45 g of 2,2-bis (hydroxymethyl) propionic acid (DMPA, compounds having hydrophilic group), 223.72 g of isophorone diisocyanate (IPDI, difunctional isocyanate compound), and 499.05 g of ethyl acetate (AcOEt, organic solvent) were added to this three-neck flask and were heated to 50° C. 0.7677 g of NEOSTAN (Registered trademark) U-600 (inorganic bismuth catalyst) was added to this heated three-neck flask, and reaction was performed for three hours, so as to obtain Isocyanate Compound 2 (isocyanate compound having carboxy group) having a hydrophilic group.

Synthesis Example 5-1: NCO 101, NCO 102, NCO 103, and NCO 105

Isocyanate Compounds NCO 101, NCO 102, NCO 103, and NCO 105 were synthesized in the same method as in Isocyanate Compound NCO 104, except for changing 1,3-bis(isocyanatomethyl)cyclohexane (HXDI) in the synthesis of Isocyanate Compound NCO 104 to difunctional isocyanate compounds presented in Table 3 and preparing compositions as presented in Table 3.

Synthesis Example 6-1: NCO 202, NCO 203, and NCO 204

Isocyanate Compound NCO 202, NCO 203, and NCO 204 were synthesized in the same method as in Isocyanate

TABLE 4

| | Structure | | Composition Amount of active hydrogen groups of |
| --- | --- | --- | --- |
| Compound No. | Isocyanate compound (Trifunctional or higher functional) | Polymerizable group introducing monomer | polymerizable group introducing monomer with respect to NCO group of isocyanate compound (mol %) |
| NCO 201 | NCO 104 | BLEMMER AP-400 | 15 |
| NCO 202 | NCO 104 | BLEMMER AE-400 | 15 |
| NCO 203 | NCO 104 | DA212 | 15 |
| NCO 204 | NCO 104 | DA920 | 15 |
| NCO 205 | D-127 | BLEMMER AP-400 | 15 |
| NCO 206 | DURANATE TKA-100 | BLEMMER AP-400 | 15 |
| NCO 207 | DURANATE TSE-100 | BLEMMER AP-400 | 15 |

Manufacturing of Water Dispersion

Example 1-1

<Emulsification Step>
—Manufacturing of Oil Phase Component—
39 g of Isocyanate Compound NCO 201 (trifunctional or higher functional isocyanate compound having polymerizable group, solid content: 35 mass %), 3.5 g of TAKENATE (Registered trademark) D-116N (adduct of trimethylolpropane (TMP), xylene diisocyanate (XDI), and polyethylene glycol monomethyl ether (E090), 50 mass % ethyl acetate solution, Isocyanate Compound 1 having a hydrophilic group, hydrophilic group: a group having a polyether structure, Mitsui Chemicals, Inc.), 1 g of IRGACURE (Registered trademark) 907 (2-methyl-1-(4-methylthiophenyl)-2-morpholinopropan-1-one, photopolymerization initiator, BASF SE), and 5 g of P-1 (resin not having a polymerizable group: acrylic resin, copolymer of methyl methacrylate and butyl methacrylate, Sigma-Aldrich Corporation) were dissolved in 24 g of ethyl acetate (organic solvent), so as to obtain an oil phase component.

—Manufacturing of Water Phase Component—

0.4 g of sodium dodecyl sulfate (SDS, surfactant) was dissolved in 50 g of deionized water, so as to obtain a water phase component.

The water phase component was added to and mixed with the oil phase component, the obtained mixture was emulsified by using a homogenizer, so as to obtain an emulsion at 12,000 rpm for 10 minutes.

<Gelation Step>

The obtained emulsion was added to 25 g of deionized water and was stirred for 30 minutes at room temperature, and stirring was further performed for three hours at 50° C., so as to filter out ethyl acetate from the emulsion. The obtained liquid was stirred for 24 hours at 50° C., so as to form particles in the liquid. The liquid including particles was diluted in deionized water such that the concentration of solid contents (that is, content of particles) was 20 mass %, so as to obtain a water dispersion (water dispersion of Particles 1-1) of Example 1-1.

Examples 2-1 to 7-1

Water dispersions (water dispersions of Particles 2-1 to 7-1) of Examples 2-1 to 7-1 were manufactured in the same operation as in Example 1-1 except for changing a trifunctional or higher functional isocyanate compound (Isocyanate Compound NCO 201) having a polymerizable group used in the manufacturing of the oil phase component in Example 1-1, to trifunctional or higher functional isocyanate compounds having polymerizable groups presented in Table 5.

Example 8-1

A water dispersion (water dispersion of Particles 8-1) of Example 8-1 was manufactured in the same operation as Example 1-1 except for changing a surfactant (sodium dodecyl sulfate (SDS)) used in the manufacturing of the water phase component in Example 1-1 to surfactants presented in Table 5.

Example 9-1

<Emulsification Step>

—Manufacturing of Oil Phase Component—

19 g of Isocyanate Compound NCO 104 (trifunctional or higher functional isocyanate compound), 3.5 g of TAKENATE (Registered trademark) D-116N (Isocyanate Compound 1 having a hydrophilic group), 1 g of IRGACURE (Registered trademark) 907 (photopolymerization initiator), 5 g of P-1 (resin not having a polymerizable group), and 6.5 g of diacrylate of a neopentyl glycol propylene oxide adduct (NPGPODA, difunctional polymerizable monomer, Sartomer) were dissolved in 34 g of ethyl acetate (organic solvent), so as to obtain an oil phase component.

—Manufacturing of Water Phase Component—

0.4 g of sodium cetyl sulfate (SCS, surfactant) was dissolved in 50 g of deionized water, so as to obtain a water phase component.

The water phase component was added to and mixed with the oil phase component and the obtained mixture was emulsified for 10 minutes at 12,000 rpm by using a homogenizer, so as to obtain an emulsion.

<Gelation Step>

The obtained emulsion was added to 25 g of deionized water and was stirred for 30 minutes at room temperature, and stirring was further performed for three hours at 50° C., so as to filter out ethyl acetate from the emulsion. The obtained liquid was stirred for 24 hours at 50° C., so as to form particles in the liquid. The liquid including particles was diluted in deionized water such that the concentration of solid contents become 20 mass %, so as to obtain a water dispersion (water dispersion of Particles 9-1) of Example 9-1.

Examples 10-1 to 12-1

Water dispersions (water dispersions of Particles 10-1 to 12-1) of Examples 10-1 to 12-1 were manufactured in the same operation as in Example 9-1, except for changing a polymerizable monomer (neopentyl glycol propylene oxide adduct diacrylate (NPGPODA)) used in the manufacturing of the oil phase component in Example 9-1 to polymerizable monomers presented in Table 5.

Examples 13-1 to 18-1

Water dispersions (water dispersions of Particles 13-1 to 18-1) of Examples 13-1 to 18-1 were manufactured in the same operation as in Example 9-1, except for changing a trifunctional or higher functional isocyanate compound (Isocyanate Compound NCO 104) used in the manufacturing of the oil phase component in Example 9-1 and a polymerizable monomer (neopentyl glycol propylene oxide adduct diacrylate (NPGPODA)) to each of trifunctional or higher functional isocyanate compounds and polymerizable monomers presented in Table 5.

Examples 19-1 to 20-1

Water dispersions (water dispersions of Particles 19-1 to 20-1) of Examples 19-1 to 20-1 were manufactured in the same operation as in Example 9-1, except for changing the trifunctional or higher functional isocyanate compound (Isocyanate Compound NCO 104) and the polymerizable monomer (neopentyl glycol propylene oxide adduct diacrylate (NPGPODA)) used in the manufacturing of the oil phase component in Example 9-1 to each of trifunctional or higher functional isocyanate compounds having polymerizable groups and polymerizable monomers presented in Table 5.

Example 21-1

<Emulsification Step>

—Manufacturing of Oil Phase Component—

19 g of Isocyanate Compound NCO 104 (trifunctional or higher functional isocyanate compound), 2.5 g of an isocyanate compound (Isocyanate Compound 2 having a hydrophilic group, solid content: 35 mass %) having a carboxy group, 1 g of IRGACURE (Registered trademark)

907 (photopolymerization initiator), 5 g of P-1 (resin not having a polymerizable group), and 6.5 g of SR399E (dipentaerythritol pentaacrylate, pentafunctional polymerizable monomer, Sartomer) were dissolved in 33 g of ethyl acetate (organic solvent), so as to obtain an oil phase component.

—Manufacturing of Water Phase Component—

0.4 g of sodium dodecyl sulfate (SDS, surfactant) and 0.033 g of sodium hydroxide (neutralizing agent) were dissolved in 50 g of deionized water, so as to obtain a water phase component.

The water phase component was added to and mixed with the oil phase component, the obtained mixture was emulsified for 10 minutes at 12,000 rpm by using a homogenizer, so as to obtain an emulsion.

<Gelation Step>

The obtained emulsion was added to 25 g of deionized water and was stirred for 30 minutes at room temperature, and stirring was further performed for three hours at 50° C., so as to filter out ethyl acetate from the emulsion. The obtained liquid was stirred for 24 hours at 50° C., so as to form particles in the liquid. The liquid including the particles was diluted in deionized water such that a concentration of solid contents was 20 mass % so as to obtain a water dispersion (water dispersion of Particles 21-1) of Example 21-1.

Example 22-1

<Emulsification Step>
—Manufacturing of Oil Phase Component—

19 g of Isocyanate Compound NCO 104 (trifunctional or higher functional isocyanate compound), 3.5 g of TAKENATE (Registered trademark) D-116N (Isocyanate Compound 1 having a hydrophilic group), 2.5 g of an isocyanate compound (Isocyanate Compound 2 having a hydrophilic group) having a carboxy group, 1 g of IRGACURE (Registered trademark) 907 (photopolymerization initiator), 5 g of P-1 (resin not having a polymerizable group), and 6.5 g of SR399E (pentafunctional polymerizable monomer) were dissolved in 35 g of ethyl acetate (organic solvent), so as to obtain an oil phase component.

—Manufacturing of Water Phase Component—

0.4 g of sodium dodecyl sulfate (SDS, surfactant) and 0.033 g of sodium hydroxide (neutralizing agent) dissolved in 50 g of deionized water, so as to obtain a water phase component.

The water phase component was added to and mixed with the oil phase component, and the obtained mixture was emulsified for 10 minutes at 12,000 rpm by using a homogenizer, so as to obtain an emulsion.

<Gelation Step>

The obtained emulsion was added to 25 g of deionized water and was stirred for 30 minutes at room temperature, and stirring was further performed for three hours at 50° C., so as to filter out ethyl acetate from the emulsion. The obtained liquid was stirred for 24 hours at 50° C., so as to form particles in the liquid. The liquid including the particles was diluted in deionized water such that the concentration of solid contents was 20 mass %, so as to obtain a water dispersion (water dispersion of Particles 22-1) of Example 22-1.

Examples 23-1 to 42-1

Water dispersions (water dispersions of Particles 23-1 to 42-1) of Examples 23-1 to 42-1 were manufactured in the same operation as in Example 9-1, except for changing the polymerizable monomer (neopentyl glycol propylene oxide adduct diacrylate (NPGPODA)) and the resin not having a polymerizable group (P-1) used in the manufacturing of the oil phase component in Example 9-1 to polymerizable monomers and resins not having polymerizable groups presented in Table 5.

Examples 43-1 to 44-1

Water dispersions (water dispersions of Particles 43-1 to 44-1) of Examples 43-1 to 44-1 were manufactured in the same operation as in Example 9-1, except for changing a polymerizable monomer (neopentyl glycol propylene oxide adduct diacrylate (NPGPODA)), the resin not having a polymerizable group (P-1), and the photopolymerization initiator (IRGACURE (Registered trademark) 907) used in the manufacturing of the oil phase component in Example 9-1, to each of polymerizable monomers, resins not having polymerizable groups, and photopolymerization initiators presented in Table 5.

Example 45-1

A water dispersion (water dispersion of Particles 45-1) of Example 45-1 was manufactured in the same operation as in Example 21-1 except for changing the resin not having a polymerizable group (P-1) and the photopolymerization initiator (IRGACURE (Registered trademark) 907) used in the manufacturing of the oil phase component in Example 21-1, to a resin not having a polymerizable group and a photopolymerization initiator presented in Table 5.

Example 46-1

A water dispersion (water dispersion of Particles Particles 46-1) of Example 46-1 was manufactured in the same operation as in Example 22-1, except for changing the resin not having a polymerizable group (P-1) and the photopolymerization initiator (IRGACURE (Registered trademark) 907) used in the manufacturing of the oil phase component in Example 22-1, to a resin not having a polymerizable group and a photopolymerization initiator presented in Table 5.

Example 47-1

A water dispersion (water dispersion of Particles 47-1) of Example 47-1 was manufactured in the same operation as in Example 1-1, except for changing the resin not having the polymerizable group (P-1) and the photopolymerization initiator (IRGACURE (Registered trademark) 907) used in the manufacturing of the oil phase component in Example 1-1, to a resin not having a polymerizable group and a photopolymerization initiator presented in Table 5 and changing the surfactant (sodium dodecyl sulfate (SDS)) used in the manufacturing of the water phase component to a surfactant presented in Table 5.

Example 48-1

A water dispersion (water dispersion of Particles 48-1) of Example 48-1 was manufactured in the same operation as in Example 9-1, except for changing the trifunctional or higher functional isocyanate compound (Isocyanate Compound NCO 104), the polymerizable monomer (neopentyl glycol propylene oxide adduct diacrylate (NPGPODA)), the resin not having a polymerizable group (P-1), and the photopolymerization initiator (IRGACURE (Registered trademark) 907) used in the manufacturing of the oil phase component in Example 9-1, to a trifunctional or higher functional isocyanate compound having a polymerizable group, a polymerizable monomer, a resin not having a polymerizable group, and a photopolymerization initiator presented in Table 5.

Example 49-1

<Emulsification Step>
—Manufacturing of Oil Phase Component—
19 g of Isocyanate Compound NCO 104 (trifunctional or higher functional isocyanate compound), 3.5 g of TAKENATE (Registered trademark) D-116N (Isocyanate Compound 1 having a hydrophilic group), 1 g of IRGACURE (Registered trademark) 819 (bis(2,4,6-trimethylbenzoyl)-phenylphosphine oxide, photopolymerization initiator, BASF SE), 1 g of ANTHRACURE (Registered trademark) UVS-1331 (cationic photosensitizer, 9,10-dibutoxyanthracene, Awasaki Kasei Chemicals), 5 g of BR-113 (resin not having polymerizable group: acrylic resin, Mitsubishi Rayon Co., Ltd.), and 6.5 g of SR399E (pentafunctional polymerizable monomer) were dissolved in 37 g of ethyl acetate (organic solvent), so as to obtain an oil phase component.
—Manufacturing of Water Phase Component—
0.4 g of sodium cetyl sulfate (SCS, surfactant) was dissolved in 50 g of deionized water, so as to obtain a water phase component.

The water phase component was added to and mixed with the oil phase component, and the obtained mixture was emulsified for 10 minutes at 12,000 rpm by using a homogenizer, so as to obtain an emulsion.
<Gelation Step>
The obtained emulsion was added to 25 g of deionized water and was stirred for 30 minutes at room temperature, and stirring was further performed for three hours at 50° C., so as to filter out ethyl acetate from the emulsion. The obtained liquid was stirred for 24 hours at 50° C., so as to form particles in the liquid. The liquid including particles was diluted in deionized water such that the concentration of solid contents become 20 mass %, so as to obtain a water dispersion (water dispersion of Particles 49-1) of Example 49-1.

Examples 50-1 to 51-1

Water dispersions (water dispersions of Particles 50-1 to 51-1) of Examples 50-1 to 51-1 were manufactured in the same operation as in Example 49-1, except for changing the sensitizer (ANTHRACURE (Registered trademark) UVS-1331) used in the manufacturing of the oil phase component in Example 49-1, to sensitizers presented in Table 5.

Example 52-1

<Emulsification Step>
—Manufacturing of Oil Phase Component—
19 g of Isocyanate Compound NCO 104 (trifunctional or higher functional isocyanate compound), 2.5 g of an isocyanate compound (Isocyanate Compound 2 having a hydrophilic group) having a carboxy group, 1 g of IRGACURE (Registered trademark) 819 (photopolymerization initiator), 1 g of QUANTACURE (Registered trademark) ITX (sensitizer, 2-isopropylthioxanthone, Tokyo Chemical Industry Co., Ltd.), 5 g of BR-113 (resin not having a polymerizable group), and 6.5 g of SR399E (pentafunctional polymerizable monomer) were dissolved in 35 g of ethyl acetate (organic solvent), so as to obtain an oil phase component.
—Manufacturing of Water Phase Component—
0.4 g of sodium dodecyl sulfate (SDS, surfactant) and 0.033 g of sodium hydroxide (neutralizing agent) were dissolved in 50 g of deionized water, so as to obtain a water phase component.
The water phase component was added to and mixed with the oil phase component, and the obtained mixture was emulsified for 10 minutes at 12,000 rpm by using a homogenizer, so as to obtain an emulsion.
<Gelation Step>
The obtained emulsion was added to 25 g of deionized water and was stirred for 30 minutes at room temperature, and stirring was further performed for three hours at 50° C., so as to filter out ethyl acetate from the emulsion. The obtained liquid was stirred for 24 hours at 50° C., so as to form particles in the liquid. The liquid including particles was diluted in deionized water such that the concentration of solid contents become 20 mass %, so as to obtain a water dispersion (water dispersion of Particles 52-1) of Example 52-1.

Example 53-1

<Emulsification Step>
—Manufacturing of Oil Phase Component—
19 g of Isocyanate Compound NCO 104 (trifunctional or higher functional isocyanate compound), 3.5 g of TAKENATE (Registered trademark) D-116N (Isocyanate Compound 1 having hydrophilic group), 2.5 g of an isocyanate compound (Isocyanate Compound 2 having a hydrophilic group) having a carboxy group, 1 g of IRGACURE (Registered trademark) 819 (photopolymerization initiator), 1 g of QUANTACURE (Registered trademark) ITX (sensitizer), 5 g of BR-113 (resin not having a polymerizable group), and 6.5 g of SR399E (pentafunctional polymerizable monomer), were dissolved in 38 g of ethyl acetate (organic solvent), so as to obtain an oil phase component.
—Manufacturing of Water Phase Component—
0.4 g of sodium dodecyl sulfate (SDS, surfactant) and 0.033 g of sodium hydroxide (neutralizing agent) were dissolved in 50 g of deionized water, so as to obtain a water phase component.
The water phase component was added to and mixed with the oil phase component, and the obtained mixture was emulsified for 10 minutes at 12,000 rpm by using a homogenizer, so as to obtain an emulsion.
<Gelation Step>
The obtained emulsion was added to 25 g of deionized water and was stirred for 30 minutes at room temperature, and stirring was further performed for three hours at 50° C., so as to filter out ethyl acetate from the emulsion. The obtained liquid was stirred for 24 hours at 50° C., so as to form particles in the liquid. The liquid including particles was diluted in deionized water such that the concentration of solid contents become 20 mass %, so as to obtain a water dispersion (water dispersion of Particles 53-1) of Example 53-1.

Example 54-1

A water dispersions (water dispersion of Particles 54-1) of Example 54-1 was manufactured in the same operation as in Example 1-1, except for changing the resin not having a polymerizable group (P-1) and the photopolymerization initiator (IRGACURE (Registered trademark) 907) in the manufacturing of the oil phase component in Example 1-1 to a resin not having a polymerizable group and a photopolymerization initiator presented in Table 5, changing the surfactant (sodium dodecyl sulfate (SDS)) used in the manufacturing of the water phase component to a surfactant presented in Table 5, and using 1 g of new QUANTACURE (Registered trademark) ITX (sensitizer) in the manufacturing of the oil phase component.

Example 55-1

A water dispersion (water dispersion of Particles 55-1) of Example 55-1 was manufactured in the same operation as in Example 9-1 except for changing the trifunctional or higher functional isocyanate compound (Isocyanate Compound NCO 104), the polymerizable monomer (neopentyl glycol propylene oxide adduct diacrylate (NPGPODA)), the resin not having a polymerizable group (P-1), and the photopolymerization initiator (IRGACURE (Registered trademark) 907) used in the manufacturing of the oil phase component in Example 9-1 to a trifunctional or higher functional isocyanate compound having a polymerizable group, a polymerizable monomer, a resin not having a polymerizable group, and a photopolymerization initiator, presented in Table 5 and using 1 g of new QUANTACURE (Registered trademark) ITX (sensitizer) in the manufacturing of the oil phase component.

Details of Particles 1-1 to 55-1 obtained above are provided in Table 5.

TABLE 5

| | | Particles | | | | | | | |
|---|---|---|---|---|---|---|---|---|---|
| | | Isocyanate compound | | | | Particle including compound | | | |
| | | Isocyanate Compound 1 having hydrophilic group | Isocyanate Compound 2 having hydrophilic group | Trifunctional or higher functional isocyanate compound | Surfactant | Polymerizable monomer | Photopolymerization initiator | Sensitizer | Resin not having polymerizable group |
| | | | | | | | | | Compound | Mw |
| Example 1-1 | Particles 1-1 | D-116N | — | NCO 201 | SDS | — | IRGACURE 907 | — | P-1 | 75,000 |
| Example 2-1 | Particles 2-1 | D-116N | — | NCO 202 | SDS | — | IRGACURE 907 | — | P-1 | 75,000 |
| Example 3-1 | Particles 3-1 | D-116N | — | NCO 203 | SDS | — | IRGACURE 907 | — | P-1 | 75,000 |
| Example 4-1 | Particles 4-1 | D-116N | — | NCO 204 | SDS | — | IRGACURE 907 | — | P-1 | 75,000 |
| Example 5-1 | Particles 5-1 | D-116N | — | NCO 205 | SDS | — | IRGACURE 907 | — | P-1 | 75,000 |
| Example 6-1 | Particles 6-1 | D-116N | — | NCO 206 | SDS | — | IRGACURE 907 | — | P-1 | 75,000 |
| Example 7-1 | Particles 7-1 | D-116N | — | NCO 207 | SDS | — | IRGACURE 907 | — | P-1 | 75,000 |
| Example 8-1 | Particles 8-1 | D-116N | — | NCO 201 | SCS | — | IRGACURE 907 | — | P-1 | 75,000 |
| Example 9-1 | Particles 9-1 | D-116N | — | NCO 104 | SCS | NPGPODA | IRGACURE 907 | — | P-1 | 75,000 |
| Example 10-1 | Particles 10-1 | D-116N | — | NCO 104 | SCS | A-TMM-3L | IRGACURE 907 | — | P-1 | 75,000 |
| Example 11-1 | Particles 11-1 | D-116N | — | NCO 104 | SCS | SR399E | IRGACURE 907 | — | P-1 | 75,000 |
| Example 12-1 | Particles 12-1 | D-116N | — | NCO 104 | SCS | A-DPH | IRGACURE 907 | — | P-1 | 75,000 |
| Example 13-1 | Particles 13-1 | D-116N | — | NCO 101 | SCS | SR399E | IRGACURE 907 | — | P-1 | 75,000 |
| Example 14-1 | Particles 14-1 | D-116N | — | NCO 102 | SCS | SR399E | IRGACURE 907 | — | P-1 | 75,000 |
| Example 15-1 | Particles 15-1 | D-116N | — | NCO 103 | SCS | SR399E | IRGACURE 907 | — | P-1 | 75,000 |
| Example 16-1 | Particles 16-1 | D-116N | — | NCO 105 | SCS | SR399E | IRGACURE 907 | — | P-1 | 75,000 |
| Example 17-1 | Particles 17-1 | D-116N | — | DURANATE TKA-100 | SCS | SR399E | IRGACURE 907 | — | P-1 | 75,000 |
| Example 18-1 | Particles 18-1 | D-116N | — | DURANATE TSE-100 | SCS | SR399E | IRGACURE 907 | — | P-1 | 75,000 |
| Example 19-1 | Particles 19-1 | D-116N | — | NCO 201 | SCS | SR399E | IRGACURE 907 | — | P-1 | 75,000 |
| Example 20-1 | Particles 20-1 | D-116N | — | NCO 201 | SCS | A-DPH | IRGACURE 907 | — | P-1 | 75,000 |
| Example 21-1 | Particles 21-1 | — | Isocyanate compound having carboxy group | NCO 104 | SDS | SR399E | IRGACURE 907 | — | P-1 | 75,000 |
| Example 22-1 | Particles 22-1 | D-116N | Isocyanate compound having carboxy group | NCO 104 | SDS | SR399E | IRGACURE 907 | — | P-1 | 75,000 |
| Example 23-1 | Particles 23-1 | D-116N | — | NCO 104 | SCS | SR399E | IRGACURE 907 | — | TEGO AddBond LTH | n/a |
| Example 24-1 | Particles 24-1 | D-116N | — | NCO 104 | SCS | SR399E | IRGACURE 907 | — | TEGO AddBond HS | n/a |

TABLE 5-continued

| | | Particles | | | | | | | |
|---|---|---|---|---|---|---|---|---|---|
| | | Isocyanate compound | | | | Particle including compound | | | |
| | | Isocyanate Compound 1 having hydrophilic group | Isocyanate Compound 2 having hydrophilic group | Trifunctional or higher functional isocyanate compound | Surfactant | Polymerizable monomer | Photopolymerization initiator | Sensitizer | Resin not having polymerizable group |
| | | | | | | | | | Compound | Mw |
| Example 25-1 | Particles 25-1 | D-116N | — | NCO 104 | SCS | SR399E | IRGACURE 907 | — | TEGO AddBond 1270 | n/a |
| Example 26-1 | Particles 26-1 | D-116N | — | NCO 104 | SCS | SR399E | IRGACURE 907 | — | Acronal 4F | n/a |
| Example 27-1 | Particles 27-1 | D-116N | — | NCO 104 | SCS | SR399E | IRGACURE 907 | — | Acronal 4L | n/a |
| Example 28-1 | Particles 28-1 | D-116N | — | NCO 104 | SCS | SR399E | IRGACURE 907 | — | Acronal 700L | n/a |
| Example 29-1 | Particles 29-1 | D-116N | — | NCO 104 | SCS | SR399E | IRGACURE 907 | — | Laroflex MP 15 | n/a |
| Example 30-1 | Particles 30-1 | D-116N | — | NCO 104 | SCS | SR399E | IRGACURE 907 | — | Laroflex MP 35 | n/a |
| Example 31-1 | Particles 31-1 | D-116N | — | NCO 104 | SCS | SR399E | IRGACURE 907 | — | BR-90 | 190,000 |
| Example 32-1 | Particles 32-1 | D-116N | — | NCO 104 | SCS | SR399E | IRGACURE 907 | — | BR-101 | 140,000 |
| Example 33-1 | Particles 33-1 | D-116N | — | NCO 104 | SCS | SR399E | IRGACURE 907 | — | BR-115 | 55,000 |
| Example 34-1 | Particles 34-1 | D-116N | — | NCO 104 | SCS | SR399E | IRGACURE 907 | — | MB-7022 | 20,000 |
| Example 35-1 | Particles 35-1 | D-116N | — | NCO 104 | SCS | SR399E | IRGACURE 907 | — | BR-80 | 95,000 |
| Example 36-1 | Particles 36-1 | D-116N | — | NCO 104 | SCS | SR399E | IRGACURE 907 | — | BR-113 | 30,000 |
| Example 37-1 | Particles 37-1 | D-116N | — | NCO 104 | SCS | SR399E | IRGACURE 907 | — | BR-106 | 60,000 |
| Example 38-1 | Particles 38-1 | D-116N | — | NCO 104 | SCS | SR399E | IRGACURE 907 | — | MB-2543 | 35,000 |
| Example 39-1 | Particles 39-1 | D-116N | — | NCO 104 | SCS | SR399E | IRGACURE 907 | — | MB-2766 | 190,000 |
| Example 40-1 | Particles 40-1 | D-116N | — | NCO 104 | SCS | SR399E | IRGACURE 907 | — | PB-204 | 9,000 |
| Example 41-1 | Particles 41-1 | D-116N | — | NCO 104 | SCS | SR399E | IRGACURE 907 | — | PARALOID EXL-2335 | n/a |
| Example 42-1 | Particles 42-1 | D-116N | — | NCO 104 | SCS | SR399E | IRGACURE 907 | — | PARALOID EXL-2361 | n/a |
| Example 43-1 | Particles 43-1 | D-116N | — | NCO 104 | SCS | SR399E | IRGACURE 819 | — | BR-113 | 30,000 |
| Example 44-1 | Particles 44-1 | D-116N | — | NCO 104 | SCS | SR399E | TPO | — | BR-113 | 30,000 |
| Example 45-1 | Particles 45-1 | — | Isocyanate compound having carboxy group | NCO 104 | SDS | SR399E | IRGACURE 819 | — | BR-113 | 30,000 |
| Example 46-1 | Particles 46-1 | D-116N | Isocyanate compound having carboxy group | NCO 104 | SDS | SR399E | IRGACURE 819 | — | BR-113 | 30,000 |
| Example 47-1 | Particles 47-1 | D-116N | — | NCO 201 | SCS | — | IRGACURE 819 | — | BR-113 | 30,000 |
| Example 48-1 | Particles 48-1 | D-116N | — | NCO 201 | SCS | SR399E | IRGACURE 819 | — | BR-113 | 30,000 |
| Example 49-1 | Particles 49-1 | D-116N | — | NCO 104 | SCS | SR399E | IRGACURE 819 | UVS-1331 | BR-113 | 30,000 |
| Example 50-1 | Particles 50-1 | D-116N | — | NCO 104 | SCS | SR399E | IRGACURE 819 | ITX | BR-113 | 30,000 |
| Example 51-1 | Particles 51-1 | D-116N | — | NCO 104 | SCS | SR399E | IRGACURE 819 | DETX | BR-113 | 30,000 |
| Example 52-1 | Particles 52-1 | — | Isocyanate compound having carboxy group | NCO 104 | SDS | SR399E | IRGACURE 819 | ITX | BR-113 | 30,000 |
| Example 53-1 | Particles 53-1 | D-116N | Isocyanate compound having carboxy group | NCO 104 | SDS | SR399E | IRGACURE 819 | ITX | BR-113 | 30,000 |
| Example 54-1 | Particles 54-1 | D-116N | — | NCO 201 | SCS | — | IRGACURE 819 | ITX | BR-113 | 30,000 |
| Example 55-1 | Particles 55-1 | D-116N | — | NCO 201 | SCS | SR399E | IRGACURE 819 | ITX | BR-113 | 30,000 |

D-116N and an isocyanate compound having a carboxy group in Table 5 are compounds in the following structures.

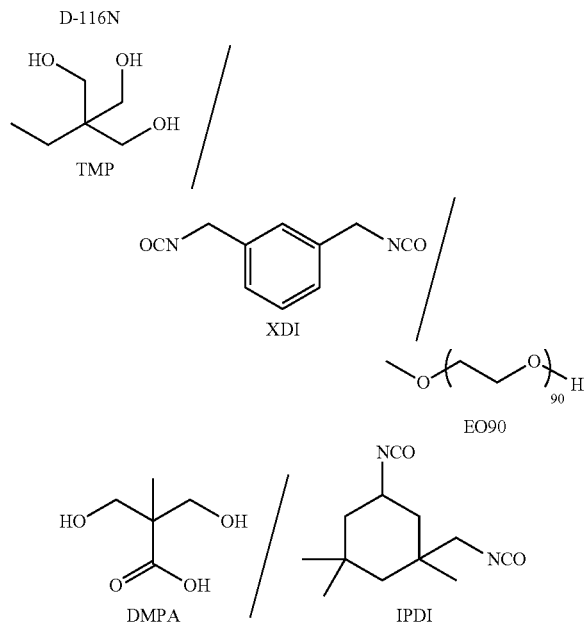

The expression "-" in Table 5 means that the corresponding component was not used, and the expression "n/a" means that analysis was not performed.

Each of the components presented in Table 5 is as follows.

TSE-100 (Product name: DURANATE (Registered trademark) TSE-100, isocyanurate-type trifunctional isocyanate compound, containing 12.0 mass % of isocyanate group, Asahi Kasei Corporation)

ATMM-3L (Product name, pentaerythritol triacrylate, trifunctional polymerizable monomer, Shin-Nakamura Chemical Co., Ltd.)

A-DPH (Product name, dipentaerythritol hexaacrylate, hexafunctional polymerizable monomer, Shin-Nakamura Chemical Co., Ltd.)

DETX (Product name: KAYACURE DETX, 2,4-diethylthioxanthone, Nippon Kayaku Co., Ltd.)

TEGO (Registered trademark) AddBond LTH (Product name, polyester resin, Evonik Industries AG)

TEGO (Registered trademark) AddBond HS (Product name, polyester resin, Evonik Industries AG)

TEGO (Registered trademark) AddBond 1270 (Product name, polyester resin, Evonik Industries AG)

Acronal (Registered trademark) 4F (Product name, acrylic resin, BASF SE)

Acronal (Registered trademark) 4L (Product name, acrylic resin, BASF SE)

Acronal (Registered trademark) 700L (Product name, acrylic resin, BASF SE)

Laroflex (Registered trademark) MP15 (Product name, polyvinyl chloride resin, BASF SE)

Laroflex (Registered trademark) MP35 (Product name, polyvinyl chloride resin, BASF SE)

BR-90 (Product name: DIANAL (Registered trademark) BR-90, acrylic resin, Mitsubishi Rayon Co., Ltd.)

BR-101 (Product name: DIANAL (Registered trademark) BR-101, acrylic resin, Mitsubishi Rayon Co., Ltd.)

BR-115 (Product name: DIANAL (Registered trademark) BR-115, acrylic resin, Mitsubishi Rayon Co., Ltd.)

MB-7022 (Product name: DIANAL (Registered trademark) MB-7022, acrylic resin, Mitsubishi Rayon Co., Ltd.)

BR-80 (Product name: DIANAL (Registered trademark) BR-80, acrylic resin, Mitsubishi Rayon Co., Ltd.)

BR-113 (Product name: DIANAL (Registered trademark) BR-113, acrylic resin, Mitsubishi Rayon Co., Ltd.)

BR-106 (Product name: DIANAL (Registered trademark) BR-106, acrylic resin, Mitsubishi Rayon Co., Ltd.)

MB-2543 (Product name: DIANAL (Registered trademark) MB-2543, acrylic resin, Mitsubishi Rayon Co., Ltd.)

MB-2766 (Product name: DIANAL (Registered trademark) MB-2766, acrylic resin, Mitsubishi Rayon Co., Ltd.)

PB-204 (Product name: DIANAL (Registered trademark) PB-204, acrylic resin, Mitsubishi Rayon Co., Ltd.)

PARALOID (Registered trademark) EXL-2335 (Product name, acrylic resin, The Dow Chemical Company)

PARALOID (Registered trademark) EXL-2361 (Product name, acrylic resin, The Dow Chemical Company)

Synthesis of Urethane Acrylate

Comparative Synthesis Example 1-1: Amphiphilic Urethane Acrylate (a)

444.6 parts by mass of isophorone diisocyanate (IPDI) and 202.3 parts by mass of 1,12-dodecanediol were introduced to a reaction vessel including a stirrer, a cooling pipe, a dropping funnel, and an air introduction pipe, 0.26 parts by mass of tin 2-ethylhexanoate was added under stirring, and the temperature in the reaction vessel was increased to 90° C., so as to perform reaction for 1.5 hours. After the reaction, 700.0 parts by mass of methoxy PEG1000 (methoxy polyethylene glycol, Toho Chemical Industry Co., Ltd.) and 0.54 parts by mass of tin 2-ethylhexanoate were added to the obtained reactant, and reaction was further performed for 1.5 hours.

Subsequently, 1300.0 parts by mass of dipentaerythritol pentaacrylate (SR399E), 1.32 parts by mass of methoquinone, and 1.06 parts by mass of tin 2-ethylhexanoate were introduced to this reaction vessel and were mixed with each other, the temperature in the reaction vessel was increased to 85° C. under air bubbling, and reaction was performed for three hours. After the reaction, the obtained reactant was cooled down, so as to obtain amphiphilic Urethane Acrylate (a).

Comparative Synthesis Example 2-1: Urethane Acrylate (b)

578.0 parts by mass of a trimer (CORONATE (Registered trademark) HXR, Tosoh Corporation) of hexamethylene diisocyanate (HDI), 200.0 parts by mass of methoxy PEG400 (methoxy polyethylene glycol, Toho Chemical Industry Co., Ltd.), and 200.0 parts by mass of methoxy PEG1000 were introduced to a reaction vessel including a stirrer, a cooling pipe, a dropping funnel, and an air introduction pipe, 0.39 parts by mass of tin 2-ethylhexanoate was added under stirring, and the temperature in the reaction vessel was increased to 75° C., so as to perform reaction for 1.5 hours.

Subsequently, 1051.6 parts by mass of pentaerythritol triacrylate (A-TMM-3L, Shin-Nakamura Chemical Co., Ltd.), 1.01 parts by mass of methoquinone, and 0.81 parts by mass of tin 2-ethylhexanoate were introduced to this reaction vessel and were mixed with each other, the temperature in the reaction vessel under air bubbling was increased to 80° C., and reaction was performed for two hours. After the reaction, the obtained reactant was cooled down, so as to obtain Urethane Acrylate (b).

Urethane Acrylate (b) was urethane acrylate of which one terminal was an acryloyl group and in which trifunctional isocyanate was used.

Comparative Example 1-1

(Manufacturing of Aqueous Emulsion)

27.5 parts by mass of amphiphilic Urethane Acrylate (a) obtained above, 9.2 parts by mass of VISCOAT #802 (mixture of tripentaerythritol acrylate, mono- and dipentaerythritol acrylate, and polypentaerythritol acrylate, polymerizable monomer, Osaka Organic Chemical Industry Ltd.), 5 parts by mass of BR-113 (resin not having a polymerizable group), and 3.3 parts by mass of LUCIRIN (Registered trademark) TPO (2,4,6-trimethylbenzoyl-diphenyl-phosphine oxide, photoradical polymerization initiator, BASF SE) were introduced to a reaction vessel including a stirrer, a cooling pipe, a dropping funnel, and an air introduction pipe, the temperature in the reaction vessel was increased to 80° C. under stirring, and the temperature was maintained for two hours.

Subsequently, after the temperature in the reaction vessel was cooled down to 50° C., 60 parts by mass of deionized water was added under stirring, the temperature was maintained for one hour at 40° C., dilution was performed with deionized water such that the concentration of a nonvolatile content (amphiphilic Urethane Acrylate (a), polymerizable monomer, a resin not having a polymerizable group, and a photoradical polymerization initiator) was 20 mass %, so as to obtain an aqueous emulsion (aqueous emulsion including Particles 56-1) of Comparative Example 1-1.

In the aqueous emulsion of Comparative Example 1-1, gel particles were not formed (that is, Particles 56-1 are not gel particles).

Comparative Example 2-1

(Manufacturing of Aqueous Emulsion)

27.5 parts by mass of Urethane Acrylate (b) obtained above, 9.2 parts by mass of VISCOAT #802 (a mixture of tripentaerythritol acrylate, mono- and dipentaerythritol acrylate, polypentaerythritol acrylate, polymerizable monomer, Osaka Organic Chemical Industry Ltd.), 5 parts by mass of BR-113 (resin not having polymerizable group), and 3.3 parts by mass of LUCIRIN (Registered trademark) TPO (photoradical polymerization initiator) were introduced to a reaction vessel including a stirrer, a cooling pipe, a dropping funnel, and an air introduction pipe, the temperature in the reaction vessel under stirring was increased to 80° C., and the temperature was maintained for two hours.

Subsequently, after the temperature in the reaction vessel was cooled down to 50°, 60 parts by mass of deionized water was added under stirring, the temperature was maintained for one hour at 40° C., and dilution was performed with deionized water such that the concentration of the nonvolatile content (Urethane Acrylate (b), polymerizable monomer, resin not having polymerizable group, and photoradical polymerization initiator) become 20 mass %, so as to obtain an aqueous emulsion (aqueous emulsion including Particles 57-1) of Comparative Example 2-1.

In the aqueous emulsion of Comparative Example 2-1, gel particles were not formed (that is, Particles 57-1 were not gel particles).

Comparative Example 3-1

(Manufacturing of Dispersion Liquid of Microcapsules)

65 g of TAKENATE (Registered trademark) D-110N (adduct of trimethylolpropane (TMP) and xylene diisocyanate (XDI), 50 mass % ethyl acetate solution, microcapsule wall material, Mitsui Chemicals, Inc.), 5 g of polymethyl methacrylate (PMMA, a resin not having a polymerizable group: methacrylic resin, Mw: 75,000, Tg: 100° C., Sigma-Aldrich Corporation), 3 g of an infrared absorbing coloring agent (the following structure), 2.5 g of a thermal radical generator (the following structure), and 0.1 g of PIONIN A41C (surfactant, Taketomo Oil & Fat Co., Ltd.) were dissolved in a mixed solution of 30 g of methyl ethyl ketone and 60 g of ethyl acetate, so as to obtain an oil phase component.

As the water phase component, 120 g of a 4 mass % aqueous solution of KURARAY POVAL (Registered trademark) PVA205 (polyvinyl alcohol, Kuraray Co., Ltd.) was prepared.

The water phase component was added to and mixed with the oil phase component, and the obtained mixture was emulsified for 10 minutes at 10,000 rpm by using a homogenizer, so as to obtain an emulsion.

After methyl ethyl ketone and ethyl acetate were filtered out from the emulsion by stirring the obtained emulsion for three hours at 40° C., and dilution was performed with deionized water such that a concentration of solid contents become 20 mass %, so as to obtain a dispersion liquid (dispersion liquid including Microcapsule Particles 58-1) of Comparative Example 3-1.

In the dispersion liquid of Comparative Example 3-1, Microcapsule Particles 58-1 do not have a polymerizable group.

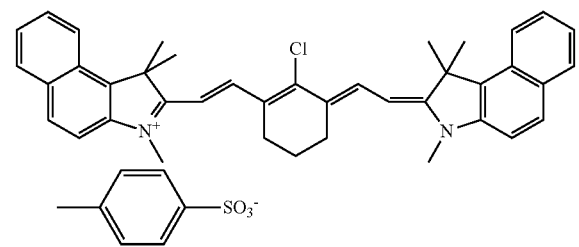

Infrared Absorbing Coloring Agent

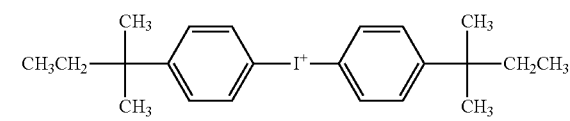

Thermal Radical Generator

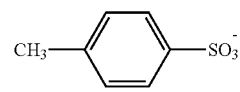

<Checking Whether Aqueous Dispersion Liquid Includes Gel Particles Having Polymerizable Group>

Whether the water dispersions of Examples 1-1 to 55-1 obtained above included gel particles was checked by the following method. The following operations were performed in the conditions of the liquid temperature of 25° C.

Samples were collected from the water dispersion obtained above. 100 times by mass of tetrahydrofuran (THF) with respect to the total solid content (particles in this example) in this sample was added to and mixed with the collected sample and each other, so as to prepare a diluent of the water dispersion. Centrifugation (80,000 rpm, for 40 minutes) was performed on the obtained diluent. Existence of residues was visually checked after the centrifugation, in a case where residues were checked, water was added to these residues, and the residues were redispersed by performing stirring for one hour by a stirrer, so as to obtain a redispersion liquid. The particle size distribution of the obtained redispersion liquid was measured by a light scattering method, by using a wet particle size distribution determination device (LA-910, Horiba Ltd.). In a case where particle size distribution was checked by the above operation, it was considered that the aqueous dispersion liquid included gel particles.

As a result, it was checked that all water dispersions of Examples 1-1 to 55-1 included gel particles (that is, all of Particles 1-1 to 55-1 were gel particles).

According to the above results and the results of the Fourier transform infrared spectroscopy (FT-IR) analysis, it was checked that all of the water dispersions of Examples 1-1 to 55-1 include gel particles having a polymerizable group (that is, all of Particles 1-1 to 55-1 were gel particles having polymerizable groups).

<Checking of Inclusion of Photopolymerization Initiator>

With respect to the water dispersion of Examples 1-1 to 55-1 obtained above, it was checked whether a photopolymerization initiator was included in the gel particles by measuring an inclusion ratio (%) of the photopolymerization initiator. Details thereof are provided below. The following operations were performed in the conditions of the liquid temperature of 25° C.

Two samples (hereinafter, referred to as "Sample 1A" and "Sample 2A") in the same masses were collected from the water dispersion.

100 times by mass of tetrahydrofuran (THF) with respect to the total solid content in Sample 1A was added to and mixed with Sample 1A, so as to prepare a diluent. Centrifugation was performed on the obtained diluent in the conditions of 80,000 rpm and 40 minutes. A supernatant (hereinafter, referred to as "Supernatant 1A") generated by the centrifugation was collected. The mass of the photopolymerization initiator included in Supernatant 1A collected was measured by a liquid chromatography device "Waters2695" of Waters Corporation. The mass of the obtained photopolymerization initiator was set as a "total amount of a photopolymerization initiator".

Centrifugation was performed on Sample 2A in the same conditions of the centrifugation performed by the above diluent. A supernatant (hereinafter, referred to as "Supernatant 2A") generated by the centrifugation was collected. The mass of the photopolymerization initiator included in the collected Supernatant 2A was measured by the liquid chromatography device. The mass of the obtained photopolymerization initiator was set as a "free amount of the photopolymerization initiator".

According to the formula below, an inclusion ratio (mass %) of the photopolymerization initiator was obtained based on the "total amount of the photopolymerization initiator" and the "free amount of the photopolymerization initiator".

Inclusion ratio (mass %) of photopolymerization initiator=((total amount of photopolymerization initiator-free amount of photopolymerization initiator)/total amount of photopolymerization initiator)×100

In a case where the measured inclusion ratio was greater than 0 mass %, it was considered that the photopolymerization initiator was included in the gel particles.

As a result, it was checked that inclusion ratios of photopolymerization initiators were 99 mass % or greater with respect to all of the water dispersions of Examples 1-1 to 55-1, and the photopolymerization initiators were included in the gel particles.

<Checking of Inclusion of Resin not Having Polymerizable Group>

It was checked whether a resin not having a polymerizable group was included in gel particles by measuring an inclusion ratio (%) of a resin not having a polymerizable group with respect to the water dispersions of Examples 1-1 to 55-1 obtained above.

The checking of the inclusion of the resin not having a polymerizable group was performed in the same method as the above checking of the inclusion of the photopolymerization initiator except for measuring a mass (total amount of resin not having polymerizable group) of the resin not having a polymerizable group included in Supernatant 1A in the above checking of the inclusion of the photopolymerization initiator and a mass (free amount of resin not having polymerizable group) of the resin not having a polymerizable group included in Supernatant 2A by gel permeation chromatography (GPC).

In the measuring by the gel permeation chromatography (GPC), HLC (Registered trademark)-8020GPC (Tosoh Corporation) was used as a determination device, three items of TSKgel (Registered trademark) Super Multipore HZ-H (4.6 mmID×15 cm, Tosoh Corporation) were used as columns, and tetrahydrofuran (THF) was used as an eluent. As the measuring conditions, a sample concentration was 0.45 mass %, a flow rate was 0.35 ml/min, a sample injection volume was 10 μl, and a measuring temperature was 40° C., and the measuring was performed by using an RI detector.

The calibration curve was manufactured from eight samples of "Standard Sample TSK standard, polystyrene" of Tosoh Corporation: "F-40", "F-20", "F-4", "F-1", "A-5000", "A-2500", "A-1000", and "n-propylbenzene".

As a result, it was checked that, inclusion ratios of resins not having polymerizable groups were 99 mass % or greater in all of the water dispersions of Examples 1-1 to 55-1 and a resin not having a polymerizable group was included in the gel particles.

<Checking of Inclusion of Polymerizable Monomer>

It was checked whether polymerizable monomers were included in gel particles by measuring inclusion ratios (%) of polymerizable monomers of water dispersions of Examples 9-1 to 46-1, 48-1 to 53-1, and 55-1 using the manufactured polymerizable monomers among the water dispersions of Examples 1-1 to 55-1 obtained above.

The checking of the inclusion of the polymerizable monomer was performed in the same method as the checking of the inclusion of the photopolymerization initiator.

As a result, it was checked that the inclusion ratio of the polymerizable monomer was 99 mass % or greater in all of the water dispersions of Examples 9-1 to 46-1, 48-1 to 53-1, and 55-1 and the polymerizable monomers were included in the gel particles.

<Checking of Inclusion of Sensitizer>

It was checked whether the sensitizers were included in the gel particles by measuring inclusion ratios (%) of the sensitizers with respect to the water dispersions of Examples 49-1 to 55-1 using sensitizers in the manufacturing, among the water dispersions of Examples 1-1 to 55-1 obtained above.

The checking of the inclusion of the sensitizer was performed in the same method as the checking of the inclusion of the photopolymerization initiator.

As a result, it was checked that the inclusion ratio of the sensitizer was 99 mass % or greater in all of the water dispersions of Examples 49-1 to 55-1, and a sensitizer was included in the gel particles.

<Measuring of the Volume-Average Particle Diameter of Particles>

The volume-average particle diameter of the gel particles (Particles 1-1 to 55-1) in the water dispersions of Examples 1-1 to 55-1 obtained above and was measured by a light scattering method, by using a particle size distribution determination device (LA-910, Horiba Ltd.). As a result, volume-average particle diameters of Particles 1-1 to 55-1 were 0.15 µm. In the same method, volume-average particle diameters of particles (Particles 56-1 to 57-1) in the aqueous emulsions of Comparative Examples 1-1 to 2-1 and particles (Particles 58-1) in the microcapsule dispersion liquid of Comparative Example 3-1 were measured, and the volume-average particle diameters of Particles 56-1 to 57-1 were 0.30 µm, and the volume-average particle diameter of Particles 58-1 was 0.35 µm.

[Manufacturing of Ink Composition]

The following components were mixed so as to manufacture ink compositions of Examples 1-1A to 55-1A and Comparative Examples 1-1A to 3-1A.

—Components of Ink Compositions—

| | |
|---|---|
| Each of the water dispersions of Examples 1-1 to 55-1, each of aqueous emulsions of Comparative Examples 1-1 to 2-1, or microcapsule dispersion liquid of Comparative Example 3-1 | 82 parts by mass |
| Ink (Pro-jet (Registered trademark) Cyan APD1000, FUJIFILM Imaging Colorants, Inc., Colorant Concentration: 14 mass %) | 13 parts by mass |
| Fluorine-based surfactant (Product name: Capstone (Registered trademark) FS-31, DuPont, concentration of solid contents: 25 mass %) | 0.3 parts by mass |
| 2-Methylpropanediol | 4.7 parts by mass |

[Evaluation of Ink Composition]

The following evaluations were performed by using the ink composition obtained above. The results thereof are provided in Table 6.

<Adhesiveness of Cured Film (Cross Hatch Test)>

The adhesiveness was evaluated by using each of the evaluation sample (PVC), the evaluation samples (PS), the evaluation samples (PC), the evaluation samples (PP), the evaluation samples (G-modified PET), and the evaluation samples (Acryl).

An evaluation sample (PVC) was manufactured by coating a polyvinyl chloride (PVC) sheet as a base material with the ink composition obtained above in a thickness of 12 µm by using bar No. 2 of K hand coater manufactured by RK PRINT COAT INSTRUMENTS Ltd. and heating and drying the obtained coated film at 60° C. for three minutes.

The evaluation sample (PS) was manufactured in the same manner as the manufacturing of the evaluation sample (PVC) except for changing the base material to a polystyrene (PS) sheet.

The evaluation sample (PC) was manufactured in the same manner as the manufacturing of the evaluation sample (PVC) except for changing the base material to a polycarbonate (PC) sheet.

The evaluation sample (PP) was manufactured in the same manner as the manufacturing of the evaluation sample (PVC) except for changing the base material to a polypropylene (PP) sheet.

The evaluation sample (G-modified PET) was manufactured in the same manner as the manufacturing of the evaluation sample (PVC) except for changing the base material to a glycol-modified polyethylene terephthalate (G-modified PET) sheet.

The evaluation sample (Acryl) was manufactured in the same manner as the manufacturing of the evaluation sample (PVC) except for changing the base material to an acrylic resin sheet.

Here, the following sheets were used for each of the PVC sheet, the PS sheet, the PC sheet, the PP sheet, the G-modified PET sheet, and the acrylic resin sheet.

PVC sheet: "AVERY (Registered trademark) 400 GLOSS WHITE PERMANENT" manufactured by Avery Dennison Corporation PS sheet: "falcon hi impact polystyrene" manufactured by Robert Home Group Ltd.

PC sheet: "PC1600-2" manufactured by Takiron Co., Ltd.

PP sheet: "Correx" manufactured by Robert Home Group Ltd.

G-modified PET sheet: "VIVAK (Registered trademark)" manufactured by Bayer AG

Acrylic resin sheet: "ACRYACE (Registered trademark) UV" manufactured by JSP Corporation In the evaluation of the adhesiveness, a UV mini conveyor device for a test CSOT (manufactured by GS Yuasa International Ltd.) to which an ozone-less metal halide lamp MAN250L was mounted as an exposure device and in which a conveyor speed was set as 35 m/min and exposure intensity was set as 2.0 W/cm$^2$ was used.

With respect to the coated film of each evaluation sample, the coated film was cured by irradiating the coated film with the UV light (ultraviolet rays) using the exposure device, so as to obtain a cured film.

A cross hatch test was performed on the cured film in conformity with ISO2409 (cross cut method) and the cured film was evaluated according to the following evaluation standard.

In this cross hatch test, cut intervals were set to 1 mm, and 25 square lattices having angles of 1 mm were formed.

According to the following evaluation standard, 0 and 1 are levels that are acceptable in practice.

According to the evaluation standard, a proportion (%) in which a lattice was peeled off was a value obtained by the following equation. The total number of the lattices according to the following equation was 25.

Ratio of peeled lattice (%)=[(the number of lattices in which peeling was generated)/(the total number of lattices)]×100

—Evaluation Standard of Adhesiveness of Cured Film—

0: A proportion (%) in which a lattice was peeled off was 0%.

1: A proportion (%) in which a lattice was peeled off was greater than 0% and 5% or less.

2: A proportion (%) in which a lattice was peeled off was greater than 5% and 15% or less.

3: A proportion (%) in which a lattice was peeled off was greater than 15% and 35% or less.

4: A proportion (%) in which a lattice was peeled off was greater than 35% and 65% or less.

5: A proportion (%) in which a lattice was peeled off was greater than 65%.

<Pencil Hardness of Cured Film>

Pencil hardness of the cured film was evaluated by using the above evaluation sample (PVC).

In the same manner as the evaluation of the adhesiveness of the cured film, the coated film of the evaluation sample (PVC) was irradiated with UV light and was cured, so as to obtain a cured film.

A pencil hardness test was performed on a cured film in conformity with JIS K5600-5-4 (1999) by using UNI (Registered trademark) manufactured by Mitsubishi Pencil Co., Ltd. as a pencil.

According to the test results, an allowable range of the pencil hardness is HB or harder and preferably H or harder. A printed matter having the pencil hardness of B or less is not preferable, since there is a possibility that scratches may be generated in a case of handling the printed matter.

<Jettability of Ink Composition>

The ink composition obtained above was ejected from the head of an ink jet printer (SP-300V, manufactured by Roland DG Corporation) for 30 minutes and then the ejection was stopped.

After five minutes had elapsed from the stop of the ejection, the ink composition was ejected to the vinyl chloride (PVC) sheet described above from the head, so as to form a solid image of 5 cm×5 cm.

These images were visually observed so as to check existence of dot losses due to the generation of the non-ejection nozzles, and jettability of the ink composition was evaluated according to the following evaluation standard.

—Evaluation Standard of Jettability of Ink Composition—

A: Dot losses were not acknowledged due to the generation of the non-ejection nozzles and the like, and a satisfactory image was able to be obtained.

B: Some dot losses due to the generation of the non-ejection nozzles and the like were acknowledged, but no troubles were generated in practice.

C: Dot losses due to the generation of the non-ejection nozzles and the like were generated, but an image was unsatisfactory in practice.

D: Ejection from heads was not able to be performed.

<Redispersibility of Ink Composition>

The following operation was performed under a yellow lamp so as to evaluate redispersibility of the ink compositions obtained above.

An aluminum plate was coated with the ink composition obtained above in a thickness of 12 μm by using bar No. 2 of K hand coater manufactured by RK PRINT COAT INSTRUMENTS Ltd, so as to form a coated film. The obtained coated film was dried by heating at 60° C. for 3 minutes. The surface of the coated film after being dried was rubbed with a sponge impregnated with water.

Fourier transform infrared spectroscopy (FT-IR) was performed on each of the coated films before being rubbed with a sponge and the coated film after being rubbed. Residual ratios of gel particles were calculated based on the following equation from obtained results.

Residual ratio of gel particles=(Intensity of peak derived from gel particles in coated film after being rubbed with sponge/Intensity of peak derived from gel particles in coated film before being rubbed with sponge)×100

Here, a peak derived from gel particles means a peak at 1700 cm$^{-1}$.

Redispersibility of the ink composition was evaluated based on the obtained residual ratio of the gel particles according to the following evaluation standard.

—Evaluation Standard of Redispersibility of Ink Composition—

A: A residual ratio of the gel particles was 1% or less, and redispersibility was excellent.

B: A residual ratio of the gel particles was greater than 1% and 5% or less, and redispersibility was in a range acceptable in practice.

C: A residual ratio of the gel particles was greater than 5% and 10% or less, and redispersibility was out of a range acceptable in practice.

D: A residual ratio of the gel particles was greater than 10%, and redispersibility was extremely bad.

<Preservation Stability of Ink Composition>

The ink compositions obtained above were sealed in a container, two weeks had elapsed at 60° C., the same evaluation as the above jettability evaluation was performed, and preservation stability of the ink composition was evaluated according to the same evaluation standard.

TABLE 6

| | | | | | Evaluation results | | | | | | |
|---|---|---|---|---|---|---|---|---|---|---|---|
| | | | | | | | | Adhesiveness | | | |
| | | Pencil hardness | Jettability | Redispersibility | Preservation stability | PVC | PS | PC | G-modified PET | PP | Acryl |
| Example 1-1A | Particles 1-1 | H | B | A | B | 0 | 0 | 1 | 1 | 1 | 1 |
| Example 2-1A | Particles 2-1 | H | B | A | B | 0 | 0 | 1 | 1 | 1 | 1 |
| Example 3-1A | Particles 3-1 | H | B | A | B | 0 | 0 | 1 | 1 | 1 | 1 |
| Example 4-1A | Particles 4-1 | H | B | A | B | 0 | 0 | 1 | 1 | 1 | 1 |
| Example 5-1A | Particles 5-1 | H | B | A | B | 0 | 0 | 1 | 1 | 1 | 1 |
| Example 6-1A | Particles 6-1 | H | B | A | B | 0 | 0 | 1 | 1 | 1 | 1 |
| Example 7-1A | Particles 7-1 | H | B | A | B | 0 | 0 | 1 | 1 | 1 | 1 |
| Example 8-1A | Particles 8-1 | H | A | A | A | 0 | 0 | 1 | 1 | 1 | 1 |
| Example 9-1A | Particles 9-1 | HB | A | A | A | 0 | 0 | 1 | 1 | 1 | 1 |
| Example 10-1A | Particles 10-1 | HB | A | A | A | 0 | 0 | 1 | 1 | 1 | 1 |
| Example 11-1A | Particles 11-1 | H | A | A | A | 0 | 0 | 1 | 1 | 1 | 1 |
| Example 12-1A | Particles 12-1 | H | A | A | A | 0 | 0 | 1 | 1 | 1 | 1 |
| Example 13-1A | Particles 13-1 | H | A | A | A | 0 | 0 | 1 | 1 | 1 | 1 |
| Example 14-1A | Particles 14-1 | H | A | A | A | 0 | 0 | 1 | 1 | 1 | 1 |
| Example 15-1A | Particles 15-1 | H | A | A | A | 0 | 0 | 1 | 1 | 1 | 1 |
| Example 16-1A | Particles 16-1 | H | A | A | A | 0 | 0 | 1 | 1 | 1 | 1 |

TABLE 6-continued

| | | Evaluation results | | | | | | | | |
|---|---|---|---|---|---|---|---|---|---|---|
| | | | | | | | | Adhesiveness | | |
| | | Pencil hardness | Jettability | Redispersibility | Preservation stability | PVC | PS | PC | G-modified PET | PP | Acryl |
| Example 17-1A | Particles 17-1 | H | A | A | A | 0 | 0 | 1 | 1 | 1 | 1 |
| Example 18-1A | Particles 18-1 | H | A | A | A | 0 | 0 | 1 | 1 | 1 | 1 |
| Example 19-1A | Particles 19-1 | 2H | A | A | A | 0 | 0 | 1 | 1 | 1 | 1 |
| Example 20-1A | Particles 20-1 | 2H | A | A | A | 0 | 0 | 1 | 1 | 1 | 1 |
| Example 21-1A | Particles 21-1 | H | A | A | A | 0 | 0 | 1 | 1 | 1 | 1 |
| Example 22-1A | Particles 22-1 | H | A | A | A | 0 | 0 | 1 | 1 | 1 | 1 |
| Example 23-1A | Particles 23-1 | H | A | A | A | 0 | 0 | 0 | 0 | 1 | 0 |
| Example 24-1A | Particles 24-1 | H | A | A | A | 0 | 0 | 0 | 0 | 1 | 0 |
| Example 25-1A | Particles 25-1 | H | A | A | A | 0 | 0 | 0 | 0 | 1 | 0 |
| Example 26-1A | Particles 26-1 | H | A | A | A | 0 | 0 | 0 | 0 | 1 | 0 |
| Example 27-1A | Particles 27-1 | H | A | A | A | 0 | 0 | 0 | 0 | 1 | 0 |
| Example 28-1A | Particles 28-1 | H | A | A | A | 0 | 0 | 0 | 0 | 1 | 0 |
| Example 29-1A | Particles 29-1 | H | A | A | A | 0 | 0 | 0 | 0 | 1 | 0 |
| Example 30-1A | Particles 30-1 | H | A | A | A | 0 | 0 | 0 | 0 | 1 | 0 |
| Example 31-1A | Particles 31-1 | H | A | A | A | 0 | 0 | 1 | 1 | 1 | 1 |
| Example 32-1A | Particles 32-1 | H | A | A | A | 0 | 0 | 1 | 1 | 1 | 1 |
| Example 33-1A | Particles 33-1 | H | A | A | A | 0 | 0 | 1 | 1 | 1 | 1 |
| Example 34-1A | Particles 34-1 | H | A | A | A | 0 | 0 | 0 | 0 | 1 | 0 |
| Example 35-1A | Particles 35-1 | H | A | A | A | 0 | 0 | 1 | 1 | 1 | 1 |
| Example 36-1A | Particles 36-1 | H | A | A | A | 0 | 0 | 0 | 0 | 1 | 0 |
| Example 37-1A | Particles 37-1 | H | A | A | A | 0 | 0 | 1 | 1 | 1 | 1 |
| Example 38-1A | Particles 38-1 | H | A | A | A | 0 | 0 | 0 | 0 | 1 | 0 |
| Example 39-1A | Particles 39-1 | H | A | A | A | 0 | 0 | 1 | 1 | 1 | 1 |
| Example 40-1A | Particles 40-1 | H | A | A | A | 0 | 0 | 0 | 0 | 1 | 0 |
| Example 41-1A | Particles 41-1 | H | A | A | A | 0 | 0 | 0 | 0 | 1 | 0 |
| Example 42-1A | Particles 42-1 | H | A | A | A | 0 | 0 | 0 | 0 | 1 | 0 |
| Example 43-1A | Particles 43-1 | 2H | A | A | A | 0 | 0 | 0 | 0 | 1 | 0 |
| Example 44-1A | Particles 44-1 | 2H | A | A | A | 0 | 0 | 0 | 0 | 1 | 0 |
| Example 45-1A | Particles 45-1 | 2H | A | A | A | 0 | 0 | 0 | 0 | 1 | 0 |
| Example 46-1A | Particles 46-1 | 2H | A | A | A | 0 | 0 | 0 | 0 | 1 | 0 |
| Example 47-1A | Particles 47-1 | 2H | A | A | A | 0 | 0 | 0 | 0 | 1 | 0 |
| Example 48-1A | Particles 48-1 | 3H | A | A | A | 0 | 0 | 0 | 0 | 1 | 0 |
| Example 49-1A | Particles 49-1 | H | A | A | A | 0 | 0 | 0 | 0 | 1 | 0 |
| Example 50-1A | Particles 50-1 | 2H | A | A | A | 0 | 0 | 0 | 0 | 1 | 0 |
| Example 51-1A | Particles 51-1 | 2H | A | A | A | 0 | 0 | 0 | 0 | 1 | 0 |
| Example 52-1A | Particles 52-1 | 2H | A | A | A | 0 | 0 | 0 | 0 | 1 | 0 |
| Example 53-1A | Particles 53-1 | 2H | A | A | A | 0 | 0 | 0 | 0 | 1 | 0 |
| Example 54-1A | Particles 54-1 | 2H | A | A | A | 0 | 0 | 0 | 0 | 1 | 0 |
| Example 55-1A | Particles 55-1 | 3H | A | A | A | 0 | 0 | 0 | 0 | 1 | 0 |
| Comparative Example 1-1A | Particles 56-1 | Less than 3B | D | D | D | 5 | 5 | 5 | 5 | 5 | 5 |
| Comparative Example 2-1A | Particles 57-1 | Less than 3B | D | D | D | 5 | 5 | 5 | 5 | 5 | 5 |
| Comparative Example 3-1A | Particles 58-1 | Less than 3B | D | D | D | 5 | 5 | 5 | 5 | 5 | 5 |

As presented in Table 6, the ink compositions (water dispersions of Particles 1-1 to 55-1) of Examples 1-1A to 55-1A in which gel particles having a polymerizable group, having a three-dimensional crosslinked structure including at least one bond selected from an urethane bond and an urea bond, and at least including a photopolymerization initiator and a resin not having a polymerizable group were dispersed in water were excellent in adhesiveness. The ink compositions of Examples 1-1A to 55-1A obtained excellent results in pencil hardness, and thus it was able to form cured films having excellent hardness. The ink compositions of Examples 1-1A to 55-1A were also excellent in jettability, redispersibility, and preservation stability.

The ink compositions of Comparative Examples 1-1A to 3-1A in which gel particles having a polymerizable group were not included were remarkably deteriorated in all of the adhesiveness, the hardness of cured films, the jettability, the redispersibility, and the preservation stability, compared with the ink compositions of Examples 1-1A to 55-1A.

[Evaluation of Ink Composition Using LED]

The ink compositions of Examples 43-1A to 55-1A were evaluated by using an LED. Specifically, with respect to the above evaluation of adhesiveness and pencil hardness, the same operations were performed except for changing the exposure light source to a 385 nm UV-LED irradiator (manufactured by CCS Inc.) for a test and changing the exposure energies to 300 mJ/cm$^2$.

The results are provided in Table 7.

| | | Fluorine-based surfactant (Product name: Capstone (Registered trademark) FS-31, DuPont, concentration of solid contents: 25 mass %) | 0.3 parts by mass |
|---|---|---|---|
| | | 2-Methylpropanediol | 4.7 parts by mass |

[Evaluation of Photosensitive Resin Compositions]

Evaluations of adhesiveness and pencil hardness were performed by using the photosensitive resin compositions obtained above.

Evaluations of the photosensitive resin compositions in adhesiveness were performed in the same manner as in the evaluations of the above ink compositions in adhesiveness except for using a polyvinyl chloride (PVC) sheet and an acrylic resin sheet as base materials in the evaluation of the above ink compositions in the adhesiveness.

The pencil hardness of the photosensitive resin composition was evaluated in the same method as in the evaluation of the ink composition in pencil hardness. The results were represented in Table 8.

TABLE 7

| | | | Evaluation results | | | | | |
|---|---|---|---|---|---|---|---|---|
| | | | | Adhesiveness | | | | |
| | | Pencil hardness | PVC | PS | PC | G-modified PET | PP | Acryl |
| Example 43-1A | Particles 43-1 | 2H | 0 | 0 | 0 | 0 | 1 | 0 |
| Example 44-1A | Particles 44-1 | 2H | 0 | 0 | 0 | 0 | 1 | 0 |
| Example 45-1A | Particles 45-1 | 2H | 0 | 0 | 0 | 0 | 1 | 0 |
| Example 46-1A | Particles 46-1 | 2H | 0 | 0 | 0 | 0 | 1 | 0 |
| Example 47-1A | Particles 47-1 | 2H | 0 | 0 | 0 | 0 | 1 | 0 |
| Example 48-1A | Particles 48-1 | 3H | 0 | 0 | 0 | 0 | 1 | 0 |
| Example 49-1A | Particles 49-1 | H | 0 | 0 | 0 | 0 | 1 | 0 |
| Example 50-1A | Particles 50-1 | 2H | 0 | 0 | 0 | 0 | 1 | 0 |
| Example 51-1A | Particles 51-1 | 2H | 0 | 0 | 0 | 0 | 1 | 0 |
| Example 52-1A | Particles 52-1 | 2H | 0 | 0 | 0 | 0 | 1 | 0 |
| Example 53-1A | Particles 53-1 | 2H | 0 | 0 | 0 | 0 | 1 | 0 |
| Example 54-1A | Particles 54-1 | 2H | 0 | 0 | 0 | 0 | 1 | 0 |
| Example 55-1A | Particles 55-1 | 3H | 0 | 0 | 0 | 0 | 1 | 0 |

As presented in Table 7, the ink compositions of Examples 43-1A to 55-1A using LED light in a case of curing exhibited excellent results in evaluations of adhesiveness and pencil hardness in the same manner as in a case of using an ozone-less metal halide lamp MAN250L (see Table 6 above).

[Manufacturing of Photosensitive Resin Compositions]

The photosensitive resin compositions of Examples 1-1B to 55-1B and Comparative Examples 1-1B to 3-1B were manufactured by mixing the following components.

—Components of Photosensitive Resin Compositions—

| Each of the water dispersions of Examples 1-1 to 55-1, each of the aqueous emulsion of Comparative Examples 1-1 to 2-1, or microcapsule dispersion liquid of Comparative Example 3-1 | 82 parts by mass |
|---|---|

TABLE 8

| | | Evaluation results | | |
|---|---|---|---|---|
| | | | Adhesiveness | |
| | | Pencil hardness | PVC | Acryl |
| Example 1-1B | Particles 1-1 | H | 0 | 1 |
| Example 2-1B | Particles 2-1 | H | 0 | 1 |
| Example 3-1B | Particles 3-1 | H | 0 | 1 |
| Example 4-1B | Particles 4-1 | H | 0 | 1 |
| Example 5-1B | Particles 5-1 | H | 0 | 1 |
| Example 6-1B | Particles 6-1 | H | 0 | 1 |
| Example 7-1B | Particles 7-1 | H | 0 | 1 |
| Example 8-1B | Particles 8-1 | H | 0 | 1 |
| Example 9-1B | Particles 9-1 | HB | 0 | 1 |
| Example 10-1B | Particles 10-1 | HB | 0 | 1 |
| Example 11-1B | Particles 11-1 | H | 0 | 1 |
| Example 12-1B | Particles 12-1 | H | 0 | 1 |
| Example 13-1B | Particles 13-1 | H | 0 | 1 |

TABLE 8-continued

| | | Evaluation results | | |
|---|---|---|---|---|
| | | | Adhesiveness | |
| | | Pencil hardness | PVC | Acryl |
| Example 14-1B | Particles 14-1 | H | 0 | 1 |
| Example 15-1B | Particles 15-1 | H | 0 | 1 |
| Example 16-1B | Particles 16-1 | H | 0 | 1 |
| Example 17-1B | Particles 17-1 | H | 0 | 1 |
| Example 18-1B | Particles 18-1 | H | 0 | 1 |
| Example 19-1B | Particles 19-1 | 2H | 0 | 1 |
| Example 20-1B | Particles 20-1 | 2H | 0 | 1 |
| Example 21-1B | Particles 21-1 | H | 0 | 1 |
| Example 22-1B | Particles 22-1 | H | 0 | 1 |
| Example 23-1B | Particles 23-1 | H | 0 | 0 |
| Example 24-1B | Particles 24-1 | H | 0 | 0 |
| Example 25-1B | Particles 25-1 | H | 0 | 0 |
| Example 26-1B | Particles 26-1 | H | 0 | 0 |
| Example 27-1B | Particles 27-1 | H | 0 | 0 |
| Example 28-1B | Particles 28-1 | H | 0 | 0 |
| Example 29-1B | Particles 29-1 | H | 0 | 0 |
| Example 30-1B | Particles 30-1 | H | 0 | 0 |
| Example 31-1B | Particles 31-1 | H | 0 | 1 |
| Example 32-1B | Particles 32-1 | H | 0 | 1 |
| Example 33-1B | Particles 33-1 | H | 0 | 1 |
| Example 34-1B | Particles 34-1 | H | 0 | 0 |
| Example 35-1B | Particles 35-1 | H | 0 | 1 |
| Example 36-1B | Particles 36-1 | H | 0 | 0 |
| Example 37-1B | Particles 37-1 | H | 0 | 1 |
| Example 38-1B | Particles 38-1 | H | 0 | 0 |
| Example 39-1B | Particles 39-1 | H | 0 | 1 |
| Example 40-1B | Particles 40-1 | H | 0 | 0 |
| Example 41-1B | Particles 41-1 | H | 0 | 0 |
| Example 42-1B | Particles 42-1 | H | 0 | 0 |
| Example 43-1B | Particles 43-1 | 2H | 0 | 0 |
| Example 44-1B | Particles 44-1 | 2H | 0 | 0 |
| Example 45-1B | Particles 45-1 | 2H | 0 | 0 |
| Example 46-1B | Particles 46-1 | 2H | 0 | 0 |
| Example 47-1B | Particles 47-1 | 2H | 0 | 0 |
| Example 48-1B | Particles 48-1 | 3H | 0 | 0 |
| Example 49-1B | Particles 49-1 | H | 0 | 0 |
| Example 50-1B | Particles 50-1 | 2H | 0 | 0 |
| Example 51-1B | Particles 51-1 | 2H | 0 | 0 |
| Example 52-1B | Particles 52-1 | 2H | 0 | 0 |
| Example 53-1B | Particles 53-1 | 2H | 0 | 0 |
| Example 54-1B | Particles 54-1 | 2H | 0 | 0 |
| Example 55-1B | Particles 55-1 | 3H | 0 | 0 |
| Comparative Example 1-1B | Particles 56-1 | Less than 3B | 5 | 5 |
| Comparative Example 2-1B | Particles 57-1 | Less than 3B | 5 | 5 |
| Comparative Example 3-1B | Particles 58-1 | Less than 3B | 5 | 5 |

As presented in Table 8, the photosensitive resin compositions (water dispersions of Particles 1-1 to 55-1) of Examples 1-1B to 55-1B in which gel particles having a polymerizable group, having a three-dimensional cross-linked structure including at least one bond selected from an urethane bond and an urea bond, and at least including a photopolymerization initiator and a resin not having a polymerizable group were dispersed in water exhibited remarkably excellent results in the evaluations of the adhesiveness and the pencil hardness compared with the photosensitive resin compositions of Comparative Examples 1-1B to 3-1B not including gel particles having a polymerizable group.

Examples of Second Aspect

Synthesis of Isocyanate Compound

Synthesis Example 1-2: NCO 104

Isocyanate Compound NCO 104 was obtained in the same method as in Synthesis Example 1-1 in the above example of the first aspect.

Synthesis Example 2-2: NCO 201

Isocyanate Compound NCO 201 was obtained in the same method as in Synthesis Example 2-1 in the above example of the first aspect.

Synthesis Example 3-2: NCO 206

Isocyanate Compound NCO 206 was obtained in the same method as in Synthesis Example 3-1 in the above example of the first aspect.

Synthesis Example 4-2: Isocyanate Compound 2 Having Hydrophilic Group

Isocyanate Compound 2 (isocyanate compound having carboxy group) having a hydrophilic group was obtained in the same method as in Synthesis Example 4-1 in the above example of the first aspect.

Synthesis Example 5-2: NCO 101, NCO 102, NCO 103, and NCO 105

Isocyanate Compounds NCO 101, NCO 102, NCO 103, and NCO 105 were synthesized in the same method as in Synthesis Example 5-1 in the above example of the first aspect.

Synthesis Example 6-2: NCO 202, NCO 203, and NCO 204

Isocyanate Compounds NCO 202, NCO 203, and NCO 204 were synthesized in the same method as in Synthesis Example 6-1 in the above example of the first aspect.

Synthesis Example 7-2: NCO 205, and NCO 207

Isocyanate Compounds NCO 205 and NCO 207 were synthesized in the same method as in Synthesis Example 7-1 in the above example of the first aspect.

Manufacturing of Water Dispersion

Example 1-2

<Emulsification Step>
—Manufacturing of Oil Phase Component—
39 g of Isocyanate Compound NCO 201 (trifunctional or higher functional isocyanate compound having polymerizable group, solid content: 35 mass %), 3.5 g of TAKENATE (Registered trademark) D-116N (adduct of trimethylolpropane (TMP), xylene diisocyanate (XDI), and polyethylene glycol monomethyl ether (E090), 50 mass % ethyl acetate solution, Isocyanate Compound 1 having hydrophilic group, hydrophilic group: a group having a polyether structure, Mitsui Chemicals, Inc.), 1 g of IRGACURE (Registered trademark) 907 (2-methyl-1-(4-methylthiophenyl)-2-morpholinopropan-1-one, photopolymerization initiator, BASF SE), and 5 g of EBECRYL (Registered trademark) 525 (Polyester: tripropylene glycol diacrylate (TPGDA)=60%:40%, resin having a polymerizable group, Daicel-Allnex Ltd.) were dissolved in 24 g of ethyl acetate (organic solvent), so as to obtain an oil phase component.

—Manufacturing of Water Phase Component—

0.4 g of sodium dodecyl sulfate (SDS, surfactant) was dissolved in 50 g of deionized water, so as to obtain a water phase component.

The water phase component was added to and mixed with the oil phase component, and the obtained mixture was emulsified for 10 minutes at 12,000 rpm by using a homogenizer, so as to obtain an emulsion.

<Gelation Step>

The obtained emulsion was added to 25 g of deionized water and was stirred for 30 minutes at room temperature, and stirring was further performed for three hours at 50° C., so as to filter out ethyl acetate from the emulsion. The obtained liquid was stirred for 24 hours at 50° C., so as to form particles in the liquid. The liquid including particles was diluted in deionized water such that the concentration of solid contents (that is, the content of the particles) become 20 mass %, so as to obtain a water dispersion (water dispersion of Particles 1-2) of Example 1-2.

Examples 2-2 to 7-2

Water dispersions (water dispersions of Particles 2-2 to 7-2) of Example 2-2 to 7-2 were manufactured in the same operation as in Example 1-2, except for changing a trifunctional or higher functional isocyanate compound (Isocyanate Compound NCO 201) having a polymerizable group used in the manufacturing of the oil phase component in Example 1-2, to trifunctional or higher functional isocyanate compounds having polymerizable groups presented in Table 9.

Example 8-2

A water dispersion (water dispersion of Particles 8-2) of Example 8-2 were manufactured in the same operation as in Example 1-2, except for changing the surfactant (sodium dodecyl sulfate (SDS)) used in the manufacturing of the water phase component in Example 1-2, to a surfactant presented in Table 9.

Example 9-2

<Emulsification Step>

—Manufacturing of Oil Phase Component—

19 g of Isocyanate Compound NCO 104 (trifunctional or higher functional isocyanate compound), 3.5 g of TAKENATE (Registered trademark) D-116N (Isocyanate Compound 1 having hydrophilic group), 1 g of IRGACURE (Registered trademark) 907 (photopolymerization initiator), 5 g of EBECRYL (Registered trademark) 525 (resin having polymerizable group), and 6.5 g of diacrylate of a neopentyl glycol propylene oxide adduct (NPGPODA, difunctional polymerizable monomer, Sartomer) were dissolved in 34 g of ethyl acetate (organic solvent), so as to obtain an oil phase component.

—Manufacturing of Water Phase Component—

0.4 g of sodium cetyl sulfate (SCS, surfactant) was dissolved in 50 g of deionized water, so as to obtain a water phase component.

The water phase component was added to and mixed with the oil phase component, and the obtained mixture was emulsified for 10 minutes at 12,000 rpm by using a homogenizer, so as to obtain an emulsion.

<Gelation Step>

The obtained emulsion was added to 25 g of deionized water and was stirred for 30 minutes at room temperature, and stirring was further performed for three hours at 50° C., so as to filter out ethyl acetate from the emulsion. The obtained liquid was stirred for 24 hours at 50° C., so as to form particles in the liquid. The liquid including particles was diluted in deionized water such that the concentration of solid contents become 20 mass %, so as to obtain a water dispersion (water dispersion of Particles 9-2) of Example 9-2.

Examples 10-2 to 12-2

Water dispersions (water dispersions of Particles 10-2 to 12-2) of Examples 10-2 to 12-2 were manufactured in the same operation as in Example 9-2, except for changing a polymerizable monomer (neopentyl glycol propylene oxide adduct diacrylate (NPGPODA)) used in the manufacturing of the oil phase component in Example 9-2, to a polymerizable monomer presented in Table 9.

Examples 13-2 to 18-2

Water dispersions (water dispersions of Particles 13-2 to 18-2) of Examples 13-2 to 18-2 were manufactured in the same operation as in Example 9-2, except for changing the trifunctional or higher functional isocyanate compound (Isocyanate Compound NCO 104) and the polymerizable monomer (neopentyl glycol propylene oxide adduct diacrylate (NPGPODA)) used in the manufacturing of the oil phase component in Example 9-2, to a trifunctional or higher functional isocyanate compound and a polymerizable monomer presented in Table 9.

Examples 19-2 to 20-2

Water dispersions (water dispersions of Particles 19-2 to 20-2) of Examples 19-2 to 20-2 were manufactured in the same operation as in Example 9-2, except for changing the trifunctional or higher functional isocyanate compound (Isocyanate Compound NCO 104) and the polymerizable monomer (neopentyl glycol propylene oxide adduct diacrylate (NPGPODA)) used in the manufacturing of the oil phase component in Example 9-2, to trifunctional or higher functional isocyanate compounds having polymerizable groups and polymerizable monomers presented in Table 9.

Example 21-2

<Emulsification Step>

—Manufacturing of Oil Phase Component—

19 g of Isocyanate Compound NCO 104 (trifunctional or higher functional isocyanate compound), 2.5 g of an isocyanate compound having a carboxy group (Isocyanate Compound 2 having a hydrophilic group, solid content: 35 mass %), 1 g of IRGACURE (Registered trademark) 907 (photopolymerization initiator), 5 g of EBECRYL (Registered trademark) 525 (resin having polymerizable group), and 6.5 g of SR399E (dipentaerythritol pentaacrylate, pentafunctional polymerizable monomer, Sartomer) were dissolved in 33 g of ethyl acetate (organic solvent), so as to obtain an oil phase component.

—Manufacturing of Water Phase Component—

0.4 g of sodium dodecyl sulfate (SDS, surfactant) and 0.033 g of sodium hydroxide (neutralizing agent) were dissolved in 50 g of deionized water, so as to obtain a water phase component.

The water phase component was added to and mixed with the oil phase component, and the obtained mixture was emulsified for 10 minutes at 12,000 rpm by using a homogenizer, so as to obtain an emulsion.

<Gelation Step>

The obtained emulsion was added to 25 g of deionized water and was stirred for 30 minutes at room temperature, and stirring was further performed for three hours at 50° C., so as to filter out ethyl acetate from the emulsion. The obtained liquid was stirred for 24 hours at 50° C., so as to form particles in the liquid. The liquid including particles was diluted in deionized water such that the concentration of solid contents become 20 mass %, so as to obtain a water dispersion (water dispersion of Particles 21-2) of Example 21-2.

Example 22-2

Emulsification Step

—Manufacturing of Oil Phase Component—

19 g of Isocyanate Compound NCO 104 (trifunctional or higher functional isocyanate compound), 3.5 g of TAKENATE (Registered trademark) D-116N (Isocyanate Compound 1 having a hydrophilic group), 2.5 g of isocyanate compound (Isocyanate Compound 2 having a hydrophilic group) having a carboxy group, 1 g of IRGACURE (Registered trademark) 907 (photopolymerization initiator), 5 g of EBECRYL (Registered trademark) 525 (a resin having a polymerizable group), and 6.5 g of SR399E (pentafunctional polymerizable monomer) were dissolved 35 g of ethyl acetate (organic solvent), so as to obtain an oil phase component.

—Manufacturing of Water Phase Component—

0.4 g of sodium dodecyl sulfate (SDS, surfactant) and 0.033 g of sodium hydroxide (neutralizing agent) were dissolved in 50 g of deionized water, so as to obtain a water phase component.

The water phase component was added to and mixed with the oil phase component, and the obtained mixture was emulsified for 10 minutes at 12,000 rpm by using a homogenizer, so as to obtain an emulsion.

<Gelation Step>

The obtained emulsion was added to 25 g of deionized water and was stirred for 30 minutes at room temperature, and stirring was further performed for three hours at 50° C., so as to filter out ethyl acetate from the emulsion. The obtained liquid was stirred for 24 hours at 50° C., so as to form particles in the liquid. The liquid including particles was diluted in deionized water such that the concentration of solid contents become 20 mass %, so as to obtain a water dispersion (water dispersion of Particles 22-2) of Example 22-2.

Examples 23-2 to 49-2

Water dispersions (water dispersions of Particles 23-2 to 49-2) of Examples 23-2 to 49-2 were manufactured in the same operation as in Example 9-2, except for changing the polymerizable monomer (neopentyl glycol propylene oxide adduct diacrylate (NPGPODA)) and the resin having a polymerizable group (EBECRYL (Registered trademark) 525) used in the manufacturing of the oil phase component in Example 9-2, to polymerizable monomers and resins having polymerizable groups presented in Table 9.

Examples 50-2 to 51-2

Water dispersions (water dispersions of Particles 50-2 to 51-2) of Examples 50-2 to 51-2 were manufactured in the same operation as in Example 9-2, except for changing the polymerizable monomer (neopentyl glycol propylene oxide adduct diacrylate (NPGPODA)), the resin having a polymerizable group (EBECRYL (Registered trademark) 525), the photopolymerization initiator (IRGACURE (Registered trademark) 907) used in the manufacturing of the oil phase component in Example 9-2, to polymerizable monomers, resins having polymerizable groups, and photopolymerization initiators presented in Table 9.

Example 52-2

A water dispersion (water dispersion of Particles 52-2) of Example 52-2 was manufactured in the same operation as in Example 21-2, except for changing the resin having a polymerizable group (EBECRYL (Registered trademark) 525) and the photopolymerization initiator (IRGACURE (Registered trademark) 907) used in the manufacturing of the oil phase component in Example 21-2, to a resin having a polymerizable group and a photopolymerization initiator presented in Table 9.

Example 53-2

A water dispersion (water dispersion of Particles 53-2) of Example 53-2 was manufactured in the same operation as in Example 22-2, except for changing the resin having a polymerizable group (EBECRYL (Registered trademark) 525) and the photopolymerization initiator (IRGACURE (Registered trademark) 907) used in the manufacturing of the oil phase component in Example 22-2, to a resin having a polymerizable group and a photopolymerization initiator presented in Table 9.

Example 54-2

A water dispersion (water dispersion of Particles 54-2) of Example 54-2 was manufactured in the same operation as in Example 1-2, except for changing the resin having a polymerizable group (EBECRYL (Registered trademark) 525) and the photopolymerization initiator (IRGACURE (Registered trademark) 907) used in the manufacturing of the oil phase component in Example 1-2, to a resin having a polymerizable group and a photopolymerization initiator presented in Table 9 and changing the surfactant (sodium dodecyl sulfate (SDS)) used in the manufacturing of the water phase component to a surfactant presented in Table 9.

Example 55-2

A water dispersion (water dispersion of Particles 55-2) of Example 55-2 were manufactured in the same operation as in Example 9-2, except for changing the trifunctional or higher functional isocyanate compound (Isocyanate Compound NCO 104), the polymerizable monomer (neopentyl glycol propylene oxide adduct diacrylate (NPGPODA)), the resin having a polymerizable group (EBECRYL (Registered trademark) 525), and the photopolymerization initiator (IRGACURE (Registered trademark) 907) used in the manufacturing of the oil phase component in Example 9-2, to a trifunctional or higher functional isocyanate compound having a polymerizable group, a polymerizable monomer, a resin having a polymerizable group, and a photopolymerization initiator presented in Table 9.

Example 56-2

Emulsification Step

Manufacturing of Oil Phase Component—

19 g of Isocyanate Compound NCO 104 (trifunctional or higher functional isocyanate compound), 3.5 g of TAKENATE (Registered trademark) D-116N (Isocyanate Compound 1 having hydrophilic group), 1 g of IRGACURE (Registered trademark) 819 (bis(2,4,6-trimethylbenzoyl)-phenylphosphine oxide, photopolymerization initiator, BASF SE), g of ANTHRACURE (Registered trademark) UVS-1331 (cationic photosensitizer, 9,10-dibutoxyanthracene, Awasaki Kasei Chemicals), 5 g of UV-7620EA (urethane acrylate resin, a resin having a polymerizable group, The Nippon Synthetic Chemical Industry Co., Ltd.), and 6.5 g of SR399E (pentafunctional polymerizable monomer) were dissolved in 37 g of ethyl acetate (organic solvent), so as to obtain an oil phase component.

—Manufacturing of Water Phase Component—

0.4 g of sodium cetyl sulfate (SCS, surfactant) was dissolved in 50 g of deionized water, so as to obtain a water phase component.

The water phase component was added to and mixed with the oil phase component, and the obtained mixture was emulsified for 10 minutes at 12,000 rpm by using a homogenizer, so as to obtain an emulsion.

<Gelation Step>

The obtained emulsion was added to 25 g of deionized water and was stirred for 30 minutes at room temperature, and stirring was further performed for three hours at 50° C., so as to filter out ethyl acetate from the emulsion. The obtained liquid was stirred for 24 hours at 50° C., so as to form particles in the liquid. The liquid including particles was diluted in deionized water such that the concentration of solid contents become 20 mass %, so as to obtain a water dispersion (water dispersion of Particles 56-2) of Example 56-2.

Examples 57-2 to 58-2

Water dispersions (water dispersions of Particles 57-2 to 58-2) of Examples 57-2 to 58-2 were manufactured in the same operation as in Example 56-2, except for changing the sensitizer (ANTHRACURE (Registered trademark) UVS-1331) used in the manufacturing of the oil phase component in Example 56-2, to a sensitizer presented in Table 9.

Example 59-2

<Emulsification Step>

—Manufacturing of Oil Phase Component—

19 g of Isocyanate Compound NCO 104 (trifunctional or higher functional isocyanate compound), 2.5 g of an isocyanate compound (Isocyanate Compound 2 having a hydrophilic group) having a carboxy group, 1 g of IRGACURE (Registered trademark) 819 (photopolymerization initiator), 1 g of QUANTACURE (Registered trademark) ITX (sensitizer, 2-isopropylthioxanthone, Tokyo Chemical Industry Co., Ltd.), 5 g of UV-7620EA (a resin having a polymerizable group), and 6.5 g of SR399E (pentafunctional polymerizable monomer) were dissolved in 35 g of ethyl acetate (organic solvent), so as to obtain an oil phase component.

—Manufacturing of Water Phase Component—

0.4 g of sodium dodecyl sulfate (SDS, surfactant) and 0.033 g of sodium hydroxide (neutralizing agent) were dissolved in 50 g of deionized water, so as to obtain a water phase component.

The water phase component was added to and mixed with the oil phase component, and the obtained mixture was emulsified for 10 minutes at 12,000 rpm by using a homogenizer, so as to obtain an emulsion.

<Gelation Step>

The obtained emulsion was added to 25 g of deionized water and was stirred for 30 minutes at room temperature, and stirring was further performed for three hours at 50° C., so as to filter out ethyl acetate from the emulsion. The obtained liquid was stirred for 24 hours at 50° C., so as to form particles in the liquid. The liquid including particles was diluted in deionized water such that the concentration of solid contents become 20 mass %, so as to obtain a water dispersion (water dispersion of Particles 59-2) of Example 59-2.

Example 60-2

<Emulsification Step>

—Manufacturing of Oil Phase Component—

19 g of Isocyanate Compound NCO 104 (trifunctional or higher functional isocyanate compound), 3.5 g of TAKENATE (Registered trademark) D-116N (Isocyanate Compound 1 having a hydrophilic group), 2.5 g of an isocyanate compound (Isocyanate Compound 2 having a hydrophilic group) having a carboxy group, 1 g of IRGACURE (Registered trademark) 819 (photopolymerization initiator), 1 g of QUANTACURE (Registered trademark) ITX (sensitizer), 5 g of UV-7620EA (a resin having a polymerizable group), and 6.5 g of SR399E (pentafunctional polymerizable monomer) and were dissolved in 38 g of ethyl acetate (organic solvent), so as to obtain an oil phase component.

—Manufacturing of Water Phase Component—

0.4 g of sodium dodecyl sulfate (SDS, surfactant) and 0.033 g of sodium hydroxide (neutralizing agent) were dissolved in 50 g of deionized water, so as to obtain a water phase component.

The water phase component was added to and mixed with the oil phase component, and the obtained mixture was emulsified for 10 minutes at 12,000 rpm by using a homogenizer, so as to obtain an emulsion.

<Gelation Step>

The obtained emulsion was added to 25 g of deionized water and was stirred for 30 minutes at room temperature, and stirring was further performed for three hours at 50° C., so as to filter out ethyl acetate from the emulsion. The obtained liquid was stirred for 24 hours at 50° C., so as to form particles in the liquid. The liquid including particles was diluted in deionized water such that the concentration of solid contents become 20 mass %, so as to obtain a water dispersion (water dispersion of Particles 60-2) of Example 60-2.

Example 61-2

A water dispersion (water dispersion of Particles 61-2) of Example 61-2 was manufactured in the same operation as in Example 1-2, except for changing the resin having a polymerizable group (EBECRYL (Registered trademark) 525) and the photopolymerization initiator (IRGACURE (Registered trademark) 907) used in the manufacturing of the oil phase component in Example 1-2 to a resin having a polymerizable group and a photopolymerization initiator presented in Table 9, changing the surfactant (sodium dodecyl sulfate (SDS)) manufactured in the water phase component to a surfactant presented in Table 9, and using 1 g of new QUANTACURE (Registered trademark) ITX (sensitizer) in the manufacturing of the oil phase component.

Example 62-2

A water dispersion (water dispersion of Particles 62-2) of Example 62-2 was manufactured in the same operation as in Example 9-2, except for changing the trifunctional or higher functional isocyanate compound (Isocyanate Compound NCO 104), the polymerizable monomer (neopentyl glycol propylene oxide adduct diacrylate (NPGPODA)), the resin having a polymerizable group (EBECRYL (Registered trademark) 525), and the photopolymerization initiator (IRGACURE (Registered trademark) 907) used in the manufacturing of the oil phase component in Example 9-2 to a trifunctional or higher functional isocyanate compound having a polymerizable group, a polymerizable monomer, a resin having a polymerizable group, and a photopolymerization initiator presented in Table 9, and using 1 g of new QUANTACURE (Registered trademark) ITX (sensitizer) in the manufacturing of the oil phase component.

Details of the water dispersions (water dispersions of Particles 1-2 to 62-2) of Examples 1-2 to 62-2 obtained above are represented in Table 9.

TABLE 9

| | | Particles | | | | | | | | |
|---|---|---|---|---|---|---|---|---|---|---|
| | | Isocyanate compound | | | | | | | | |
| | | Isocyanate Compound 1 having hydrophilic group | Isocyanate Compound 2 having hydrophilic group | Trifunctional or higher functional isocyanate compound | | Particle including compound | | | | |
| | | | | | Surfactant | Polymerizable monomer | Photopolymerization initiator | Sensitizer | Resin having polymerizable group | |
| | | | | | | | | | Compound | Mw |
| Example 1-2 | Particles 1-2 | D-116N | — | NCO 201 | SDS | — | IRGACURE 907 | — | EBECRYL 525 | 40,000 |
| Example 2-2 | Particles 2-2 | D-116N | — | NCO 202 | SDS | — | IRGACURE 907 | — | EBECRYL 525 | 40,000 |
| Example 3-2 | Particles 3-2 | D-116N | — | NCO 203 | SDS | — | IRGACURE 907 | — | EBECRYL 525 | 40,000 |
| Example 4-2 | Particles 4-2 | D-116N | — | NCO 204 | SDS | — | IRGACURE 907 | — | EBECRYL 525 | 40,000 |
| Example 5-2 | Particles 5-2 | D-116N | — | NCO 205 | SDS | — | IRGACURE 907 | — | EBECRYL 525 | 40,000 |
| Example 6-2 | Particles 6-2 | D-116N | — | NCO 206 | SDS | — | IRGACURE 907 | — | EBECRYL 525 | 40,000 |
| Example 7-2 | Particles 7-2 | D-116N | — | NCO 207 | SDS | — | IRGACURE 907 | — | EBECRYL 525 | 40,000 |
| Example 8-2 | Particles 8-2 | D-116N | — | NCO 201 | SCS | — | IRGACURE 907 | — | EBECRYL 525 | 40,000 |
| Example 9-2 | Particles 9-2 | D-116N | — | NCO 104 | SCS | NPGPODA | IRGACURE 907 | — | EBECRYL 525 | 40,000 |
| Example 10-2 | Particles 10-2 | D-116N | — | NCO 104 | SCS | A-TMM-3L | IRGACURE 907 | — | EBECRYL 525 | 40,000 |
| Example 11-2 | Particles 11-2 | D-116N | — | NCO 104 | SCS | SR399E | IRGACURE 907 | — | EBECRYL 525 | 40,000 |
| Example 12-2 | Particles 12-2 | D-116N | — | NCO 104 | SCS | A-DPH | IRGACURE 907 | — | EBECRYL 525 | 40,000 |
| Example 13-2 | Particles 13-2 | D-116N | — | NCO 101 | SCS | SR399E | IRGACURE 907 | — | EBECRYL 525 | 40,000 |
| Example 14-2 | Particles 14-2 | D-116N | — | NCO 102 | SCS | SR399E | IRGACURE 907 | — | EBECRYL 525 | 40,000 |
| Example 15-2 | Particles 15-2 | D-116N | — | NCO 103 | SCS | SR399E | IRGACURE 907 | — | EBECRYL 525 | 40,000 |
| Example 16-2 | Particles 16-2 | D-116N | — | NCO 105 | SCS | SR399E | IRGACURE 907 | — | EBECRYL 525 | 40,000 |
| Example 17-2 | Particles 17-2 | D-116N | — | DURANATE TKA-100 | SCS | SR399E | IRGACURE 907 | — | EBECRYL 525 | 40,000 |
| Example 18-2 | Particles 18-2 | D-116N | — | DURANATE TSE-100 | SCS | SR399E | IRGACURE 907 | — | EBECRYL 525 | 40,000 |
| Example 19-2 | Particles 19-2 | D-116N | — | NCO 201 | SCS | SR399E | IRGACURE 907 | — | EBECRYL 525 | 40,000 |
| Example 20-2 | Particles 20-2 | D-116N | — | NCO 201 | SCS | A-DPH | IRGACURE 907 | — | EBECRYL 525 | 40,000 |

TABLE 9-continued

| | | Particles | | | | | | | | |
|---|---|---|---|---|---|---|---|---|---|---|
| | | Isocyanate compound | | | | Particle including compound | | | | |
| | | Isocyanate Compound 1 having hydrophilic group | Isocyanate Compound 2 having hydrophilic group | Trifunctional or higher functional isocyanate compound | Surfactant | Polymerizable monomer | Photopolymerization initiator | Sensitizer | Resin having polymerizable group | |
| | | | | | | | | | Compound | Mw |
| Example 21-2 | Particles 21-2 | — | Isocyanate compound having carboxy group | NCO 104 | SDS | SR399E | IRGACURE 907 | — | EBECRYL 525 | 40,000 |
| Example 22-2 | Particles 22-2 | D-116N | Isocyanate compound having carboxy group | NCO 104 | SDS | SR399E | IRGACURE 907 | — | EBECRYL 525 | 40,000 |
| Example 23-2 | Particles 23-2 | D-116N | — | NCO 104 | SCS | SR399E | IRGACURE 907 | — | (ACA)Z200M | 12,000 |
| Example 24-2 | Particles 24-2 | D-116N | — | NCO 104 | SCS | SR399E | IRGACURE 907 | — | HITALOID 7975D | 15,000 |
| Example 25-2 | Particles 25-2 | D-116N | — | NCO 104 | SCS | SR399E | IRGACURE 907 | — | EBECRYL 8402 | 1,000 |
| Example 26-2 | Particles 26-2 | D-116N | — | NCO 104 | SCS | SR399E | IRGACURE 907 | — | EBECRYL 9270 | 1,000 |
| Example 27-2 | Particles 27-2 | D-116N | — | NCO 104 | SCS | SR399E | IRGACURE 907 | — | EBECRYL 8311 | n/a |
| Example 28-2 | Particles 28-2 | D-116N | — | NCO 104 | SCS | SR399E | IRGACURE 907 | — | EBECRYL 8701 | 2,000 |
| Example 29-2 | Particles 29-2 | D-116N | — | NCO 104 | SCS | SR399E | IRGACURE 907 | — | KRM8667 | 2,000 |
| Example 30-2 | Particles 30-2 | D-116N | — | NCO 104 | SCS | SR399E | IRGACURE 907 | — | KRM8528 | 1,600 |
| Example 31-2 | Particles 31-2 | D-116N | — | NCO 104 | SCS | SR399E | IRGACURE 907 | — | CN964 | n/a |
| Example 32-2 | Particles 32-2 | D-116N | — | NCO 104 | SCS | SR399E | IRGACURE 907 | — | CN9012 | n/a |
| Example 33-2 | Particles 33-2 | D-116N | — | NCO 104 | SCS | SR399E | IRGACURE 907 | — | UV-7620EA | 4,100 |
| Example 34-2 | Particles 34-2 | D-116N | — | NCO 104 | SCS | SR399E | IRGACURE 907 | — | UV-7630B | 2,200 |
| Example 35-2 | Particles 35-2 | D-116N | — | NCO 104 | SCS | SR399E | IRGACURE 907 | — | U-15HA | 2,300 |
| Example 36-2 | Particles 36-2 | D-116N | — | NCO 104 | SCS | SR399E | IRGACURE 907 | — | U-200PA | 2,600 |
| Example 37-2 | Particles 37-2 | D-116N | — | NCO 104 | SCS | SR399E | IRGACURE 907 | — | HITALOID 7902-1 | n/a |
| Example 38-2 | Particles 38-2 | D-116N | — | NCO 104 | SCS | SR399E | IRGACURE 907 | — | 8UA-140 | 30,000 |
| Example 39-2 | Particles 39-2 | D-116N | — | NCO 104 | SCS | SR399E | IRGACURE 907 | — | 8UX-015A | 1000-2000 |
| Example 40-2 | Particles 40-2 | D-116N | — | NCO 104 | SCS | SR399E | IRGACURE 907 | — | CN2271E | n/a |
| Example 41-2 | Particles 41-2 | D-116N | — | NCO 104 | SCS | SR399E | IRGACURE 907 | — | CN2300 | n/a |
| Example 42-2 | Particles 42-2 | D-116N | — | NCO 104 | SCS | SR399E | IRGACURE 907 | — | CN2304 | n/a |
| Example 43-2 | Particles 43-2 | D-116N | — | NCO 104 | SCS | SR399E | IRGACURE 907 | — | EBECRYL 436 | 5,000 |
| Example 44-2 | Particles 44-2 | D-116N | — | NCO 104 | SCS | SR399E | IRGACURE 907 | — | EBECRYL 438 | 5,000 |
| Example 45-2 | Particles 45-2 | D-116N | — | NCO 104 | SCS | SR399E | IRGACURE 907 | — | EBECRYL 446 | 4,400 |
| Example 46-2 | Particles 46-2 | D-116N | — | NCO 104 | SCS | SR399E | IRGACURE 907 | — | EBECRYL 524 | 1,000 |
| Example 47-2 | Particles 47-2 | D-116N | — | NCO 104 | SCS | SR399E | IRGACURE 907 | — | ADP-400 | n/a |
| Example 48-2 | Particles 48-2 | D-116N | — | NCO 104 | SCS | SR399E | IRGACURE 907 | — | EBECRYL 3708 | 1,500 |
| Example 49-2 | Particles 49-2 | D-116N | — | NCO 104 | SCS | SR399E | IRGACURE 907 | — | CN307 | n/a |
| Example 50-2 | Particles 50-2 | D-116N | — | NCO 104 | SCS | SR399E | IRGACURE 819 | — | UV-7620EA | 4,100 |
| Example 51-2 | Particles 51-2 | D-116N | — | NCO 104 | SCS | SR399E | TPO | — | UV-7620EA | 4,100 |
| Example 52-2 | Particles 52-2 | — | Isocyanate compound having carboxy group | NCO 104 | SDS | SR399E | IRGACURE 819 | — | UV-7620EA | 4,100 |
| Example 53-2 | Particles 53-2 | D-116N | Isocyanate com- | NCO 104 | SDS | SR399E | IRGACURE 819 | — | UV-7620EA | 4,100 |

TABLE 9-continued

| | | Particles | | | | | | | | |
|---|---|---|---|---|---|---|---|---|---|---|
| | | Isocyanate compound | | | | Particle including compound | | | | |
| | | Isocyanate Compound 1 having hydrophilic group | Isocyanate Compound 2 having hydrophilic group | Trifunctional or higher functional isocyanate compound | Surfactant | Polymerizable monomer | Photopolymerization initiator | Sensitizer | Resin having polymerizable group Compound | Mw |
| Example 54-2 | Particles 54-2 | D-116N | — | NCO 201 | SCS | — | IRGACURE 819 | — | UV-7620EA | 4,100 |
| Example 55-2 | Particles 55-2 | D-116N | — | NCO 201 | SCS | SR399E | IRGACURE 819 | — | UV-7620EA | 4,100 |
| Example 56-2 | Particles 56-2 | D-116N | — | NCO 104 | SCS | SR399E | IRGACURE 819 | UVS-1331 | UV-7620EA | 4,100 |
| Example 57-2 | Particles 57-2 | D-116N | — | NCO 104 | SCS | SR399E | IRGACURE 819 | ITX | UV-7620EA | 4,100 |
| Example 58-2 | Particles 58-2 | D-116N | — | NCO 104 | SCS | SR399E | IRGACURE 819 | DETX | UV-7620EA | 4,100 |
| Example 59-2 | Particles 59-2 | — | Isocyanate compound having carboxy group | NCO 104 | SDS | SR399E | IRGACURE 819 | ITX | UV-7620EA | 4,100 |
| Example 60-2 | Particles 60-2 | D-116N | Isocyanate compound having carboxy group | NCO 104 | SDS | SR399E | IRGACURE 819 | ITX | UV-7620EA | 4,100 |
| Example 61-2 | Particles 61-2 | D-116N | — | NCO 201 | SCS | — | IRGACURE 819 | ITX | UV-7620EA | 4,100 |
| Example 62-2 | Particles 62-2 | D-116N | — | NCO 201 | SCS | SR399E | IRGACURE 819 | ITX | UV-7620EA | 4,100 |

D-116N and an isocyanate compound having a carboxy group in Table 9 were D-116N and the isocyanate compound having a carboxy group in Table 5, structural formulae thereof were also provided above, and thus descriptions thereof are omitted here.

The expression "-" in Table 9 means that the corresponding component was not used, and the expression "n/a" means that analysis was not performed.

Each of the components presented in Table 9 is as follows.
TSE-100 (Product name: DURANATE (Registered trademark) TSE-100, isocyanurate-type trifunctional isocyanate compound, containing 12.0 mass % of isocyanate group, Asahi Kasei Corporation)
ATMM-3L (Product name, pentaerythritol triacrylate, trifunctional polymerizable monomer, Shin-Nakamura Chemical Co., Ltd.)
A-DPH (Product name, dipentaerythritol hexaacrylate, hexafunctional polymerizable monomer, Shin-Nakamura Chemical Co., Ltd.)
DETX (Product name: KAYACURE DETX, 2,4-diethylthioxanthone, Nippon Kayaku Co., Ltd.)
(ACA) Z200M (Product name, acrylic resin, Daicel-Allnex Ltd.)
HITAROID 7975D (Product name, acrylic resin, Hitachi Chemical Co. Ltd.)
EBECRYL 8402 (Product name: EBECRYL (Registered trademark) 8402, urethane resin, Daicel-Allnex Ltd.)
EBECRYL 9270 (Product name: EBECRYL (Registered trademark) 9270, urethane resin, Daicel-Allnex Ltd.)
EBECRYL 8311 (Product name: EBECRYL (Registered trademark) 8311, urethane resin, Daicel-Allnex Ltd.)
EBECRYL 8701 (Product name: EBECRYL (Registered trademark) 8701, urethane resin, Daicel-Allnex Ltd.)
KRM8667 (Product name, urethane resin, Daicel-Allnex Ltd.)
KRM8528 (Product name, urethane resin, 20 mass % ethyl acetate solution, Daicel-Allnex Ltd.)
CN964 (Product name, urethane resin, Sartomer)
CN9012 (Product name, urethane resin, Sartomer)
UV-7630B (Product name, urethane resin, The Nippon Synthetic Chemical Industry Co., Ltd.)
U-15HA (Product name, urethane resin, Shin-Nakamura Chemical Co., Ltd.)
U-200PA (Product name, urethane resin, Shin-Nakamura Chemical Co., Ltd.)
HITAROID 7902-1 (Product name, urethane resin, Hitachi Chemical Co. Ltd.)
8UA-140 (Product name: ACRYD 8UA-140, urethane resin, Taisei Fine Chemical Co., Ltd.)
8UX-015A (Product name: ACRYD 8UX-015A, urethane resin, Taisei Fine Chemical Co., Ltd.)
CN2271E (Product name, polyester resin, Sartomer)
CN2300 (Product name, polyester resin, Sartomer)
CN2304 (Product name, polyester resin, Sartomer)
EBECRYL 436 (Product name: EBECRYL (Registered trademark) 436, polyester resin, Daicel-Allnex Ltd.)
EBECRYL 438 (Product name: EBECRYL (Registered trademark) 438, polyester resin, Daicel-Allnex Ltd.)
EBECRYL 446 (Product name: EBECRYL (Registered trademark) 446, polyester resin, Daicel-Allnex Ltd.)
EBECRYL 524 (Product name: EBECRYL (Registered trademark) 524, polyester resin, Daicel-Allnex Ltd.)

ADP-400 (Product name: BLEMMER (Registered trademark) ADP-400, polyether resin, NOF Corporation)
EBECRYL 3708 (Product name: EBECRYL (Registered trademark) 3708, epoxy resin, Daicel-Allnex Ltd.)
CN307 (Product name, polybutadiene resin, Sartomer)

Synthesis of Urethane Acrylate

Comparative Synthesis Example 1-2: Amphiphilic Urethane Acrylate (a)

444.6 parts by mass of isophorone diisocyanate (IPDI) and 202.3 parts by mass of 1,12-dodecanediol were introduced to a reaction vessel including a stirrer, a cooling pipe, a dropping funnel, and an air introduction pipe, 0.26 parts by mass of tin 2-ethylhexanoate was added under stirring, the temperature in the reaction vessel was increased to 90° C., and reaction was performed for 1.5 hours. After the reaction, 700.0 parts by mass of methoxy PEG1000 (methoxy polyethylene glycol, Toho Chemical Industry Co., Ltd.) and 0.54 parts by mass of tin 2-ethylhexanoate were added to the obtained reactant, and reaction was further performed for 1.5 hours.
Subsequently, 1300.0 parts by mass of dipentaerythritol pentaacrylate (SR399E), 1.32 parts by mass of methoquinone, and 1.06 parts by mass of tin 2-ethylhexanoate were introduced to this reaction vessel and were mixed with each other, the temperature in the reaction vessel was increased to 85° C. under air bubbling, and reaction was performed for three hours. After the reaction, the obtained reactant was cooled down, so as to obtain amphiphilic Urethane Acrylate (a).

Comparative Synthesis Example 2-2: Urethane Acrylate (b)

578.0 parts by mass of trimer (CORONATE (Registered trademark) HXR, Tosoh Corporation) of hexamethylene diisocyanate (HMDI), 200.0 parts by mass of methoxy PEG400 (methoxy polyethylene glycol, Toho Chemical Industry Co., Ltd.), and 200.0 parts by mass of methoxy PEG1000 were introduced to a reaction vessel including a stirrer, a cooling pipe, a dropping funnel, and an air introduction pipe, 0.39 parts by mass of tin 2-ethylhexanoate was added under stirring, the temperature in the reaction vessel was increased to 75° C., and reaction was performed for 1.5 hours.
Subsequently, 1051.6 parts by mass of pentaerythritol triacrylate (A-TMM-3L, Shin-Nakamura Chemical Co., Ltd.), 1.01 parts by mass of methoquinone, and 0.81 parts by mass of tin 2-ethylhexanoate were introduced to this reaction vessel and were mixed with each other, the temperature in the reaction vessel was increased to 80° C. under air bubbling, and reaction was performed for two hours. After the reaction, the obtained reactant was cooled down, so as to obtain Urethane Acrylate (b).
Urethane Acrylate (b) was urethane acrylate of which one terminal is an acryloyl group and in which trifunctional isocyanate was used.

Comparative Example 1-2

(Manufacturing of Aqueous Emulsion)
27.5 parts by mass of amphiphilic Urethane Acrylate (a) obtained above, 9.2 parts by mass of VISCOAT #802 (mixture of tripentaerythritol acrylate, mono- and dipentaerythritol acrylate, polypentaerythritol acrylate, and a polymerizable monomer, Osaka Organic Chemical Industry Ltd.), 5 parts by mass of UV-7620EA (a resin having a polymerizable group), and 3.3 parts by mass of LUCIRIN (Registered trademark) TPO (2,4,6-trimethylbenzoyl-diphenyl-phosphine oxide, photoradical polymerization initiator, BASF SE) were introduced to a reaction vessel including a stirrer, a cooling pipe, a dropping funnel, and an air introduction pipe, the temperature in the reaction vessel was increased to 80° C. under stirring, and the temperature was maintained for two hours.
Subsequently, the temperature in the reaction vessel was cooled down to 50° C., 60 parts by mass of deionized water was added under stirring, the temperature was maintained for one hour at 40° C., and dilution was performed with deionized water such that a concentration of nonvolatile contents (amphiphilic Urethane Acrylate (a), a polymerizable monomer, a resin having a polymerizable group, and a photoradical polymerization initiator) become 20 mass %, so as to obtain an aqueous emulsion (aqueous emulsion including Particles 63-2) of Comparative Example 1-2.
In the aqueous emulsion of Comparative Example 1-2, gel particles were not formed (that is, Particles 63-2 were not gel particles).

Comparative Example 2-2

(Manufacturing of Aqueous Emulsion)
27.5 parts by mass of Urethane Acrylate (b) obtained above, 9.2 parts by mass of VISCOAT #802 (mixture of tripentaerythritol acrylate, mono- and dipentaerythritol acrylate, and polypentaerythritol acrylate, polymerizable monomer, Osaka Organic Chemical Industry Ltd.), 5 parts by mass of UV-7620EA (resin having a polymerizable group), and 3.3 parts by mass of LUCIRIN (Registered trademark) TPO (photoradical polymerization initiator) were introduced to a reaction vessel including a stirrer, a cooling pipe, a dropping funnel, and an air introduction pipe, the temperature in the reaction vessel was increased to 80° C. under stirring, and the temperature was maintained for two hours.
Subsequently, the temperature in the reaction vessel was cooled down to 50° C., 60 parts by mass of deionized water was added under stirring, the temperature was maintained for one hour at 40° C., and dilution was performed with deionized water such that a concentration of nonvolatile contents (Urethane Acrylate (b), polymerizable monomer, a resin having a polymerizable group, and photoradical polymerization initiator) become 20 mass %, so as to obtain an aqueous emulsion (aqueous emulsion including Particles 64-2) of Comparative Example 2-2.
In the aqueous emulsion of Comparative Example 2-2, gel particles were not formed (that is, Particles 64-2 were not gel particles).

Comparative Example 3-2

(Manufacturing of Dispersion Liquid of Microcapsules)
65 g of TAKENATE (Registered trademark) D-110N (adduct of trimethylolpropane (TMP) and xylene diisocyanate (XDI), 50 mass % ethyl acetate solution, microcapsule wall material, Mitsui Chemicals, Inc.), 5 g of polymethyl methacrylate (PMMA, resin: methacrylic resin, Mw: 75,000, Tg: 100° C., Sigma-Aldrich Corporation), 3 g of an infrared absorbing coloring agent, 2.5 g of a thermal radical generator, and 0.1 g of PIONIN A41C (surfactant, Taketomo Oil & Fat Co., Ltd.) were dissolved in a mixed solution of 30 g of methyl ethyl ketone and 60 g of ethyl acetate, so as to obtain an oil phase component.

120 g of a 4 mass % aqueous solution of KURARAY POVAL (Registered trademark) PVA205 (polyvinyl alcohol, Kuraray Co., Ltd.) was prepared as a water phase component.

The water phase component was added to and mixed with the oil phase component, and the obtained mixture was emulsified for 10 minutes at 10,000 rpm by using a homogenizer, so as to obtain an emulsion.

Methyl ethyl ketone and ethyl acetate were filtered out from an emulsion by stirring the obtained emulsion for three hours at 40° C., dilution was performed with deionized water such that the concentration of solid contents become 20 mass % so as to obtain a dispersion liquid (dispersion liquid including Microcapsule Particles 65-2) of Comparative Example 3-2.

In the dispersion liquid of Comparative Example 3-2, Microcapsule Particles 65-2 did not have a polymerizable group.

The infrared absorbing coloring agent and the thermal radical generator used in Comparative Example 3-2 were the same as the infrared absorbing coloring agent and the thermal radical generator used in the Comparative Example 3-1 of the first aspect, and structural formulae thereof were also provided above, and thus descriptions thereof are omitted here.

<Checking Whether Aqueous Dispersion Liquid Includes Gel Particles Having Polymerizable Group>

Whether the water dispersions of Examples 1-2 to 62-2 obtained above included gel particles was checked by the following method. The following operations were performed in the conditions of the liquid temperature of 25° C.

Samples were collected from the water dispersion obtained above. 100 times by mass of tetrahydrofuran (THF) with respect to the total solid content (particles in this example) in this sample was added to and mixed with the collected sample and each other, so as to prepare a diluent of the water dispersion. Centrifugation (80,000 rpm, for 40 minutes) was performed on the obtained diluent. Existence of residues was visually checked after the centrifugation, in a case where residues were checked, water was added to these residues, and the residues were redispersed by performing stirring for one hour by a stirrer, so as to obtain a redispersion liquid. The particle size distribution of the obtained redispersion liquid was measured by a light scattering method, by using a wet particle size distribution determination device (LA-910, Horiba Ltd.). In a case where particle size distribution was checked by the above operation, it was considered that the aqueous dispersion liquid included gel particles.

As a result, it was checked that all of the water dispersions of Examples 1-2 to 62-2 included gel particles (that is, all of Particles 1-2 to 62-2 were gel particles).

According to the above results and the results of the Fourier transform infrared spectroscopy (FT-IR) analysis, it was checked that all of the water dispersions of Examples 1-2 to 62-2 include gel particles having a polymerizable group (that is, all of Particles 1-2 to 62-2 were gel particles having polymerizable groups).

<Checking of Inclusion of Photopolymerization Initiator>

With respect to the water dispersions of Examples 1-2 to 62-2 obtained above, an inclusion ratio (%) of the photopolymerization initiator was measured so as to check whether the photopolymerization initiators were included in gel particles. Details thereof are described below. The following operations were performed in the condition of the liquid temperature of 25° C.

Two samples in the same mass (hereinafter, referred to as "Sample 1A" and "Sample 2A") were gathered from the water dispersion.

100 times by mass of tetrahydrofuran (THF) of the total solid content in Sample 1A was added to and mixed with Sample 1A, so as to prepare the diluent. Centrifugation in the condition of 80,000 rpm and 40 minutes was performed on the obtained diluent. The supernatant (hereinafter, referred to as "Supernatant 1A") generated by the centrifugation was gathered. The mass of the photopolymerization initiator included in Supernatant 1A gathered was measured by a liquid chromatography device "Waters2695" manufactured by Waters Corporation. The mass of the obtained photopolymerization initiator was set as "the total amount of the photopolymerization initiator".

Centrifugation was performed on Sample 2A in the same condition as in the centrifugation performed on the diluent. A supernatant (hereinafter, referred to as "Supernatant 2A") generated by the centrifugation was gathered. The mass of the photopolymerization initiator included in Supernatant 2A gathered was measured by the liquid chromatography device. The mass of the obtained photopolymerization initiator was "a free amount of the photopolymerization initiator".

An inclusion ratio (mass %) of the photopolymerization initiator was obtained by the following equation based on the "total amount of the photopolymerization initiator" and the "free amount of the photopolymerization initiator".

Inclusion ratio (mass %) of photopolymerization initiator=((Total amount of photopolymerization initiator-free amount of photopolymerization initiator)/total amount of photopolymerization initiator)×100

In a case where the measured inclusion ratio was greater than 0 mass %, it was considered that the photopolymerization initiator was included in the gel particles.

As a result, it was checked that inclusion ratios of photopolymerization initiators were 99 mass % or greater with respect to all of the water dispersions of Examples 1-2 to 62-2, and the photopolymerization initiators were included in the gel particles.

<Checking of Inclusion of Resin Having Polymerizable Group>

It was checked whether a resin having a polymerizable group was included in gel particles by measuring an inclusion ratio (%) of a resin having a polymerizable group with respect to the water dispersions of Examples 1-2 to 62-2 obtained above.

The checking of the inclusion of the resin having a polymerizable group was performed in the same method as the above checking of the inclusion of the photopolymerization initiator except for measuring a mass (total amount of resin having polymerizable group) of the resin having a polymerizable group included in Supernatant 1A in the above checking of the inclusion of the photopolymerization initiator and a mass (free amount of resin having polymerizable group) of the resin having a polymerizable group included in Supernatant 2A by gel permeation chromatography (GPC).

In the measuring by the gel permeation chromatography (GPC), HLC (Registered trademark)-8020GPC (Tosoh Corporation) was used as a determination device, three items of TSKgel (Registered trademark) Super Multipore HZ-H (4.6 mmID×15 cm, Tosoh Corporation) were used as columns, and tetrahydrofuran (THF) was used as an eluent. As the measuring conditions, a sample concentration was 0.45 mass %, a flow rate was 0.35 ml/min, a sample injection volume was 10 μl, and a measuring temperature was 40° C., and the measuring was performed by using an RI detector.

The calibration curve was manufactured from eight samples of "Standard Sample TSK standard, polystyrene" of Tosoh Corporation: "F-40", "F-20", "F-4", "F-1", "A-5000", "A-2500", "A-1000", and "n-propylbenzene".

As a result, it was checked that, inclusion ratios of resins having polymerizable groups were 99 mass % or greater in all of the water dispersions of Examples 1-2 to 62-2 and a resin having a polymerizable group was included in the gel particles.

<Checking of Inclusion of Polymerizable Monomer>

It was checked whether polymerizable monomers were included in gel particles by measuring inclusion ratios (%) of polymerizable monomers of water dispersions of Examples 9-2 to 53-2, 55-2 to 60-2, and 62-2 using the manufactured polymerizable monomers among the water dispersions of Examples 1-2 to 62-2 obtained above.

The checking of the inclusion of the polymerizable monomer was performed in the same method as the checking of the inclusion of the photopolymerization initiator.

As a result, it was checked that the inclusion ratio of the polymerizable monomer was 99 mass % or greater in all of the water dispersions of Examples 9-2 to 53-2, 55-2 to 60-2, and 62-2 and the polymerizable monomers were included in the gel particles.

<Checking of Inclusion of Sensitizer>

It was checked whether the sensitizers were included in the gel particles by measuring inclusion ratios (%) of the sensitizers with respect to the water dispersions of Examples 56-2 to 62-2 using sensitizers in the manufacturing, among the water dispersions of Examples 1-2 to 62-2 obtained above.

The checking of the inclusion of the sensitizer was performed in the same method as the checking of the inclusion of the photopolymerization initiator.

As a result, it was checked that the inclusion ratio of the sensitizer was 99 mass % or greater in all of the water dispersions of Examples 56-2 to 62-2, and a sensitizer was included in the gel particles.

<Measuring of the Volume-Average Particle Diameter of Particles>

The volume-average particle diameter of the gel particles (Particles 1-2 to 62-2) in the water dispersions of Examples 1-2 to 62-2 obtained above and was measured by a light scattering method, by using a particle size distribution determination device (LA-910, Horiba Ltd.). As a result, volume-average particle diameters of Particles 1-2 to 62-2 were 0.15 μm. In the same method, volume-average particle diameters of particles (Particles 63-2 to 64-2) in the aqueous emulsions of Comparative Examples 1-2 to 2-2 and particles (Particles 65-2) in the microcapsule dispersion liquid of Comparative Examples 3-2 were measured, and the volume-average particle diameters of Particles 63-2 to 64-2 were 0.30 μm, and the volume-average particle diameter of Particles 65-2 was 0.35 μm.

[Manufacturing of Ink Composition]

The following components were mixed so as to manufacture ink compositions of Examples 1-2A to 62-2A and Comparative Examples 1-2A to 3-2A.

—Components of Ink Compositions—

| | |
|---|---|
| Each of the water dispersions of Examples 1-2 to 62-2, each of aqueous emulsions of Comparative Examples 1-2 to 2-2, or microcapsule dispersion liquid of Comparative Example 3-2 | 82 parts by mass |
| Ink (Pro-jet (Registered trademark) Cyan APD1000, FUJIFILM Imaging Colorants, Inc., Colorant Concentration: 14 mass %) | 13 parts by mass |
| Fluorine-based surfactant (Product name: Capstone (Registered trademark) FS-31, DuPont, Concentration of solid contents: 25 mass %) | 0.3 parts by mass |
| 2-Methylpropanediol | 4.7 parts by mass |

[Evaluation of Ink Composition]

The following evaluations were performed by using the ink composition obtained above. The results thereof are provided in Table 10.

<Adhesiveness of Cured Film (Cross Hatch Test)>

The adhesiveness was evaluated by using each of the evaluation sample (PVC), the evaluation samples (PS), the evaluation samples (PC), the evaluation samples (PP), the evaluation samples (G-modified PET), and the evaluation samples (Acryl).

An evaluation sample (PVC) was manufactured by coating a polyvinyl chloride (PVC) sheet as a base material with the ink composition obtained above in a thickness of 12 μm by using bar No. 2 of K hand coater manufactured by RK PRINT COAT INSTRUMENTS Ltd. and heating and drying the obtained coated film at 60° C. for three minutes.

The evaluation sample (PS) was manufactured in the same manner as the manufacturing of the evaluation sample (PVC) except for changing the base material to a polystyrene (PS) sheet.

The evaluation sample (PC) was manufactured in the same manner as the manufacturing of the evaluation sample (PVC) except for changing the base material to a polycarbonate (PC) sheet.

The evaluation sample (PP) was manufactured in the same manner as the manufacturing of the evaluation sample (PVC) except for changing the base material to a polypropylene (PP) sheet.

The evaluation sample (G-modified PET) was manufactured in the same manner as the manufacturing of the evaluation sample (PVC) except for changing the base material to a glycol-modified polyethylene terephthalate (G-modified PET) sheet.

The evaluation sample (Acryl) was manufactured in the same manner as the manufacturing of the evaluation sample (PVC) except for changing the base material to an acrylic resin sheet.

Here, the following sheets were used for each of the PVC sheet, the PS sheet, the PC sheet, the PP sheet, the G-modified PET sheet, and the acrylic resin sheet.

PVC sheet: "AVERY (Registered trademark) 400 GLOSS WHITE PERMANENT" manufactured by Avery Dennison Corporation PS sheet: "falcon hi impact polystyrene" manufactured by Robert Home Group Ltd.

PC sheet: "PC1600-2" manufactured by Takiron Co., Ltd.

PP sheet: "Correx" manufactured by Robert Horne Group Ltd.

G-modified PET sheet: "VIVAK (Registered trademark)" manufactured by Bayer AG

Acrylic resin sheet: "ACRYACE (Registered trademark) UV" manufactured by JSP Corporation In the evaluation of the adhesiveness, a UV mini conveyor device for a test CSOT (manufactured by GS Yuasa International Ltd.) to which an ozone-less metal halide lamp MAN250L was mounted as an exposure device and in which a conveyor speed was set as 35 m/min and exposure intensity was set as 2.0 W/cm$^2$ was used.

With respect to the coated film of each evaluation sample, the coated film was cured by irradiating the coated film with the UV light (ultraviolet rays) using the exposure device, so as to obtain a cured film.

A cross hatch test was performed on the cured film in conformity with ISO2409 (cross cut method) and the cured film was evaluated according to the following evaluation standard.

In this cross hatch test, cut intervals were set to 1 mm, and 25 square lattices having angles of 1 mm were formed.

According to the following evaluation standard, 0 and 1 are levels that are acceptable in practice.

According to the evaluation standard, a proportion (%) in which a lattice was peeled off was a value obtained by the following equation. The total number of the lattices according to the following equation was 25.

Ratio of peeled lattice (%)=[(the number of lattices in which peeling was generated)/(the total number of lattices)]×100

—Evaluation Standard of Adhesiveness of Cured Film—

0: A proportion (%) in which a lattice was peeled off was 0%.

1: A proportion (%) in which a lattice was peeled off was greater than 0% and 5% or less.

2: A proportion (%) in which a lattice was peeled off was greater than 5% and 15% or less.

3: A proportion (%) in which a lattice was peeled off was greater than 15% and 35% or less.

4: A proportion (%) in which a lattice was peeled off was greater than 35% and 65% or less.

5: A proportion (%) in which a lattice was peeled off was greater than 65%.

<Pencil Hardness of Cured Film>

Pencil hardness of the cured film was evaluated by using the above evaluation sample (PVC).

In the same manner as the evaluation of the adhesiveness of the cured film, the coated film of the evaluation sample (PVC) was irradiated with UV light and was cured, so as to obtain a cured film.

A pencil hardness test was performed on a cured film in conformity with JIS K5600-5-4 (1999) by using UNI (Registered trademark) manufactured by Mitsubishi Pencil Co., Ltd. as a pencil.

According to the test results, an allowable range of the pencil hardness is HB or harder and preferably H or harder. A printed matter having the pencil hardness of B or less is not preferable, since there is a possibility that scratches may be generated in a case of handling the printed matter.

<Jettability of Ink Composition>

The ink composition obtained above was ejected from the head of an ink jet printer (SP-300V, manufactured by Roland DG Corporation) for 30 minutes and then the ejection was stopped.

After five minutes had elapsed from the stop of the ejection, the ink composition was ejected to the vinyl chloride (PVC) sheet described above from the head, so as to form a solid image of 5 cm×5 cm.

These images were visually observed so as to check existence of dot losses due to the generation of the non-ejection nozzles, and jettability of the ink composition was evaluated according to the following evaluation standard.

—Evaluation Standard of Jettability of Ink Composition—

A: Dot losses were not acknowledged due to the generation of the non-ejection nozzles and the like, and a satisfactory image was able to be obtained.

B: Some dot losses due to the generation of the non-ejection nozzles and the like were acknowledged, but no troubles were generated in practice.

C: Dot losses due to the generation of the non-ejection nozzles and the like were generated, but an image was unsatisfactory in practice.

D: Ejection from heads was not able to be performed.

<Redispersibility of Ink Composition>

The following operation was performed under a yellow lamp so as to evaluate redispersibility of the ink compositions obtained above.

An aluminum plate was coated with the ink composition obtained above in a thickness of 12 μm by using bar No. 2 of K hand coater manufactured by RK PRINT COAT INSTRUMENTS Ltd, so as to form a coated film. The obtained coated film was dried by heating at 60° C. for 3 minutes. The surface of the coated film after being dried was rubbed with a sponge impregnated with water.

Fourier transform infrared spectroscopy (FT-IR) was performed on each of the coated films before being rubbed with a sponge and the coated film after being rubbed. Residual ratios of gel particles were calculated based on the following equation from obtained results.

Residual ratio of gel particles=(Intensity of peak derived from gel particles in coated film after being rubbed with sponge/Intensity of peak derived from gel particles in coated film before being rubbed with sponge)×100

Here, a peak derived from gel particles means a peak at 1700 cm$^{-1}$.

Redispersibility of the ink composition was evaluated based on the obtained residual ratio of the gel particles according to the following evaluation standard.

—Evaluation Standard of Redispersibility of Ink Composition—

A: A residual ratio of the gel particles was 1% or less, and redispersibility was excellent.

B: A residual ratio of the gel particles was greater than 1% and 5% or less, and redispersibility was in a range acceptable in practice.

C: A residual ratio of the gel particles was greater than 5% and 10% or less, and redispersibility was out of a range acceptable in practice.

D: A residual ratio of the gel particles was greater than 10%, and redispersibility was extremely bad.

<Preservation Stability of Ink Composition>

The ink compositions obtained above were sealed in a container, two weeks had elapsed at 60° C., the same evaluation as the above jettability evaluation was performed, and preservation stability of the ink composition was evaluated according to the same evaluation standard.

TABLE 10

| | | Evaluation results | | | | Adhesiveness | | | | | |
|---|---|---|---|---|---|---|---|---|---|---|---|
| | | Pencil hardness | Jettability | Redispersibility | Preservation stability | PVC | PS | PC | G-modified PET | PP | Acryl |
| Example 1-2A | Particles 1-2 | H | B | A | B | 0 | 0 | 1 | 1 | 1 | 1 |
| Example 2-2A | Particles 2-2 | H | B | A | B | 0 | 0 | 1 | 1 | 1 | 1 |
| Example 3-2A | Particles 3-2 | H | B | A | B | 0 | 0 | 1 | 1 | 1 | 1 |
| Example 4-2A | Particles 4-2 | H | B | A | B | 0 | 0 | 1 | 1 | 1 | 1 |
| Example 5-2A | Particles 5-2 | H | B | A | B | 0 | 0 | 1 | 1 | 1 | 1 |
| Example 6-2A | Particles 6-2 | H | B | A | B | 0 | 0 | 1 | 1 | 1 | 1 |
| Example 7-2A | Particles 7-2 | H | B | A | B | 0 | 0 | 1 | 1 | 1 | 1 |
| Example 8-2A | Particles 8-2 | H | A | A | A | 0 | 0 | 1 | 1 | 1 | 1 |
| Example 9-2A | Particles 9-2 | HB | A | A | A | 0 | 0 | 1 | 1 | 1 | 1 |
| Example 10-2A | Particles 10-2 | HB | A | A | A | 0 | 0 | 1 | 1 | 1 | 1 |
| Example 11-2A | Particles 11-2 | H | A | A | A | 0 | 0 | 1 | 1 | 1 | 1 |
| Example 12-2A | Particles 12-2 | H | A | A | A | 0 | 0 | 1 | 1 | 1 | 1 |
| Example 13-2A | Particles 13-2 | H | A | A | A | 0 | 0 | 1 | 1 | 1 | 1 |
| Example 14-2A | Particles 14-2 | H | A | A | A | 0 | 0 | 1 | 1 | 1 | 1 |
| Example 15-2A | Particles 15-2 | H | A | A | A | 0 | 0 | 1 | 1 | 1 | 1 |
| Example 16-2A | Particles 16-2 | H | A | A | A | 0 | 0 | 1 | 1 | 1 | 1 |
| Example 17-2A | Particles 17-2 | H | A | A | A | 0 | 0 | 1 | 1 | 1 | 1 |
| Example 18-2A | Particles 18-2 | H | A | A | A | 0 | 0 | 1 | 1 | 1 | 1 |
| Example 19-2A | Particles 19-2 | 2H | A | A | A | 0 | 0 | 1 | 1 | 1 | 1 |
| Example 20-2A | Particles 20-2 | 2H | A | A | A | 0 | 0 | 1 | 1 | 1 | 1 |
| Example 21-2A | Particles 21-2 | H | A | A | A | 0 | 0 | 1 | 1 | 1 | 1 |
| Example 22-2A | Particles 22-2 | H | A | A | A | 0 | 0 | 1 | 1 | 1 | 1 |
| Example 23-2A | Particles 23-2 | H | A | A | A | 0 | 0 | 1 | 1 | 1 | 0 |
| Example 24-2A | Particles 24-2 | H | A | A | A | 0 | 0 | 1 | 1 | 1 | 0 |
| Example 25-2A | Particles 25-2 | H | A | A | A | 0 | 0 | 0 | 0 | 1 | 0 |
| Example 26-2A | Particles 26-2 | H | A | A | A | 0 | 0 | 0 | 0 | 1 | 0 |
| Example 27-2A | Particles 27-2 | H | A | A | A | 0 | 0 | 0 | 0 | 1 | 0 |
| Example 28-2A | Particles 28-2 | H | A | A | A | 0 | 0 | 0 | 0 | 1 | 0 |
| Example 29-2A | Particles 29-2 | H | A | A | A | 0 | 0 | 0 | 0 | 1 | 0 |
| Example 30-2A | Particles 30-2 | H | A | A | A | 0 | 0 | 0 | 0 | 1 | 0 |
| Example 31-2A | Particles 31-2 | H | A | A | A | 0 | 0 | 0 | 0 | 1 | 0 |
| Example 32-2A | Particles 32-2 | H | A | A | A | 0 | 0 | 0 | 0 | 1 | 0 |
| Example 33-2A | Particles 33-2 | H | A | A | A | 0 | 0 | 0 | 0 | 1 | 0 |
| Example 34-2A | Particles 34-2 | H | A | A | A | 0 | 0 | 0 | 0 | 1 | 0 |
| Example 35-2A | Particles 35-2 | H | A | A | A | 0 | 0 | 0 | 0 | 1 | 0 |
| Example 36-2A | Particles 36-2 | H | A | A | A | 0 | 0 | 0 | 0 | 1 | 0 |
| Example 37-2A | Particles 37-2 | H | A | A | A | 0 | 0 | 0 | 0 | 1 | 0 |
| Example 38-2A | Particles 38-2 | H | A | A | A | 0 | 0 | 0 | 0 | 1 | 0 |
| Example 39-2A | Particles 39-2 | H | A | A | A | 0 | 0 | 0 | 0 | 1 | 0 |
| Example 40-2A | Particles 40-2 | H | A | A | A | 0 | 0 | 0 | 0 | 1 | 0 |
| Example 41-2A | Particles 41-2 | H | A | A | A | 0 | 0 | 0 | 0 | 1 | 0 |
| Example 42-2A | Particles 42-2 | H | A | A | A | 0 | 0 | 0 | 0 | 1 | 0 |
| Example 43-2A | Particles 43-2 | H | A | A | A | 0 | 0 | 0 | 0 | 1 | 0 |
| Example 44-2A | Particles 44-2 | H | A | A | A | 0 | 0 | 0 | 0 | 1 | 0 |
| Example 45-2A | Particles 45-2 | H | A | A | A | 0 | 0 | 0 | 0 | 1 | 0 |
| Example 46-2A | Particles 46-2 | H | A | A | A | 0 | 0 | 0 | 0 | 1 | 0 |
| Example 47-2A | Particles 47-2 | H | A | A | A | 0 | 0 | 0 | 0 | 1 | 0 |
| Example 48-2A | Particles 48-2 | H | A | A | A | 0 | 0 | 0 | 0 | 1 | 0 |
| Example 49-2A | Particles 49-2 | H | A | A | A | 0 | 0 | 0 | 0 | 1 | 0 |
| Example 50-2A | Particles 50-2 | 2H | A | A | A | 0 | 0 | 0 | 0 | 1 | 0 |
| Example 51-2A | Particles 51-2 | 2H | A | A | A | 0 | 0 | 0 | 0 | 1 | 0 |
| Example 52-2A | Particles 52-2 | 2H | A | A | A | 0 | 0 | 0 | 0 | 1 | 0 |
| Example 53-2A | Particles 53-2 | 2H | A | A | A | 0 | 0 | 0 | 0 | 1 | 0 |
| Example 54-2A | Particles 54-2 | 2H | A | A | A | 0 | 0 | 0 | 0 | 1 | 0 |
| Example 55-2A | Particles 55-2 | 3H | A | A | A | 0 | 0 | 0 | 0 | 1 | 0 |
| Example 56-2A | Particles 56-2 | H | A | A | A | 0 | 0 | 0 | 0 | 1 | 0 |
| Example 57-2A | Particles 57-2 | 2H | A | A | A | 0 | 0 | 0 | 0 | 1 | 0 |
| Example 58-2A | Particles 58-2 | 2H | A | A | A | 0 | 0 | 0 | 0 | 1 | 0 |
| Example 59-2A | Particles 59-2 | 2H | A | A | A | 0 | 0 | 0 | 0 | 1 | 0 |
| Example 60-2A | Particles 60-2 | 2H | A | A | A | 0 | 0 | 0 | 0 | 1 | 0 |

TABLE 10-continued

| | | Pencil hardness | Jettability | Redispersibility | Preservation stability | Adhesiveness | | | | | |
|---|---|---|---|---|---|---|---|---|---|---|---|
| | | | | | | PVC | PS | PC | G-modified PET | PP | Acryl |
| Example 61-2A | Particles 61-2 | 2H | A | A | A | 0 | 0 | 0 | 0 | 1 | 0 |
| Example 62-2A | Particles 62-2 | 3H | A | A | A | 0 | 0 | 0 | 0 | 1 | 0 |
| Comparative Example 1-2A | Particles 63-2 | Less than 3B | D | D | D | 5 | 5 | 5 | 5 | 5 | 5 |
| Comparative Example 2-2A | Particles 64-2 | Less than 3B | D | D | D | 5 | 5 | 5 | 5 | 5 | 5 |
| Comparative Example 3-2A | Particles 65-2 | Less than 3B | D | D | D | 5 | 5 | 5 | 5 | 5 | 5 |

As presented in Table 10, the ink compositions (water dispersions of Particles 1-2 to 62-2) of Examples 1-2A to 62-2A in which gel particles having a polymerizable group, having a three-dimensional crosslinked structure including at least one bond selected from an urethane bond and an urea bond, and at least including a photopolymerization initiator and a resin having a polymerizable group were dispersed in water were excellent in adhesiveness. The ink compositions of Examples 1-2A to 62-2A obtained excellent results in pencil hardness, and thus it was able to form cured films having excellent hardness. The ink compositions of Examples 1-2A to 62-2A were also excellent in jettability, redispersibility, and preservation stability.

The ink compositions of Comparative Examples 1-2A to 3-2A in which gel particles having a polymerizable group were not included were remarkably deteriorated in all of the adhesiveness, the hardness of cured films, the jettability, the redispersibility, and the preservation stability, compared with the ink compositions of Examples 1-2A to 62-2A.

[Evaluation of Ink Composition Using LED]

The ink compositions of Examples 50-2A to 62-2A were evaluated by using an LED.

Specifically, with respect to the above evaluation of adhesiveness and pencil hardness, the same operations were performed except for changing the exposure light source to a 385 nm UV-LED irradiator (manufactured by CCS Inc.) for a test and changing the exposure energies to 300 mJ/cm².

The results are provided in Table 11.

As presented in Table 11, the ink compositions of Examples 50-2A to 62-2A using LED light in a case of curing exhibited excellent results in evaluations of adhesiveness and pencil hardness in the same manner as in a case of using an ozone-less metal halide lamp MAN250L (see Table 10 above).

[Manufacturing of Photosensitive Resin Compositions]

The photosensitive resin compositions of Examples 1-2B to 62-2B and Comparative Examples 1-2B to 3-2B were manufactured by mixing the following components.

—Components of Photosensitive Resin Compositions—

| | |
|---|---|
| Each of the water dispersions of Examples 1-2 to 62-2, each of the aqueous emulsion of Comparative Examples 1-2 to 2-2, or microcapsule dispersion liquid of Comparative Example 3-2 | 82 parts by mass |
| Fluorine-based surfactant (Product name: Capstone (Registered trademark) FS-31, DuPont, Concentration of solid contents: 25 mass %) | 0.3 parts by mass |
| 2-Methylpropanediol | 4.7 parts by mass |

[Evaluation of Photosensitive Resin Compositions]

Evaluations of adhesiveness and pencil hardness were performed by using the photosensitive resin compositions obtained above.

Evaluations of the photosensitive resin compositions in adhesiveness were performed in the same manner as in the evaluations of the above ink compositions in adhesiveness except for using a polyvinyl chloride (PVC) sheet and an

TABLE 11

| | | Pencil hardness | Adhesiveness | | | | | |
|---|---|---|---|---|---|---|---|---|
| | | | PVC | PS | PC | G-modified PET | PP | Acryl |
| Example 50-2A | Particles 50-2 | 2H | 0 | 0 | 0 | 0 | 1 | 0 |
| Example 51-2A | Particles 51-2 | 2H | 0 | 0 | 0 | 0 | 1 | 0 |
| Example 52-2A | Particles 52-2 | 2H | 0 | 0 | 0 | 0 | 1 | 0 |
| Example 53-2A | Particles 53-2 | 2H | 0 | 0 | 0 | 0 | 1 | 0 |
| Example 54-2A | Particles 54-2 | 2H | 0 | 0 | 0 | 0 | 1 | 0 |
| Example 55-2A | Particles 55-2 | 3H | 0 | 0 | 0 | 0 | 1 | 0 |
| Example 56-2A | Particles 56-2 | H | 0 | 0 | 0 | 0 | 1 | 0 |
| Example 57-2A | Particles 57-2 | 2H | 0 | 0 | 0 | 0 | 1 | 0 |
| Example 58-2A | Particles 58-2 | 2H | 0 | 0 | 0 | 0 | 1 | 0 |
| Example 59-2A | Particles 59-2 | 2H | 0 | 0 | 0 | 0 | 1 | 0 |
| Example 60-2A | Particles 60-2 | 2H | 0 | 0 | 0 | 0 | 1 | 0 |
| Example 61-2A | Particles 61-2 | 2H | 0 | 0 | 0 | 0 | 1 | 0 |
| Example 62-2A | Particles 62-2 | 3H | 0 | 0 | 0 | 0 | 1 | 0 | acrylic resin sheet as base materials in the evaluation of the above ink compositions in the adhesiveness.

The pencil hardness of the photosensitive resin composition was evaluated in the same method as in the evaluation of the ink composition in pencil hardness. The results were represented in Table 12.

TABLE 12

| | | Evaluation results | | |
|---|---|---|---|---|
| | | | Adhesiveness | |
| | | Pencil hardness | PVC | Acryl |
| Example 1-2B | Particles 1-2 | H | 0 | 1 |
| Example 2-2B | Particles 2-2 | H | 0 | 1 |
| Example 3-2B | Particles 3-2 | H | 0 | 1 |
| Example 4-2B | Particles 4-2 | H | 0 | 1 |
| Example 5-2B | Particles 5-2 | H | 0 | 1 |
| Example 6-2B | Particles 6-2 | H | 0 | 1 |
| Example 7-2B | Particles 7-2 | H | 0 | 1 |
| Example 8-2B | Particles 8-2 | H | 0 | 1 |
| Example 9-2B | Particles 9-2 | HB | 0 | 1 |
| Example 10-2B | Particles 10-2 | HB | 0 | 1 |
| Example 11-2B | Particles 11-2 | H | 0 | 1 |
| Example 12-2B | Particles 12-2 | H | 0 | 1 |
| Example 13-2B | Particles 13-2 | H | 0 | 1 |
| Example 14-2B | Particles 14-2 | H | 0 | 1 |
| Example 15-2B | Particles 15-2 | H | 0 | 1 |
| Example 16-2B | Particles 16-2 | H | 0 | 1 |
| Example 17-2B | Particles 17-2 | H | 0 | 1 |
| Example 18-2B | Particles 18-2 | H | 0 | 1 |
| Example 19-2B | Particles 19-2 | 2H | 0 | 1 |
| Example 20-2B | Particles 20-2 | 2H | 0 | 1 |
| Example 21-2B | Particles 21-2 | H | 0 | 1 |
| Example 22-2B | Particles 22-2 | H | 0 | 1 |
| Example 23-2B | Particles 23-2 | H | 0 | 0 |
| Example 24-2B | Particles 24-2 | H | 0 | 0 |
| Example 25-2B | Particles 25-2 | H | 0 | 0 |
| Example 26-2B | Particles 26-2 | H | 0 | 0 |
| Example 27-2B | Particles 27-2 | H | 0 | 0 |
| Example 28-2B | Particles 28-2 | H | 0 | 0 |
| Example 29-2B | Particles 29-2 | H | 0 | 0 |
| Example 30-2B | Particles 30-2 | H | 0 | 0 |
| Example 31-2B | Particles 31-2 | H | 0 | 0 |
| Example 32-2B | Particles 32-2 | H | 0 | 0 |
| Example 33-2B | Particles 33-2 | H | 0 | 0 |
| Example 34-2B | Particles 34-2 | H | 0 | 0 |
| Example 35-2B | Particles 35-2 | H | 0 | 0 |
| Example 36-2B | Particles 36-2 | H | 0 | 0 |
| Example 37-2B | Particles 37-2 | H | 0 | 0 |
| Example 38-2B | Particles 38-2 | H | 0 | 0 |
| Example 39-2B | Particles 39-2 | H | 0 | 0 |
| Example 40-2B | Particles 40-2 | H | 0 | 0 |
| Example 41-2B | Particles 41-2 | H | 0 | 0 |
| Example 42-2B | Particles 42-2 | H | 0 | 0 |
| Example 43-2B | Particles 43-2 | H | 0 | 0 |
| Example 44-2B | Particles 44-2 | H | 0 | 0 |
| Example 45-2B | Particles 45-2 | H | 0 | 0 |
| Example 46-2B | Particles 46-2 | H | 0 | 0 |
| Example 47-2B | Particles 47-2 | H | 0 | 0 |
| Example 48-2B | Particles 48-2 | H | 0 | 0 |
| Example 49-2B | Particles 49-2 | H | 0 | 0 |
| Example 50-2B | Particles 50-2 | 2H | 0 | 0 |
| Example 51-2B | Particles 51-2 | 2H | 0 | 0 |
| Example 52-2B | Particles 52-2 | 2H | 0 | 0 |
| Example 53-2B | Particles 53-2 | 2H | 0 | 0 |
| Example 54-2B | Particles 54-2 | 2H | 0 | 0 |
| Example 55-2B | Particles 55-2 | 3H | 0 | 0 |
| Example 56-2B | Particles 56-2 | H | 0 | 0 |
| Example 57-2B | Particles 57-2 | 2H | 0 | 0 |
| Example 58-2B | Particles 58-2 | 2H | 0 | 0 |
| Example 59-2B | Particles 59-2 | 2H | 0 | 0 |
| Example 60-2B | Particles 60-2 | 2H | 0 | 0 |
| Example 61-2B | Particles 61-2 | 2H | 0 | 0 |
| Example 62-2B | Particles 62-2 | 3H | 0 | 0 |
| Comparative Example 1-2B | Particles 63-2 | Less than 3B | 5 | 5 |
| Comparative Example 2-2B | Particles 64-2 | Less than 3B | 5 | 5 |
| Comparative Example 3-2B | Particles 65-2 | Less than 3B | 5 | 5 |

As presented in Table 12, the photosensitive resin compositions (water dispersions of Particles 1-2 to 62-2) of Examples 1-2B to 62-2B in which gel particles having a polymerizable group, having a three-dimensional crosslinked structure including at least one bond selected from an urethane bond and an urea bond, and at least including a photopolymerization initiator and a resin having a polymerizable group were dispersed in water exhibited remarkably excellent results in the evaluations of the adhesiveness and the pencil hardness compared with the photosensitive resin compositions of Comparative Examples 1-2B to 3-2B not including gel particles having a polymerizable group.

The whole of the disclosures of JP2015-061694 filed on Mar. 24, 2015, JP2015-061695 filed on Mar. 24, 2015, and JP2015-171377 filed on Aug. 31, 2015 are incorporated into the present specification by reference.

All the documents, patent applications, and technical standards described in the present specification are incorporated into the present specification by reference to the same extent as that in the case where it is specifically and individually shown that each of the documents, patent applications, and technical standards is incorporated into the present specification by reference.

What is claimed is:

1. A water dispersion of gel particles,
   wherein gel particles having a polymerizable group, having a three-dimensional crosslinked structure including at least one bond selected from a urethane bond or a urea bond, and including at least a photopolymerization initiator and a resin, are dispersed in water,
   wherein a content of the resin included in the gel particles is from 0.5 mass % to 15 mass % with respect to a total solid content of the gel particles, and
   wherein the resin is a resin not having a polymerizable group and the resin has a weight-average molecular weight from 1,000 to 35,000.

2. The water dispersion of gel particles according to claim 1,
   wherein the resin not having a polymerizable group is at least one resin selected from the group consisting of an acrylic resin, a polyvinyl chloride resin, and a polyester resin.

3. A water dispersion of gel particles,
   wherein gel particles having a polymerizable group, having a three-dimensional crosslinked structure including at least one bond selected from a urethane bond or a urea bond, and including at least a photopolymerization initiator and a resin, are dispersed in water,
   wherein a content of the resin included in the gel particles is from 0.5 mass % to 15 mass % with respect to a total solid content of the gel particles, and wherein the resin is a resin having a polymerizable group and the resin has a weight-average molecular weight from 1,500 to 30,000.

4. The water dispersion of gel particles according to claim 3,
wherein the resin having a polymerizable group is at least one resin selected from an acrylic resin, a urethane resin, a polyester resin, a polyether resin, a polycarbonate resin, and an epoxy resin.

5. The water dispersion of gel particles according to claim 3,
wherein the resin having a polymerizable group is at least one resin selected from an acrylic resin, a urethane resin, a polyester resin, and an epoxy resin.

6. The water dispersion of gel particles according to claim 1,
wherein the gel particles further include a polymerizable monomer.

7. The water dispersion of gel particles according to claim 6,
wherein the polymerizable monomer is a (meth)acrylate monomer.

8. The water dispersion of gel particles according to claim 7,
wherein the (meth)acrylate monomer is a trifunctional or higher functional acrylate monomer.

9. The water dispersion of gel particles according to claim 1,
wherein the photopolymerization initiator includes at least one compound selected from the group consisting of a carbonyl compound and an acylphosphine oxide compound.

10. The water dispersion of gel particles according to claim 1,
wherein the gel particles further include a sensitizer.

11. The water dispersion of gel particles according to claim 1, which is used for ink jet recording.

12. The water dispersion of gel particles according to claim 1,
wherein a total solid content of the gel particles is 50 mass % or greater with respect to a total solid content of the water dispersion.

13. A method of producing the water dispersion of gel particles according to claim 1, comprising:
mixing any one oil phase component selected from the group consisting of an oil phase component including a photopolymerization initiator, a resin, a trifunctional or higher functional isocyanate compound, a polymerizable monomer, and an organic solvent, an oil phase component including a photopolymerization initiator, a resin, a trifunctional or higher functional isocyanate compound having a polymerizable group, and an organic solvent, and an oil phase component including a photopolymerization initiator, a resin, a trifunctional or higher functional isocyanate compound having a polymerizable group, a polymerizable monomer, and an organic solvent, with a water phase component including water, and performing emulsification, so as to obtain an emulsion; and
gelling the emulsion by heating.

14. The method of producing water dispersion of gel particles according to claim 13,
wherein the trifunctional or higher functional isocyanate compound is an isocyanate compound derived from at least one selected from the group consisting of isophorone diisocyanate, hexamethylene diisocyanate, trimethylhexamethylene diisocyanate, 1,3-bis(isocyanatomethyl)cyclohexane, m-xylylene diisocyanate, and dicyclohexylmethane-4,4'-diisocyanate.

15. An image forming method comprising:
applying the water dispersion of gel particles according to claim 1 on a recording medium; and
irradiating the water dispersion of gel particles applied to the recording medium with active energy rays.

* * * * *